US010769909B1

(12) United States Patent
Modestine et al.

(10) Patent No.: US 10,769,909 B1
(45) Date of Patent: Sep. 8, 2020

(54) USING SENSOR DATA TO DETECT EVENTS

(71) Applicant: Amazon Technologies, Inc., Seattle, WA (US)

(72) Inventors: John Modestine, Los Angeles, CA (US); Elliott Lemberger, Santa Monica, CA (US); Ryan David Hruska, North Royalton, OH (US); Micah Stone, Santa Monica, CA (US); Sang Min Park, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/459,167

(22) Filed: Jul. 1, 2019

Related U.S. Application Data

(60) Provisional application No. 62/693,201, filed on Jul. 2, 2018.

(51) Int. Cl.
*G08B 13/196* (2006.01)

(52) U.S. Cl.
CPC . *G08B 13/19656* (2013.01); *G08B 13/19695* (2013.01)

(58) Field of Classification Search
CPC ........ H04N 7/108; H04N 7/183; H04N 13/00; H05B 37/02; H05B 37/0227; H05B 37/0245; H05B 37/0272; H05B 37/029; G06Q 10/02; G06Q 10/06; G06Q 10/06312; G06F 3/011; G06F 3/033; G06F 17/30; G06F 17/30241; G08B 13/19634; G08B 13/19656; G08B 13/19669; G08B 13/19695; G08B 25/016; G08B 25/06; G08B 25/12
See application file for complete search history.

(56) References Cited

U.S. PATENT DOCUMENTS

| 4,764,953 A | 8/1988 | Chern et al. |
| 5,428,388 A | 6/1995 | von Bauer et al. |
| 5,760,848 A | 6/1998 | Cho |

(Continued)

FOREIGN PATENT DOCUMENTS

| CN | 2585521 | 11/2003 |
| CN | 2792061 | 6/2006 |

(Continued)

*Primary Examiner* — Van T Trieu
(74) *Attorney, Agent, or Firm* — Lee & Hayes, P.C.

(57) ABSTRACT

This application describes techniques for detecting a single event based on consecutive actions. For instance, a network device may associate a first electronic device that includes a first field of view (FOV) with a second electronic device that includes a second FOV. When the network device receives data indicating that the first electronic device detected possible motion, the network device may transmit a first message to a client device. Additionally, when the network device receives data indicating that the second electronic device detected motion within a threshold period of time to the first electronic device detecting the motion, the network device may not transmit a second message. Determining not to transmit the second message may be based on characteristics of the electronic devices, such as locations of the electronic devices, fields of view of the electronic devices, or a distance between the electronic device devices.

20 Claims, 24 Drawing Sheets

(56) References Cited

U.S. PATENT DOCUMENTS

| | | | |
|---|---|---|---|
| 6,072,402 A | 6/2000 | Kniffin et al. | |
| 6,192,257 B1 | 2/2001 | Ray | |
| 6,256,046 B1 * | 7/2001 | Waters | G06F 3/011 |
| | | | 345/473 |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,943,685 B2 * | 9/2005 | Seo | G08B 13/191 |
| | | | 340/541 |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,791,539 B2 * | 10/2017 | Teicher | A61B 5/1113 |
| 9,799,183 B2 | 10/2017 | Harrison et al. | |
| 10,440,804 B2 * | 10/2019 | Pandharipande | H05B 47/19 |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2007/0008081 A1 | 1/2007 | Tylicki et al. | |
| 2010/0225455 A1 | 9/2010 | Claiborne et al. | |
| 2013/0057695 A1 | 3/2013 | Huisking | |
| 2014/0267716 A1 | 9/2014 | Child et al. | |
| 2015/0035987 A1 | 2/2015 | Fernandez | |
| 2015/0163463 A1 | 6/2015 | Hwang et al. | |
| 2017/0161646 A1 * | 6/2017 | Abuelsaad | G06F 16/29 |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

* cited by examiner

1100

11A

DETERMINE THAT THE SECOND ELECTRONIC DEVICE DETECTED THE OBJECT AFTER THE FIRST ELECTRONIC DEVICE DETECTED THE OBJECT
B1116

DETERMINE THAT THE SECOND TIME IS WITHIN A THRESHOLD PERIOD OF TIME TO THE FIRST TIME
B1118

RESTART THE TIMER FOR A SECOND PERIOD OF TIME
B1120

OBTAIN SECOND IMAGE DATA GENERATED BY AT LEAST ONE OF THE FIRST CAMERA DEVICE OR A SECOND CAMERA DEVICE OF THE GROUP OF ELECTRONIC DEVICES
B1122

ASSOCIATE THE FIRST IMAGE DATA AND THE SECOND IMAGE DATA WITH THE EVENT TAG
B1124

FIGURE 11B

1200 

```
┌─────────────────────────────────────────────────────────┐
│ RECEIVE FIRST DATA INDICATING A GROUP OF ELECTRONIC DEVICES │
│                        B1202                             │
└─────────────────────────────────────────────────────────┘
                            ↓
┌─────────────────────────────────────────────────────────┐
│ STORE SECOND DATA INDICATING THE GROUP OF ELECTRONIC DEVICES │
│                        B1204                             │
└─────────────────────────────────────────────────────────┘
                            ↓
┌─────────────────────────────────────────────────────────┐
│ RECEIVE, AT A FIRST TIME, THIRD DATA INDICATING THAT A FIRST │
│   ELECTRONIC DEVICE, FROM THE GROUP OF ELECTRONIC DEVICES,  │
│                   DETECTED AN OBJECT                     │
│                        B1206                             │
└─────────────────────────────────────────────────────────┘
                            ↓
┌─────────────────────────────────────────────────────────┐
│  OBTAIN FIRST IMAGE DATA GENERATED BY A FIRST CAMERA DEVICE │
│                        B1208                             │
└─────────────────────────────────────────────────────────┘
                            ↓
┌─────────────────────────────────────────────────────────┐
│          ASSOCIATE THE FIRST IMAGE DATA WITH AN EVENT    │
│                        B1210                             │
└─────────────────────────────────────────────────────────┘
                            ↓
┌─────────────────────────────────────────────────────────┐
│ RECEIVE, AT A SECOND TIME, FOURTH DATA INDICATING THAT A │
│  SECOND ELECTRONIC DEVICE, FROM THE GROUP OF ELECTRONIC  │
│                 DEVICES, DETECTED THE OBJECT             │
│                        B1212                             │
└─────────────────────────────────────────────────────────┘
                            ↓
┌─────────────────────────────────────────────────────────┐
│ OBTAIN SECOND IMAGE DATA GENERATED BY AT LEAST ONE OF THE │
│       FIRST CAMERA DEVICE OR A SECOND CAMERA DEVICE      │
│                        B1214                             │
└─────────────────────────────────────────────────────────┘
                            ↓
                          (12B)
```

DETERMINE THAT THE SECOND TIME IS WITHIN A THRESHOLD PERIOD OF TIME TO THE FIRST TIME
B1216

ASSOCIATE THE SECOND IMAGE DATA WITH THE EVENT
B1218

1300

1400

RECEIVE, AT A FIRST TIME, FIRST DATA INDICATING THAT A FIRST ELECTRONIC DEVICE DETECTED A FIRST OBJECT
B1402

RECEIVE, AT A SECOND TIME, SECOND DATA INDICATING THAT A SECOND ELECTRONIC DEVICE DETECTED THE FIRST OBJECT
B1404

RECEIVE IMAGE DATA GENERATED BY A CAMERA DEVICE
B1406

DETERMINE THAT THE IMAGE DATA REPRESENTS THE FIRST OBJECT
B1408

DETERMINE A TYPE OF OBJECT ASSOCIATED WITH THE OBJECT
B1410

STORE AN ASSOCIATION BETWEEN THE TYPE OF OBJECT, THE FIRST ELECTRONIC DEVICE, THE SECOND ELECTRONIC DEVICE, AND A TIME PERIOD
B1412

RECEIVE, AT A THIRD TIME, THIRD DATA INDICATING THAT THE FIRST ELECTRONIC DEVICE DETECTED A SECOND OBJECT
B1414

USING SENSOR DATA TO DETECT EVENTS

CROSS-REFERENCE TO RELATED APPLICATION

This application claims priority to provisional application Ser. No. 62/639,201, filed on Jul. 2, 2018, the entire contents of which are hereby incorporated by reference.

BACKGROUND

Home security is a concern for many homeowners and renters. Those seeking to protect or monitor their homes often wish to have multiple electronic devices installed at their homes. Such electronic devices may include A/V recording and communication devices (referred to as "A/V devices"), devices associated with security systems (e.g., hub devices, motion sensors, door sensors, window sensors, etc.), lighting systems, automation devices (e.g., locking mechanisms, etc.), and/or the like. Each of the electronic devices may generate sensor data representing events that occur at the homes. For example, A/V devices may generate image data representing objects located at the homes, motion sensors may generate motion data representing motion of objects detected at the homes, door sensors may generate data representing each time doors are open and/or closed, and/or the like.

BRIEF DESCRIPTION OF THE DRAWINGS

The various embodiments of the present disclosure describe using sensor data to detect events, which now will be discussed in detail with an emphasis on highlighting the advantageous features. These embodiments depict the novel and non-obvious techniques and processes for using sensor data to detect events, as shown in the accompanying drawings, which are for illustrative purposes only. These drawings include the following figures, in which like numerals indicate like parts:

FIGS. 11A-11B are a flowchart illustrating a first example process for analyzing sensor data to determine that an event is occurring, and then storing image data in association with the event, according to various aspects of the present disclosure;

FIGS. 12A-12B are a flowchart illustrating a second example process for analyzing sensor data to determine that an event is occurring, and then storing image data in association with the event, according to various aspects of the present disclosure;

FIGS. 14A-14B are a flowchart of an example process for using sensor data to generate messages associated with events, according to various aspects of the present disclosure;

DETAILED DESCRIPTION

Figure 1A:
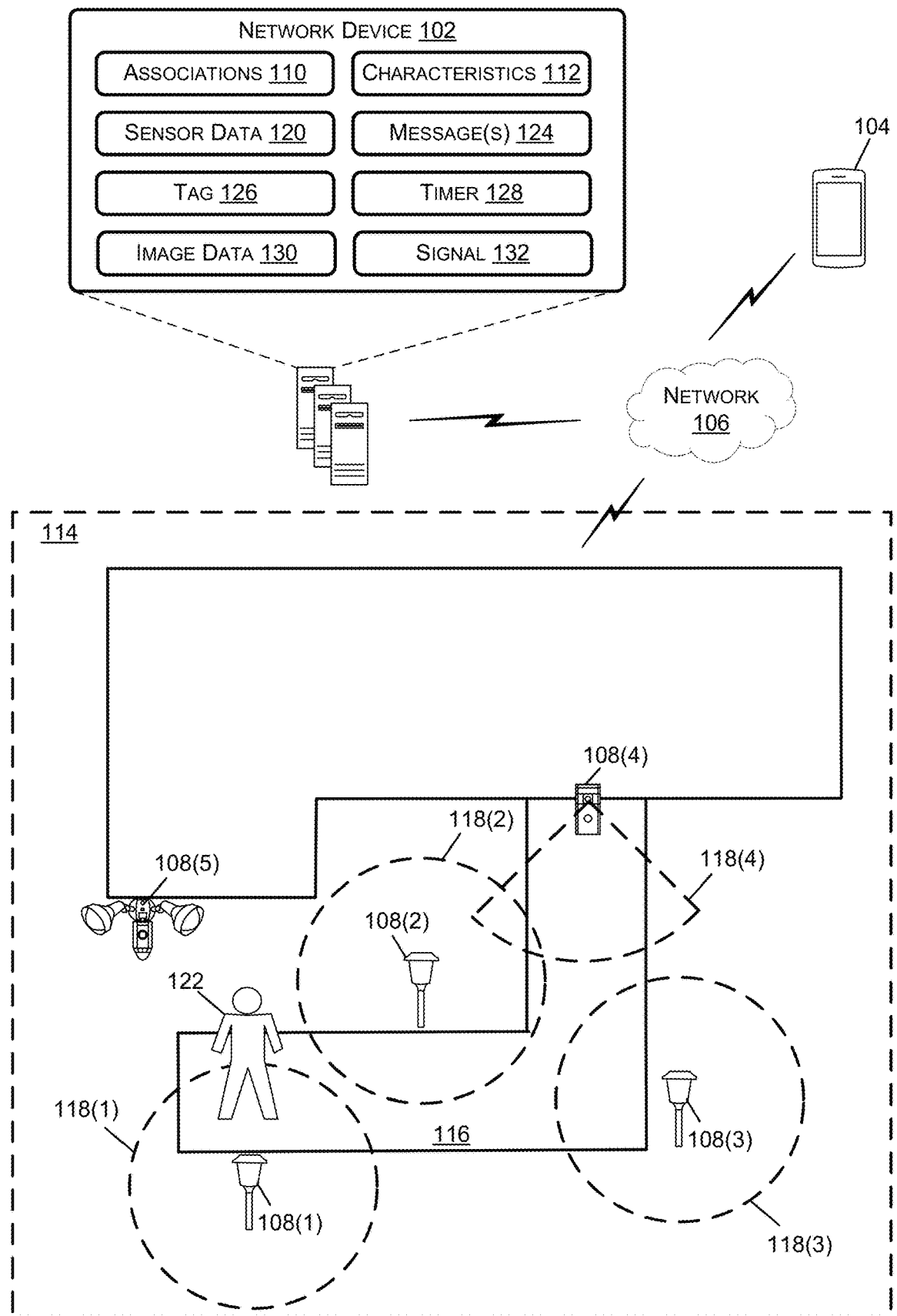
FIGS. 1A-1B are schematic diagrams of an example of a network device(s) receiving sensor data from a group of electronic devices and determining that the sensor data is associated with an event, according to various aspects of the present disclosure.

One aspect of the present embodiments includes the realization that a user may install different types of electronic devices at the user's property for home automation and security, however, it may be difficult to analyze sensor data from each of the electronic devices to identify various events that occur at the property. For example, each of the electronic devices may generate sensor data. For instance, A/V devices may generate image data representing object(s) located at the home, motion sensors may generate motion data representing motion of object(s) detected at the home, door sensors may generate data representing each time doors are open and/or closed, and/or the like. A network device(s), except for the network device(s)s described herein, may be unable to determine when sensor data generated from multiple electronic devices correspond to a single event, such as a guest approaching the property. As such, the network device(s) may transmit a respective message to a client device of the user and/or store respective data each time the network device(s) receives sensor data from an electronic device, even though sensor data generated by multiple electronic devices may correspond to single event. As a result, when the user desires to view data, such as image data and/or sensor data, representative of a single event, the user may have to view each of the data from each of the sensors and/or devices separately, thereby leading to confusion and a lack of easily digestible information.

The present embodiments solve these problems by, for example, providing network device(s) that are capable to determining when sensor data generated by a group of electronic devices is associated with a single event. For example, the network device(s) may store data indicating a group of electronic devices. The network device(s) may then receive first sensor data generated by a first electronic device from the group of electronic devices, such as first motion data indicating that the first electronic device detected first motion. The network device(s) may then (1) transmit, to a client device, a first message indicating that the first motion was detected, (2) store the first sensor data in a database, and/or (3) cause an A/V device to generate first image data, which the network device(s) may associate with an event. Later, the network device(s) may receive second sensor data generated by a second electronic device from the group of electronic devices, such as second motion data indicating that the second electronic device detected second motion. The network device(s) may then use one or more characteristics associated with the group of electronic devices to determine that the second sensor data and the first sensor data represent a single event. As such, the network device(s) may (1) cease from transmitting, to the client device, a second message indicating the second motion was detected, (2) store the second sensor data in association with the first sensor data, and/or (3) cause the A/V device to generate the second image data, which the network device(s) may associate with the event.

An additional aspect of the present embodiments includes the realization that it may be difficult to identify that an event that is occurring based on sensor data. For example, a first electronic device may generate first sensor data indicating that the first electronic device detected first motion. Additionally, a second electronic device may generate second sensor data indicating that the second electronic device detected second motion. A network device(s), except for the network device(s)s described herein, may analyze the first sensor data to determine that the first electronic device detected the first motion and analyze the second sensor data to determine that the second electronic device detected the second motion. However, the network device(s) may be unable to determine that a single event is occurring based on both the first sensor data and the second sensor data. As such, the network device(s) may transmit two messages to a client device, where each indicates that a respective electronic device detected motion.

The present embodiments solve these problems by, for example, analyzing sensor data from a group of electronic devices over time in order to identify when subsequent events occur at a geographic location. For example, a network device(s) may receive sensor data generated by electronic devices during multiple instances of a time period. For each instance, the network device(s) may transmit message(s) to a client device indicating that an event has occurred. In some examples, the network device(s) may then receive, from the client device, data indicating that a specific event is occurring during the time period. Additionally, or alternatively, in some examples, the network device(s) may analyze image data to determine that the specific event is occurring during the time period. In either of the examples, at a later instance of the time period, the network device(s) may again receive sensor data generated by the electronic devices. Based on both the data indicating the specific event and the sensor data, the network device(s) may determine that the event is occurring. As such, the network device(s) may generate a message indicating that the event is occurring. The network device(s) may then transmit the message to the client device. Using the message, a user associated with the client device may then be able to determine that the event is occurring in an easily digestible format.

For instance, the present disclosure describes, in part, a network device(s) (e.g., a backend server(s), a hub device, a remote system, etc.) that is capable of analyzing sensor data generated by a group of electronic devices in order to determine that an event is occurring. In some examples, the event may include a general event, such as, but not limited to, the group of electronic devices detecting a same object and/or a group of objects over a time period. For example, the event may correspond to a guest arriving at a property, where two or more of the electronic devices detect the guest as being located on the property over the time period. The time period may include, but is not limited to, days of the year (e.g., March 1, April 7, October 19, etc.), days of the week (e.g., Monday, Tuesday, Wednesday, etc.), time periods of the day (e.g., between 9:00 a.m. and 10:00 a.m., between 1:00 p.m. and 5:00 p.m., etc.), and/or the like. Additionally, or alternatively, in some examples, the event may include a specific event, such as, but not limited to, children arriving home from school, a parent arriving home from work, a guest arriving at a property, a carrier is dropping off mail and/or a package, a gardener working on the property, and/or the like.

For example, the network device(s) may receive, from a client device, data (referred to, in this example, as "first data") associated with a group of electronic devices located at a geographic location. The electronic devices may include, but are not limited to, A/V devices, light emitters, transformers, hub devices, sensors (e.g., motion sensors, light sensors, window sensors, door sensors, etc.), automation devices (e.g., door locks, window locks, etc.), and/or any other type of electronic device that may generate data representing an object. Each electronic device may generate sensor data representing an object (e.g., a person, an animal, a vehicle, a device, etc.). For example, at least one of the electronic devices may generate motion data using a motion sensor, wherein the motion data represents motion of the object. Additionally, at least one of the electronic devices may generate image data using a camera, where the image data represents image(s) and/or video footage depicting the object. Furthermore, at least one of the electronic devices may include a door sensor that generates data representing when the object opened and/or closed a door. Based on receiving the first data, the network device(s) may store data (referred to, in this example, as "second data") indicating the group of electronic devices.

In some examples, the network device(s) may further receive, from the client device, data (referred to, in this example, as "third data") indicating one or more characteristics associated with one or more of the electronic devices. A characteristic for an electronic device may include, but is not limited to, a type of electronic device (e.g., A/V device, light emitter, motion sensor, etc.), a geographic location of the electronic device, a location of the electronic device with respect to locations other electronic devices, a field of view of a camera of the electronic device (e.g., if the electronic device includes a camera), a field of view of a motion sensor of the electronic device (e.g., if the electronic device includes a motion sensor), an order for the electronic device, and/or the like. The network device(s) may then store data (e.g., referred to, in this example, as "fourth data") indicating the one or more characteristics associated with the one or more electronic devices.

At a first time, the network device(s) may then receive data (referred to, in this example, as "fifth data") generated by a first electronic device from the group of electronic devices. For example, the fifth data may include first motion data generated by a motion sensor of the first electronic device, where the first motion data indicates that the first electronic device detected first motion of object(s) (e.g., that the first electronic device detected a change in the field of view of the camera and/or the field of view of the motion sensor). In some examples, based on receiving the fifth data, the network device(s) may generate a message associated with the fifth data, such as a message indicating that the first electronic device (and/or the group of electronic devices) detected the first motion. The network device(s) may then transmit the message to the client device. Additionally, or alternatively, in some examples, based on receiving the fifth data, the network device(s) may generate an event tag associated with an event. The network device(s) may then associate the fifth data with the event tag. Additionally, or alternatively, in some examples, based on receiving the fifth data, the network device(s) may start a timer for a first period of time. The first period of time may include, but is not limited to, five seconds, thirty seconds, one minute, five minutes, and/or the like. Additionally, or alternatively, in some examples, based on receiving the fifth data, the network device(s) may transmit a signal to a second electronic device (e.g., an A/V device) from the group of electronic devices, where the signal cause the second electronic device to generate (e.g., during the first period of time) image data (referred to, in this example, as "first image data"). The network device(s) may then receive the first image data from the second electronic device and associate with the first image data with the event tag.

Later, at a second period of time, the network device(s) may receive data (e.g., referred to, in this example, as "sixth data") generated by a third electronic device from the group of electronic devices. For example, the sixth data may include second motion data generated by a motion sensor of the third electronic device, where the second motion data indicates that the third electronic device detected second motion of the object(s) (e.g., that the second electronic device detected a change in the field of view of the camera and/or the field of view of the motion sensor). Based on receiving the sixth data, the network device(s) may determine whether the sixth data is associated with the same event as the fifth data. In some examples, the network device(s) may determine that the sixth data is associated with the same event based on the second time occurring within the first period of time. Additionally, or alternatively, in some examples, the network device(s) may determine that the sixth data is associated with the same event based on the one or more characteristics associated with the one or more electronic devices.

For a first example, a characteristic may indicate that the third electronic device is to detect motion of an object after the first electronic device. As such, if the network device(s) determine, based on the fifth data and the sixth data, that the third electronic device detected the second motion after the first electronic device detected the first motion, then the network device(s) may determine that the sixth data is associated with the event. For a second example, a characteristic may indicate that the third electronic device is to be the next electronic device to detect motion of an object after the first electronic device. As such, if the network device(s) determine, based on the fifth data and the sixth data, that the third electronic device detected the second motion after the first electronic device detected the first motion, without any other of the electronic devices detecting motion, then the network device(s) may determine that the sixth data is associated with the event.

For a third example, the network device(s) may determine that, based on geographic locations (and/or fields of view) of the electronic devices, after the first electronic device detects motion of an object, the third electronic device should detect motion of the object before any other electronic device detects motion of the object. In some examples, the network device(s) may make the determination based on distances between the electronic devices (e.g., the third electronic device is the closest electronic device to the first electronic device). In some examples, the network device(s) may make the determination based on how the object would normally move over the property. For example, the third electronic device may be adjacent to the first electronic device along a path that objects would normally take along a path of the property, where each of the other electronic devices are not adjacent to the first electronic device. In either example, if the network device(s) determine, based on the fifth data and the sixth data, that the third electronic device detected the second motion after the first electronic device detected the first motion, without any other of the electronic devices detecting motion, then the network device(s) may determine that the sixth data is associated with the event.

In some examples, if the network device(s) determine that the sixth data is not associated with the same event as the sixth data (e.g., the second time occurs after the first period of time), then the network device(s) may only associate the first image data with the event tag (e.g., the event ended). However, if the network device(s) determine that both the fifth data and the sixth data are associated with the same event, then the network device(s) may take one or more actions.

In some examples, the network device(s) may cease from transmitting, to the client device, an additional message associated with the sixth data, such as an additional message indicating that the third electronic device (and/or the group of electronic devices) detected the second motion. Additionally, or alternatively, in some examples, the network device(s) may associate the sixth data with the event tag. Additionally, or alternatively, in some examples, the network device(s) may restart the timer for a second period of time. The second period of time may include, but is not limited to, five seconds, thirty seconds, one minute, five minutes, and/or the like. In some examples, the second period of time may be similar to the first period of time. In some examples, the second period of time may be different than the first period of time. For example, a fourth electronic device, which may include a next electronic device that should detect motion of the object may a greater distance from the third electronic device than the first electronic device. As such, it may take longer for the fourth electronic device to detect the object(s). Therefore, the second period of time may be greater than the first period of time.

Additionally, or alternatively, in some examples, the network device(s) may transmit an additional signal to the second electronic device that causes the second electronic device to continue generating (e.g., during the second period of time) the image data (referred to, in this example, as "second image data"). The network device(s) may then receive the second image data from the second electronic device and associate the second image data with the event tag. Additionally, or alternatively, in some examples, the network device(s) may transmit an additional signal to a fourth electronic device (e.g., an additional A/V device) that causes the fourth electronic device to generate (e.g., during the second period of time) image data (referred to, in this example, as "third image data"). The network device(s) may then receive the third image data from the fourth electronic device and associate the third image data with the event tag.

In some examples, the network device(s) may continue to receive data (referred to, in this example, as "seventh data") from one or more electronic devices from the group of electronic devices. The network device(s) may then perform similar processes to determine whether the seventh data is associated with the event. Based on determining that the seventh data is associated with the event, the network device(s) may perform the one or more actions. Additionally, the network device(s) may continue to perform such processes until the network device(s) determine that the event is no longer occurring at the geographic location.

In some examples, the network device(s) may determine that the event is no longer occurring at the geographic location based on a current period of time (e.g., the second period of time) associated with the timer elapsing without receiving additional data from the group of electronic devices. In some examples, the network device(s) may determine that the event is no longer occurring at the geographic location based on receiving additional data from at least one of the electronic devices that indicates that the event is no longer occurring. For example, the network device(s) may receive image data (e.g., the second image data, the third image data, fourth image data, etc.) generated by at least one of electronic devices that represents the object associated with the event leaving the geographic location and/or no longer being located at the geographic location.

In some examples, the network device(s) may use previously generated data by the group of electronic devices in order to identify events that subsequently occur at the geographic location. For example, the network device(s) determine that a specific event occurred at the geographic location during at least a first instance of a time period. In some examples, the network device(s) may make the determination based on receiving, from the client device, data (referred to, in this example, as "eighth data") indicating that the specific event occurred during the first instance of the time period. In some examples, the network device(s) may make the determination based on analyzing image data (e.g., the first image data, the second image data, the third image data, etc.) generated during the first instance of the time period. Based on the analysis, the network device(s) may determine that the image data represents an object and/or a type of object (e.g., a person, animal, etc.). The network device(s) may then determine that the object and/or the type of object is associated with the specific event and as such, the specific event occurred at the geographic location during the first instance of the time period.

In either of the examples, the network device(s) may determine which of the electronic devices previously generated data during the first instance of the time period, an order in which the electronic devices generated the data during the first instance of the time period, and/or the like. For example, and using the example above, the network device(s) may determine that the first time at which the first electronic device generated the fifth data and the second time at which the third electronic device generated the sixth data occurred within the first instance of the time period. Additionally, the network device(s) may determine that the sixth data was generated subsequent to the fifth data (e.g., the third electronic device detected the second motion (and/or the object(s)) after the first electronic device detected the first motion (and/or the object(s))). As such, the network device(s) may determine that the specific event is associated with the first electronic device generating data (e.g., motion data indicating motion) within instances of the time period followed by the third electronic device generating data (motion data indicating motion) within the instances of the time period. The network device(s) may then store data (referred to, in this example, as "ninth data") that associates the specific event with at least the time period and an indication that the first electronic device generates data followed by the second electronic device.

Later, during a second instance of the time period (e.g., during the next day), the network device(s) may receive, at a third time, data (referred to, in this example, as "tenth data") generated by the first electronic device. The tenth data may include third motion data generated by the motion sensor of the first electronic device, where the third motion data indicates that the first electronic device detected third motion of object(s). Additionally, the network device(s) may receive, at a fourth time, data (referred to, in this example, as "eleventh data") generated by the third electronic device. The eleventh data may include fourth motion data generated by the motion sensor of the third electronic device, where the fourth motion data indicates that the third electronic device detected fourth motion of the object(s). Based on receiving the tenth data and the eleventh data, the network device(s) may determine that the third time and the fourth time occurred during the second instance of the time period. In some examples, the network device(s) may further determine that the third electronic device detected the fourth motion (and/or the object(s)) after the first electronic device detected the third motion (and/or the object(s)). Based on the determination(s), the network device(s) may determine that the specific event occurred at the geographic location. The network device(s) may then generate a message indicating that the specific event occurred at the geographic location and transmit the message to the client device.

In some examples, the network device(s) may further use at least a portion of the ninth data to determine that the specific event (and/or a similar event) is occurring at a second geographic location. For example, the network device(s) may store data (referred to, in this example, as "twelfth data") indicating that a second group of electronic devices are located at the second geographic location and/or one or more characteristics associated with the second group of electronic devices. The network device(s) may then receive, at a fifth time, data (referred to, in this example, as "thirteenth data") generated by a fifth electronic device from the second group of electronic devices. The thirteenth data may include fifth motion data generated by a motion sensor of the fifth electronic device, where the fifth motion data indicates that the fifth electronic devices detected fifth motion of object(s). Additionally, the network device(s) may receive, at a sixth time, data (referred to, in this example, as "fourteenth data") generated by a sixth electronic device of the second group of electronic devices. The fourteenth data may include sixth motion data generated by a motion sensor of the sixth electronic device, where the sixth motion data indicates that the sixth electronic device detected sixth motion of the object(s)).

Based on receiving the thirteenth data and the fourteenth data, the network device(s) may determine that the fifth time and the sixth time occurred during an instance of the time period. In some examples, the network device(s) may further determine that the sixth electronic device detected the sixth motion (and/or the object(s)) after the fifth electronic device detected the fifth motion (and/or the object(s)). Based on the determination(s), the network device(s) may determine that the specific event (and/or a similar event) occurred at the second geographic location. The network device(s) may then generate a message indicating that the specific event occurred at the second geographic location. The network device(s) may then transmit the message to a second client device associated with the second group of electronic devices.

The remaining detailed description describes the present embodiments with reference to the drawings. In the drawings, reference numbers label elements of the present embodiments. These reference numbers are reproduced below in connection with the discussion of the corresponding drawing features.

Figure 1B:
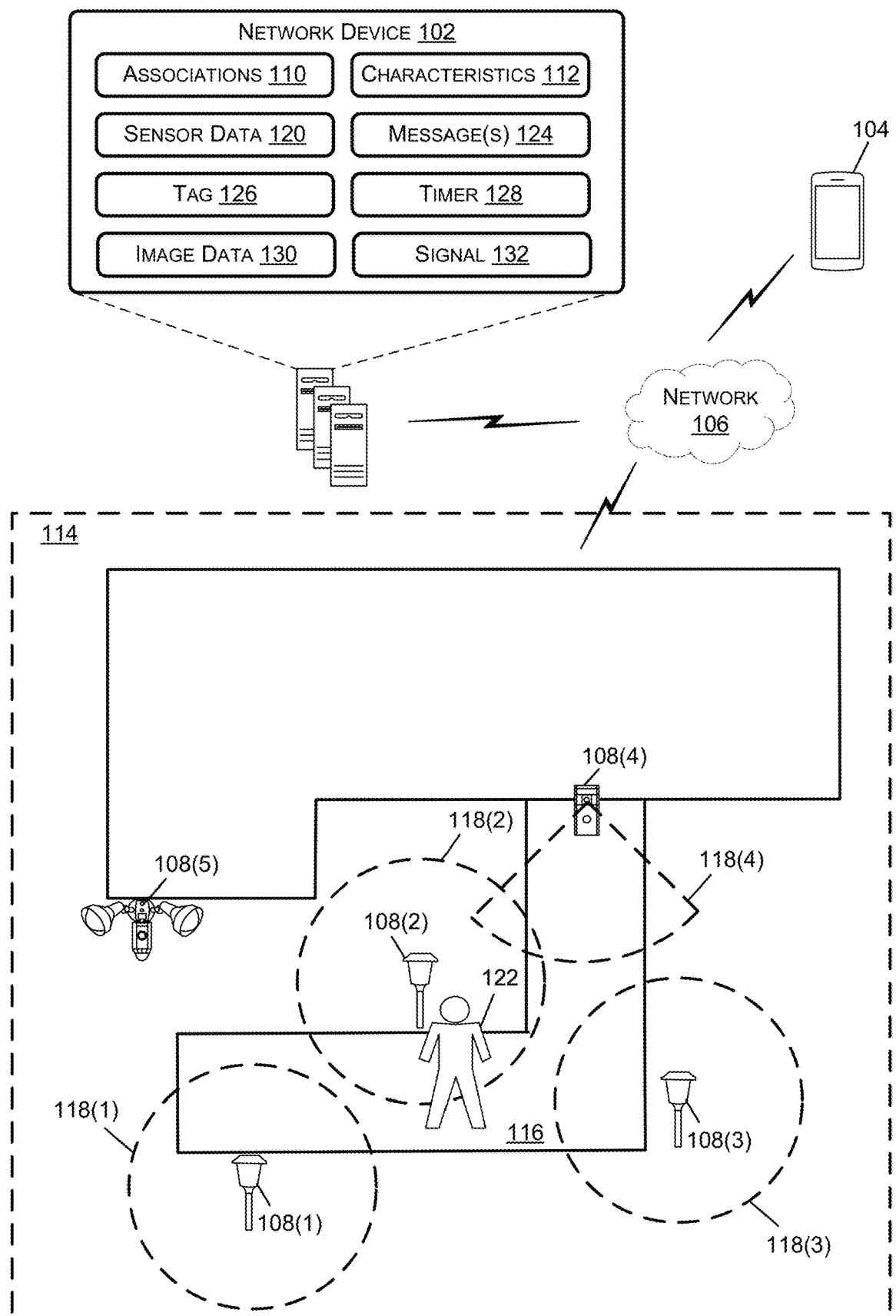

FIGS. 1A-1B are schematic diagrams of an example of a network device(s) 102 receiving sensor data from a group of electronic devices and determining that the sensor data is associated with an event, according to various aspects of the present disclosure. For example, the network device(s) 102 may receive, from a client device 104 and over a network 106, data indicating a group of electronic devices. The group of electronic devices may include at least a first electronic device 108(1) (e.g., a first light emitter that includes a first motion sensor), a second electronic device 108(2) (e.g., a second light emitter that includes a second motion sensor), a third electronic device 108(3) (e.g., a third light emitter that includes a third motion sensor), and a fourth electronic device 108(4) (e.g., a first A/V device), and a fifth electronic device 108(5) (e.g., a second A/V device). The network device(s) 102 may then generate associations 110 between each of the electronic devices 108(1)-(5) included in the group of electronic devices. Additionally, the network device(s) 102 may store data indicating the associations 110.

In some examples, the network device(s) 102 may further receive, from the client device 104 and over the network 106, data indicating one or more characteristics 112 associated with one or more of the electronic devices 108(1)-(5). A characteristic 112 for an electronic device 108(1)-(5) may include, but is not limited to, a type of electronic device (e.g., A/V device, light emitter, etc.), a geographic location of the electronic device, a location of the electronic device with respect to locations other electronic devices, a field of view of a camera of the electronic device, a field of view of a motion sensor of the electronic device, a name (user-defined or otherwise) associated with the electronic device, an order for the electronic device, and/or the like. For example, the characteristics 112 for the first electronic device 108(1) may indicate that the first electronic device 108(1) is located at a property 114, the electronic device 108(1) is the first electronic device along a path 116 to an entrance of the property 114, a first field of view 118(1) of the first motion sensor of the first electronic device 108(1), and/or that the first electronic device 108(1) is a first electronic device in the group of electronic devices. The network device(s) 102 may then store data indicating the one or more characteristics 112 associated with the one or more electronic devices 108(1)-(5).

At a first time, the network device(s) 102 may receive first sensor data 120 generated by the first electronic device 108(1). The first sensor data 120 may include first motion data indicating that the first electronic device 108(1) detected first motion and/or that the first electronic device 108(1) detected an object 122 (e.g., a person). For instance, the first sensor data 120 may indicate that the first electronic device 108(1) detected a change in the field of view of the camera and/or a change in the field of view of the motion sensor). Based on receiving the first sensor data 120, the network device(s) 102 may generate a message 124 indicating that the first electronic device 108(1) (and/or the group of electronic devices) detected the first motion and/or the object 122. The network device(s) may then transmit, over the network 106, the message 124 to the client device 104. Additionally, in some examples, based on receiving the first sensor data 120, the network device(s) 102 may generate an event tag 126 (e.., data) associated with an event.

The event tag may indicate a time (e.g., the first time) at which the first motion and/or the object 122 was detected, the first electronic device 108(1) detected the first motion and/or the object 122, the group of electronic devices detected the first motion and/or the object 122, and/or the like. The network device(s) 102 may then save data indicating an association 110 between the event tag 126 and the first sensor data 120.

Furthermore, in some examples, based on receiving the first sensor data 120, the network device(s) 102 may start a timer 128 for a first period of time. The first period of time may include, but is not limited to, five seconds, thirty seconds, one minute, five minutes, and/or the like. Moreover, in some examples, based on receiving the first sensor data 120, the network device(s) 102 may obtain first image data 130 generated by the fourth electronic device 108(4) (and/or the fifth electronic device 108(5)). For a first example, the network device(s) 102 may transmit, over the network 106, a first signal 132 to the fourth electronic device 108(4) (and/or the fifth electronic device 108(5)), where the first signal 132 causes the fourth electronic device 108(4) (and/or the fifth electronic device 108(5)) to generate and then transmit the first image data 130 to the network device(s) 102. For a second example, the network device(s) 102 may continuously be receiving image data 130 generated the fourth electronic device 108(4) (and/or the fifth electronic device 108(5)). In such an example, the network device(s) 102 may retrieve a portion of the image data 130, such as a portion of the image data 130 that was generated during the first period of time, where the portion of the image data 130 corresponds to the first image data 130. In either example, the network device(s) 102 may store data indicating an association 110 between the first image data 130 and the event tag 126.

As illustrated in the example of FIG. 1B, later, at a second time, the network device(s) 102 may receive, over the network 106, second sensor data 120 generated by the second electronic device 108(2). The second sensor data 120 may include second motion data indicating that the second electronic device 108(2) detected second motion and/or that the second electronic device 108(2) detected the object 122. For instance, the second sensor data 120 may indicate that the second electronic device 108(2) detected a change in the field of view of the camera and/or a change in the field of view of the motion sensor). Based on receiving the second sensor data 120, the network device(s) 102 may determine whether the second sensor data 120 is associated with the event. In some examples, the network device(s) 102 may determine that the second sensor data 120 is associated with the event based on the second time occurring within the first period of time (e.g., determining that the first period of time associated with the timer 128 has yet to elapse). Additionally, or alternatively, in some examples, the network device(s) 102 may determine that the second sensor data 120 is associated with the event based on one or more characteristics 112 associated with the one or more electronic devices 108(1)-(5).

For a first example, characteristic(s) 112 may indicate that the second electronic device 108(2) is to detect motion of objects after the first electronic device 108(1). As such, the network device(s) 102 may determine, based on the first sensor data 120 and the second sensor data 120, that the second electronic device 108(2) detected the second motion (and/or the object 122) after the first electronic device 108(1) detected the first motion (and/or the object 122). Based on the determination, the network device(s) 102 may determine that the second sensor data 120 is associated with event. For a second example, characteristic(s) 112 may indicate that the second electronic device 108(2) is to be the next electronic device to detect motion of objects after the first electronic device 108(1). As such, the network device(s) 102 may determine, based on the first sensor data 120 and the second sensor data 120, that the second electronic device 108(2) detected the second motion (and/or the object 122) after the first electronic device 108(1) detected the first motion (and/or the object 122), without any other of the electronic devices 108(3)-(5) detecting motion (and/or the object 122). Based on the determination, the network device(s) 102 may determine that the second sensor data 120 is associated with event.

For a third example, the network device(s) 102 may determine, based on geographic locations (and/or fields of view 118(1)-(4)) of the electronic devices 108(1)-4), that after the first electronic device 108(1) detects motion of an object, the second electronic device 108(2) should detect motion of the object before any other electronic device 108(3)-(5) detects motion of the object. In some examples, the network device(s) 102 may make the determination based on distances between the electronic devices 108(1)-(5). For instance, the network device(s) 102 may determine a first distance between the first electronic device 108(1) and the second electronic device 108(2) and respective distances between the first electronic device 108(1) and each of the other electronic devices 108(3)-(5). The network device(s) 102 may then determine that the first distance is less than the other respective distances and as such, the second electronic device 108(2) should detected the motion of the object before the other electronic devices 108(3)-(5).

In some examples, the network device(s) 102 may make the determination based on how an object would normally move over the property 114. For example, based on the geographic locations, the network device(s) 102 may determine that an object walking the path 116 would likely be detected by the first electronic device 108(1), followed by the second electronic device 108(2), followed by the third electronic device 108(3), and finally by the fourth electronic device 108(4). For another example, such as if one of the second electronic device 108(2) or the third electronic device 108(3) should detect motion (and/or the object 122) after the first electronic device 108(1), the network device(s) 102 may determine that an object walking the path 166 would likely be detected by the first electronic device 108(1), followed by one of the second electronic device 108(2) or the third electronic device 108(3), and finally followed by the fourth electronic device 108(4). In either example, the network device(s) 102 may determine, based on the first sensor data 120 and the second sensor data 120, that the second electronic device 108(2) detected the second motion (and/or the object 122) after the first electronic device 108(1) detected the first motion (and/or the object 122), without any other of the electronic devices 108(3)-(5) detecting motion (and/or the object 122). Based on the determination, the network device(s) 102 may determine that the second sensor data 120 is associated with event.

The network device(s) 102 may take one or more actions based on determining that both the first sensor data 120 and the second sensor data 120 are associated with the event. In some examples, the network device(s) 102 may cease from transmitting, to the client device 104, an additional message 124 indicating that the second electronic device 108(2) (and/or the group of electronic devices) detected motion. In some examples, the network device(s) 102 may store data indicating an association 110 between the second sensor data 120 and the event tag 126. In some examples, the network device(s) 102 may restart the timer 128 for a second period of time. The second period of time may include, but is not limited to, five seconds, thirty seconds, one minute, five minutes, and/or the like.

Still, in some examples, the network device(s) 102 may obtain second image data 130 generated by the fourth electronic device 108(4) (and/or the fifth electronic device 108(5)). For a first example, the network device(s) 102 may transmit, over the network 106, a second signal 132 to the fourth electronic device 108(4) (and/or the fifth electronic device 108(5)), where the second signal 132 causes the fourth electronic device 108(4) (and/or the fifth electronic device 108(5)) to generate and then transmit the second image data 130 to the network device(s) 102. For a second example, the network device(s) 102 may continuously be receiving image data 130 generated by the fourth electronic device 108(4) (and/or the fifth electronic device 108(5)). In such an example, the network device(s) 102 may retrieve a portion of the image data 130, such as a portion of the image data 130 that was generated during the second period of time, where the portion of the image data 130 corresponds to the second image data 130. In either example, the network device(s) 102 may store data indicating an association 110 between the second image data 130 and the event tag 126.

In some examples, the network device(s) 102 may continue to receive sensor data 120 generated by the electronic device 108(1)-(5) and perform similar processes and techniques to determine whether the sensor data 120 is associated with the event. Based on determining that the sensor data 120 is associated with the event, the network device(s) 102 may store data indicating an association 110 between the sensor data 120 and the event tag 126, restart the timer 128 for a new period of time, and/or store data indicating an association 110 between additional image data 130 generated by the fourth electronic device 108(4) (and/or the fifth electronic device 108(5)) and the event tag 126.

For example, the network device(s) 102 may receive, over the network 106, third sensor data 120 generated by the fourth electronic device 108(4). The third sensor data 130 may include motion data indicating that the fourth electronic device 108(4) detected third motion (and/or the object 122) and/or image data 130 representing the object 122. Based on receiving the third sensor data 120, the network device(s) 102 may perform the processes and techniques above to determine that the third sensor data 120 is associated with the event. The network device(s) 102 may then perform the one or more actions, such as obtaining third image data 130 generated by the fourth electronic device 108(4) (and/or the fifth electronic device 108(5)) and storing data indicating an association 110 between the third image data 130 and the event tag 126. The network device(s) 102 may further store data indicating an association 110 between the third sensor data 120 and the event tag 126, and/or the network device(s) 102 may restart the timer 128 for a third period of time.

In some examples, the network device(s) 102 may determine that the event is no longer occurring. In some examples, the network device(s) 102 may make the determination based on the network device(s) 102 no longer receiving sensor data 120 for a current period of time (e.g., the current time period associated with the timer 128 elapses). In some examples, the network device(s) 102 may make the determination based on receiving sensor data 120 (e.g., image data 130) indicating that the event is no longer occurring. For example, the network device(s) 102 may receive and then analyze image data 130. Based on the analysis, the network device(s) 102 may determine that the object 122 is no longer located on the property 114. In either of the examples, based on determining that the event is no longer occurring, the network device(s) 102 may then perform similar processes and/or techniques for a new event based on later receiving additional sensor data 120 from the electronic devices 108(1)-(5).

In some examples, the network device(s) 102 may receive, from the client device 104 and over the network 106, data indicating a request to view image data 130 and/or sensor data 120 associated with the event. Based on receiving the data, the network device(s) 102 may identify the associations 110 between the image data 130 (e.g., the first image data 130, the second image data 130, etc.) and/or the sensor data 120 (e.g., the first sensor data 120, the second sensor data 120, etc.) and the event tag 126. The network device(s) 102 may then transmit, over the network, the image data 130 and/or the sensor data 120 to the client device 104. In some examples, such as if the first image data 130 and the second image data 130 are generated by different electronic devices 108(4)-(5), the network device(s) 102 may combine (e.g., compile) the first image data 130 and the second image data 130 into a continuous stream of image data 130 (e.g., append the second image data 130 to the end of the first image data 130). For example, the continuous stream of image data 130 may include the first image data 130 followed by the second image data 130. The network device(s) 102 may then transmit the continuous stream of image data 130 to the client device 104.

Additionally, or alternatively, in some examples, if the first image data 130 and the second image data 130 are generated by different electronic devices 108(4)-(5), the network device(s) 102 may analyze the first image data 130 and the second image data 130 to determine which image data 130 better represents the object 122. For example, the network device(s) 102 may determine whether a greater portion of the first image data 130 (e.g., a greater number of pixels) or a greater portion of the second image data 130 (e.g., a greater number of pixels) represents the object 122. In such an example, the network device(s) 102 may determine that the image data 130 that includes a greater portion representing the object 122 better represents the object 122. For another example, the network device(s) 102 may analyze the first image data 130 and the second image data 130 to determine which image data 130 includes a better quality. In such examples, the network device(s) 102 may determine that image data 130 that includes the better quality also better represents the object 122. In either example, the network device(s) 102 may only transmit the image data 130 that better represents the object 122.

In some examples, the network device(s) 102 may use the first sensor data 120, the second sensor data 120, the first image data 130, and/or the second image data 130 to generate a stored event for the property 114. For example, the network device(s) 102 may determine that a specific event occurred at the property 114 during a time period. The time period may include, but is not limited to, days of the year (e.g., March 1, April 7, October 19, etc.) days of the week (e.g., Monday, Tuesday, Wednesday, etc.), time periods of the day (e.g., between 9:00 a.m. and 10:00 a.m., between 1:00 p.m. and 5:00 p.m., etc.), and/or the like. For a first example, an instance of the time period may include the first time that the first sensor data 120 was generated by the first electronic device 108(1) and the second time that the second image data 120 was generated by the second electronic device 108(2). For a second example, an instance of the time period may include the first period of time and the second period of time.

In some examples, the network device(s) 102 may determine that the specific event occurred based on receiving, from the client device 104 and over the network 106, data indicating that the specific event occurred during the time period. For example, the data may indicate that a person walked up the path 116 to the structure during the time period. Additionally, or alternatively, in some examples, the network device(s) 102 may determine that the specific event occurred based on analyzing image data 130 that was generated during the time period. For example, the network device(s) 102 may analyze the image data 130 (e.g., the first image data 130, the second image data 130, etc.) to determine that the image data 130 represent a type of object 122, such as a person. The network device(s) 102 may then determine that the specific event includes the type of object located on the property 114. Additionally, in some examples, the network device(s) 102 may analyze the image data 130 to determine that the image data 130 represents the object 122 performing an action, such as walking up the path 116 to the structure. In such examples, the network device(s) 102 may determine that the specific event includes the object 122 (and/or type of object) performing the action.

In either of the examples, the network device(s) 102 may determine that the first electronic device 108(1) generated the first sensor data 120, the second electronic device 108(2) generated the second sensor data 120, and so on during the time period. The network device(s) 102 may then determine that the specific event is associated with the first electronic device 108(1) generating sensor data 120, the second electronic device 108(2) generating sensor data 120, and so on during the time period. Furthermore, in some examples, the network device(s) 102 may determine an order in which the electronic devices 108(1)-(5) generated by sensor data 120. For example, the network device(s) 102 may determine that the first electronic device 108(1) generated the first sensor data 120, followed by the second electronic device 108(2) generating the second sensor data 120, and so on during the time period. In such examples, the network device(s) 102 may determine that the specific event is associated with the first electronic device 108(1) generating sensor data 120, followed by the second electronic device 108(2) generating sensor data 120, and so on during the time period. The network device(s) 102 may then store data indicating an association 110 between the specific event, the first electronic device 108(1), the second electronic device 108(2), any other electronic devices 108(3)-(5) that generated sensor data 120, the order in which the electronic devices 108(1)-(5) generated sensor data 120, and/or the time period.

Later, during an instance of the time period (e.g., during the time period, but the next day), the network device(s) 102 may receive, at a third time, third sensor data 120 generated by the first electronic device 108(1). The third sensor data 120 may include third motion data indicating that the first electronic device 108(1) detected third motion and/or that the first electronic device 108(1) detected an object (which may include the object 122). Additionally, the network device(s) 102 may receive, at a fourth time, fourth sensor data 120 generated by the second electronic device 108(2). The fourth sensor data 120 may include fourth motion data indicating that the second electronic device 108(2) detected fourth motion and/or that the second electronic device 108(2) detected the object. Based on receiving the third sensor data and/or the fourth sensor data, the network device(s) 102 may determine that the third time and the fourth time occurred during the instance of the time period. In some examples, the network device(s) 102 may further determine that the second electronic device 108(2) detected the third motion (and/or the object) after the first electronic device 108(1) detected the fourth motion (and/or the object). Based on the determination(s), the network device(s) 102 may determine that the specific event is occurring at the property 114. The network device(s) 102 may then generate a message 124 indicating that the event occurred at the property 114, such as a person walked up the path 116 to the structure. The network device(s) 102 may then transmit, over the network 106, the message 124 to the client device 104.

Even though the example of FIGS. 1A-1B includes the electronic devices 108(1)-(3) as including light emitters, in other examples, one or more of the electronic devices 108(1)-(3) may include a different type of device. For example, one or more of the electronic devices 108(1)-(3) may include a standalone motion sensor located near the path 116 and/or a different type of electronic device that includes a motion sensor and/or camera for detected motion of an object.

Figure 2:
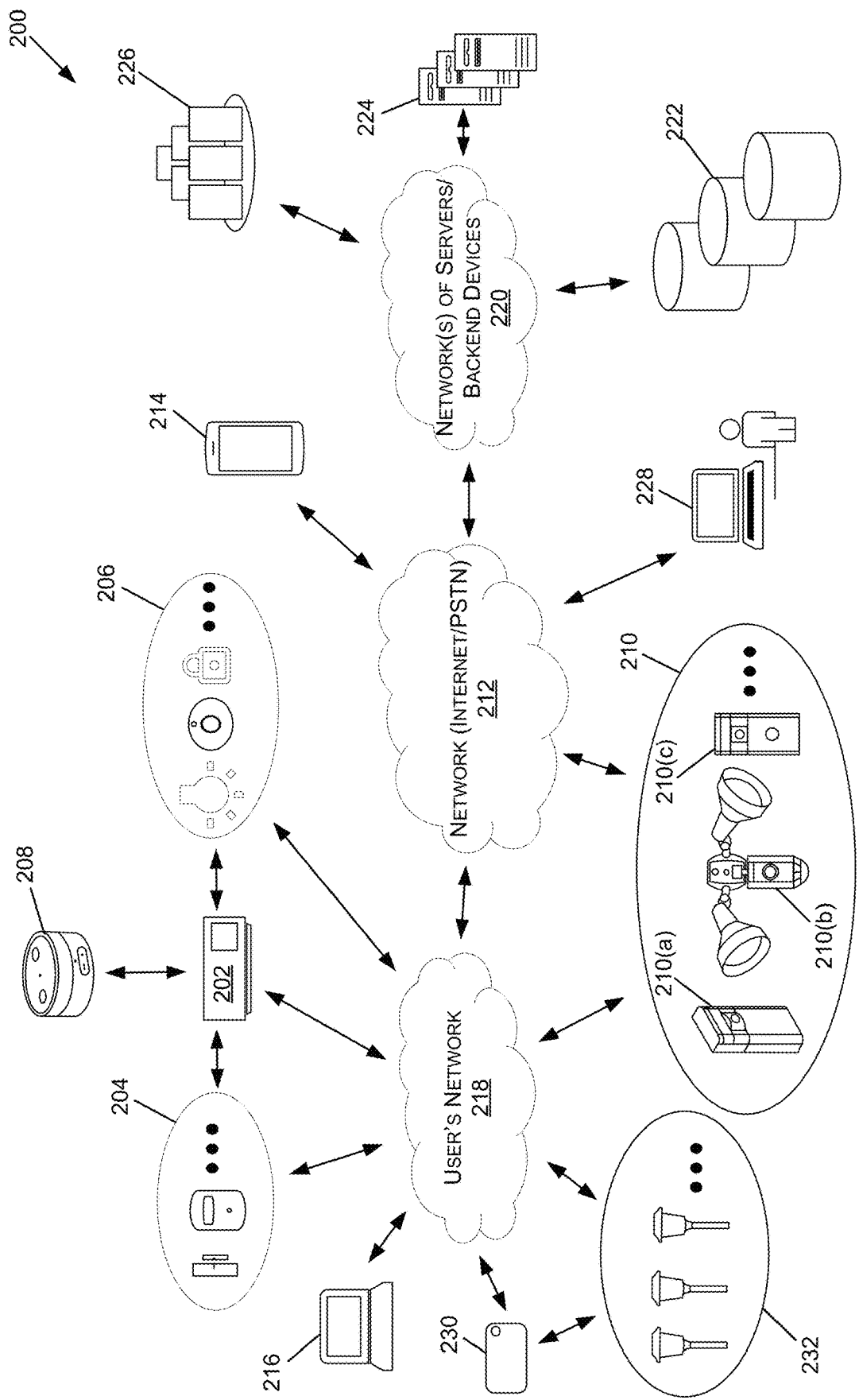
FIG. 2 is a functional block diagram illustrating a system for communicating in a network, according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., homeowners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, electronic device(s) 230 (although only one is shown for clarity reasons), light emitters 232, when remotely monitored and controlled via a network (Internet/a public switched telephone network (PSTN)) 212, may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system 200 may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, the electronic device(s) 230, the light emitters 232, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively be referred to herein as "A/V devices 210" or "A/V device 210") (which may represent, and/or be similar to, the fourth electronic device 108(4) and/or the fifth electronic device 108(5)). The A/V devices 210 may include security cameras 210(a), light cameras 210(b) (e.g., floodlight cameras, spotlight cameras, etc.), A/V doorbells 210(c) (e.g., wall powered and/or battery powered A/V doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device(s)), may comprise any device that facilitates communication with and control of the sensors 204, automation devices 206, the VA device 208, the electronic device(s) 230, the light emitters 232, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, the electronic device(s) 230, the light emitters 232, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, the electronic device(s) 230, the light emitters 232, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, the electronic device(s) 230, the light emitters 232, or the A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound.

Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The VA device 208, the hub device 202, and/or the combination thereof may be configured to communicate with the A/V devices 210 in response to inputs (e.g., voice inputs, touch inputs, etc.) from users. For example, the VA device 208, the hub device 202, and/or the combination thereof may receive an input indicating a request to turn on the exterior lights (e.g., the light emitter(s) 232). The VA device 208, the hub device 202, and/or the combination thereof may then generate and transmit data representative of the input to the A/V device(s) 210 over the first network. In some examples, the data representative of the input is transmitted to the A/V device(s) 210 over the first network and/or the network (Internet/PSTN) 212 via the backend server(s) 224. In other examples, the data representative of the input is transmitted directly to the A/V device(s) 210 over the first network.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices. In some examples, the electronic device(s) 230 and/or the light emitters 232 may be considered automation devices and/or may be considered part of an automation device or system (e.g., an outdoor lighting system, an indoor lighting system, and indoor/outdoor lighting system, etc.).

As described herein, in some of the present embodiments, some or all of the client devices 214, 216, the A/V device(s) 210, the smart-home hub device 202, the VA device 208, the sensors 204, the automation devices 206, the electronic device(s) 230, and the light emitters 232, may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client device 104). The client devices 214, 216 may communicate with and/or be associated with (e.g., capable of access to and control of) the A/V devices 210, a smart-home hub device 202, the VA device 208, sensors 204, automation devices 206, the electronic device(s) 230, and/or the light emitters 232. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, the electronic device(s) 230, the light emitters 232, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend server(s)s 224, and one or more backend application programming interfaces (APIs) 226. While FIG. 2 illustrates the storage device 222, the backend server(s) 224, and the backend API 226 as components separate from the network 220, it is to be understood that the storage device 222, the backend server(s) 224, and/or the backend API 226 may be considered to be components of the network 220. For example, the network 220 may include a data center with a plurality of computing resources used to implement the storage device 222, the backend server(s) 224, and the backend API 226.

The backend server(s) 224 may comprise a computer program or other computer executable code that, when executed by processor(s) of the backend server(s) 224, causes the backend server(s) 224 to wait for requests from other computer systems or software (clients) and provide responses. In an embodiment, the backend server(s) 224 shares data and/or hardware and/or software resources among the client devices 214, 216. This architecture is called the client-server model. The client devices 214, 216 may run on the same computer or may connect to the backend server(s) 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server(s) 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

With further reference to FIG. 2, the system 200 may also include a security monitoring service 228. The security monitoring service 228 may be operated by the same company that manufactures, sells, and/or distributes the A/V devices 210, the hub device 202, the VA device 208, the electronic device(s) 230, the light emitters 232, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the electronic device(s) 230, the light emitters 232, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, turn on and off one or more of the light emitters 232, etc.). For example, the security monitoring service 228 may operate and control their own client devices and/or network of servers/backend devices for monitoring and/or controlling security systems. In such an example, the A/V devices 210, the hub device 202, the VA device 208, the electronic device(s) 230, the light emitters 232, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend server(s)s/backend devices 220).

The system 200 may also include the electronic device(s) 230. The electronic device(s) 230 may be configured to control the light emitters 232 (which may represent, and/or be similar to, the first electronic device 108(1), the second electronic device 108(2), and/or the third electronic device 108(3)) using conditions set by a user. The light emitters 232 may include pathway lights, walkway lights, floodlights, spotlights, security lights, dome lights, entryway lights, garden lights, outdoor lights, indoor lights, landscape lighting, accent lighting, wall sconces, bullets, globes, and/or any other type of light emitter.

In some examples, the light emitters 232 may include at least a first type of light emitter 232, a second type of light emitter 232, and a third type of light emitter 232. The first type of light emitters 232 may be configured to receive power from the electronic device(s) 230. To control the first type of light emitters 232, the electronic device(s) 230 may begin to provide power to the first type of light emitters 232 to activate (e.g., turn on, cause to emit light, etc.) the first type of light emitters 232 and cease providing the power the deactivate (e.g., turn off, cause to cease emitting the light, etc.) the first type of light emitters 232. Additionally, the second type of light emitters 232 may be configured to receive power from the electronic device(s) 230. To control the second type of light emitters 232, the electronic device(s) 230 (and/or other electronic devices, such as the A/V devices 210) may transmit first control signals to the second type of light emitters 232 that are configured to cause the second type of light emitters 232 to activate, and transmit second control signals to the second type of light emitters 232 that are configured to cause the second type of light emitters 232 to deactivate. Furthermore, the third type of light emitters 232 may be configured to receive power from a source that is external to the electronic device(s) 230, such as a battery. To control the third type of light emitters 232, the electronic device(s) 230 (and/or other electronic devices, such as the A/V devices 210) may transmit first control signals to the third type of light emitters 232 that are configured to cause the third type of light emitters 232 to activate, and transmit second control signals to the third type of light emitter 232 that are configured to cause the third type of light emitters 232 to deactivate.

In some examples, the light emitters 232 may include one or more sensors. For example, the light emitters 232 may include motion sensors capable of detecting and communicating the presence of an object within their field of view. For example, the motion sensors may include one or more (alone or in combination) different types of motion sensors. For example, in some embodiments, the motion sensors may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared to one or more threshold voltage values to determine if the amount of voltage in the output signal is indicative of motion, and/or if the amount of voltage in the output signal is indicative of motion of an object. Although the above discussion of the motion sensors primarily relates to PIR sensors, depending on the embodiment, the motion sensors may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensors.

Although not illustrated in FIG. 2 for clarity reasons, in some examples, the system 200 may further include A/V device(s), sensor(s), automation device(s), VA device(s), hub device(s), client device(s), electronic device(s), and/or light emitter(s) associated with other user's networks. For example, A/V device(s) 210, sensor(s) 204, automation device(s) 206, VA device(s) 208, hub device(s) 202, client device(s) 214, 216, electronic device(s) 230, and/or light emitter(s) 232 may be associated with a first user and/or first geographic location, and other A/V device(s), sensor(s), automation device(s), VA device(s), hub device(s), client device(s), electronic device(s), and/or light emitter(s) may be associated with one or more other users and/or one or more other geographic locations.

Figure 3:
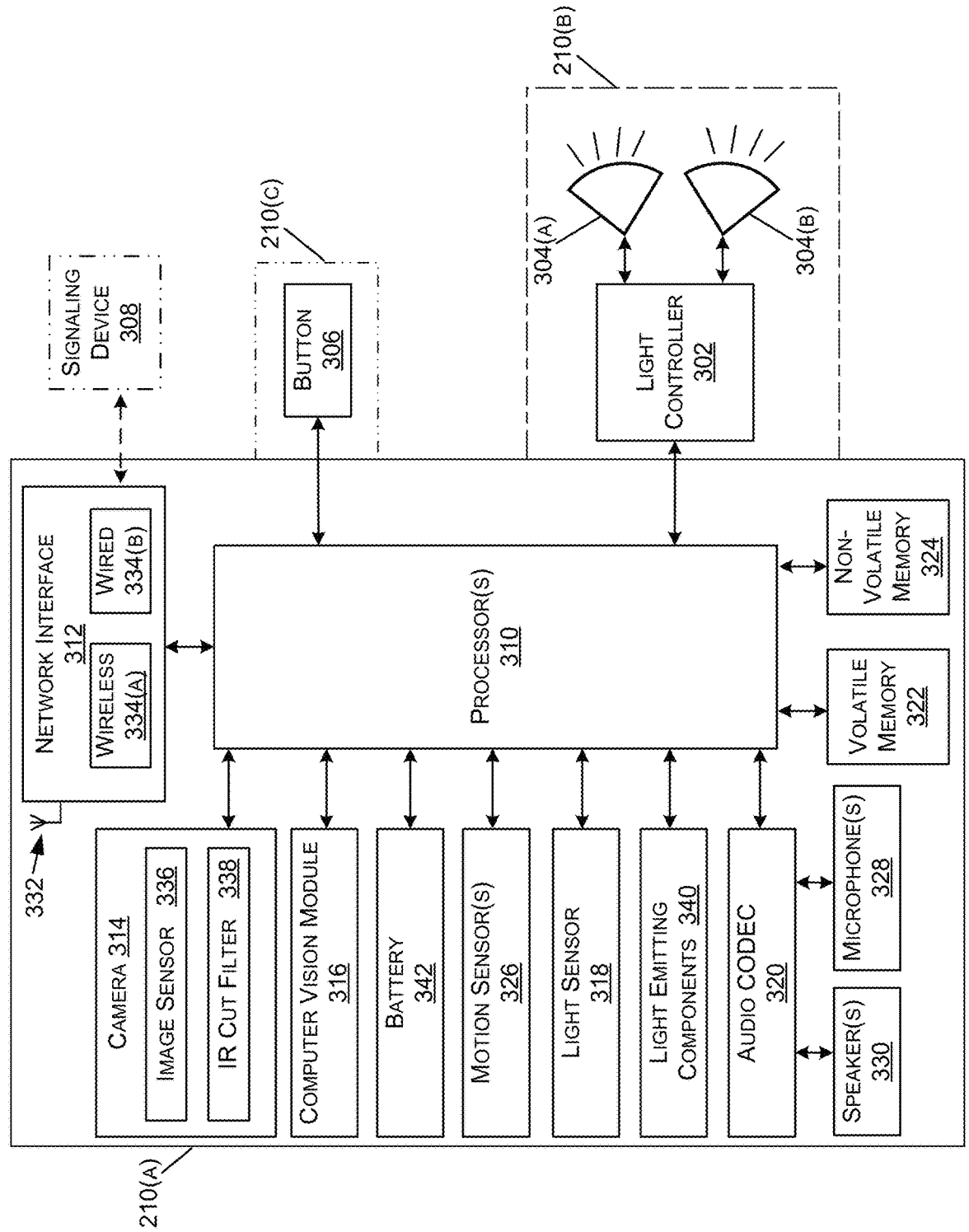
FIG. 3 is a functional block diagram of an example A/V recording and communication device, according to various aspects of the present disclosure.

FIG. 3 is a functional block diagram for an A/V device 210 according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the A/V doorbell 210(c), which may include some or all of the components of the security camera 210(a) in addition to a touch surface(s) 306, and in some embodiments, a connection to a signaling device 308 (e.g., a pre-installed signaling device, such as a wired signaling device, and/or a wireless signaling device, connected over Wi-Fi, BLE, or another wireless communication protocol).

With further reference to FIG. 3, the A/V device 210 may include a processor(s) 310, a network interface 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the network interface 312, and may perform various functions as described in the present disclosure. In various embodiments, when the processor(s) 310 is triggered by the motion sensor(s) 326, the camera 314, the speaker(s) 330, the microphone(s) 328, the network interface 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the network interface 312 and the camera 314.

With further reference to FIG. 3, the network interface 312 may comprise an integrated circuit including a processor core, memory, and programmable input/output peripherals. The network interface 312 may be operatively connected to the processor(s) 310. In some embodiments, the network interface 312 is configured to handle communication links between the A/V device 210 and other, external devices, external receivers, external transmitters, and/or external transceivers, and to route incoming/outgoing data appropriately. For example, inbound data from an antenna 332 of the network interface 312 may be routed through the network interface 312 before being directed to the processor(s) 310, and outbound data from the processor(s) 310 may be routed through the network interface 312 before being directed to the antenna 332 of the network interface 312. As another example, the network interface 312 may be configured to transmit data to and/or receive data from a remote network device(s) (e.g., one or more components of the network(s) of servers/backend devices 220 described in FIG. 2). The network interface 312 may include wireless 334(a) and wired 334(b) adapters. For example, the network interface 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The network interface 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The network interface 312 may also include the capability of communicating over wired connections, such as with a signaling device 308. For example, when the button 306 of the video doorbell 210(c) is pressed, the network interface 312 may be triggered to perform one or more functions, such as to transmit a signal over the wired 334(b) connection to the signaling device 308 (although, in some embodiments, the signal be transmitted over a wireless 334(a) connection to the signaling device) to cause the signaling device 308 to emit a sound (e.g., a doorbell tone, a user customized sound, a ringtone, a seasonal ringtone, etc.). The network interface 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the network interface 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the network interface 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the network interface 312 to the network 212 via the user's network 218, routed by the backend server(s) 224 and/or the backend API 226 and delivered to the client device(s) 214, 216 as described above in connection with FIG. 2. When the user speaks, after being transferred through the network 212, the user's network 218, and the network interface 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current)

power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3A, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an object within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an object that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of object (e.g., person, animal, vehicle, parcel, etc.), a direction of movement of the object, a distance of the object from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3A, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3A, the CVM 316, and/or the camera 314 and/or the processor(s) 310 may receive information about the person using any one, or any combination of more than one, of the foregoing biometrics.

Again, with reference to FIG. 3A, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 302 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

Although the A/V device 210 is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
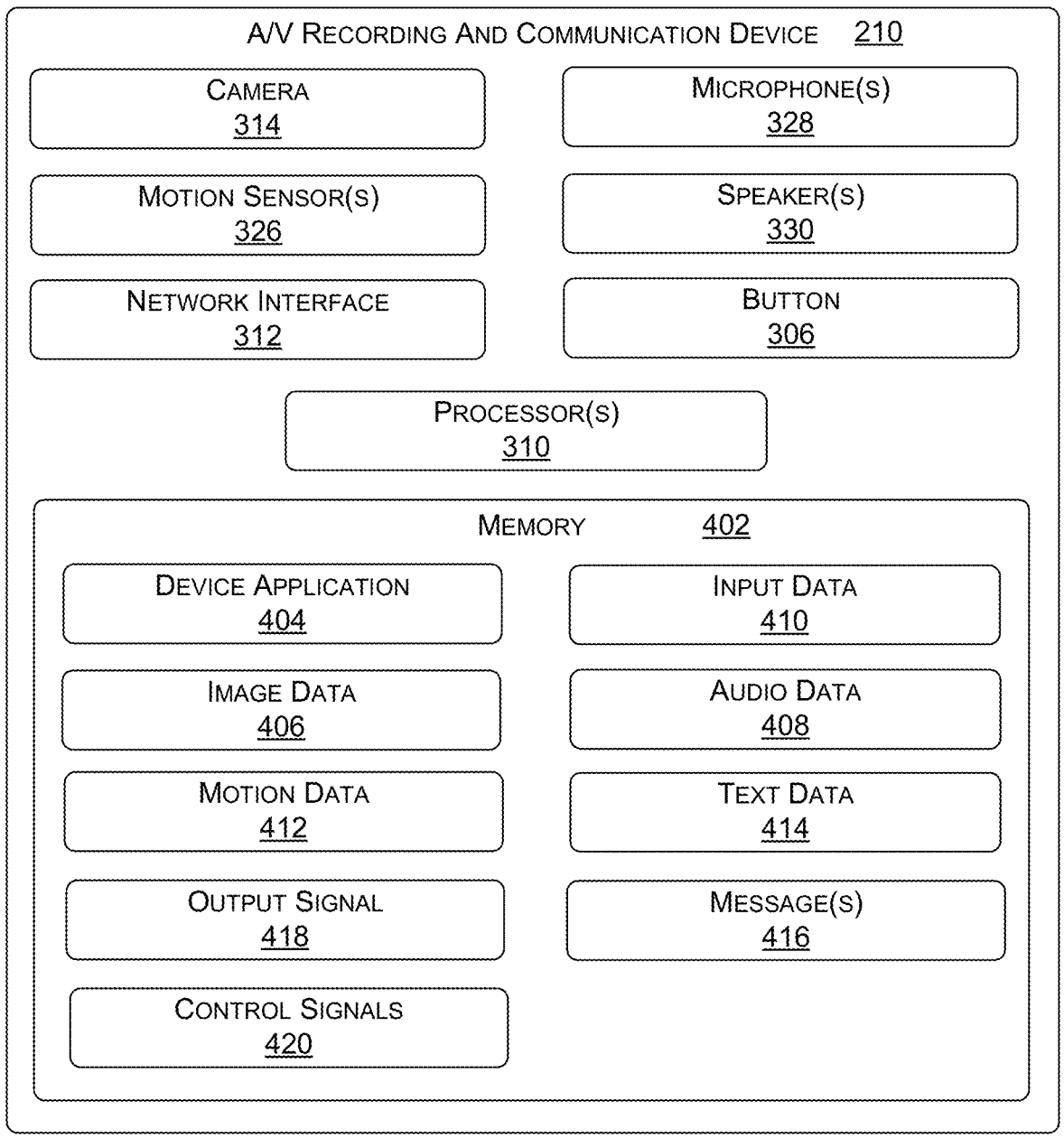
FIG. 4 is a functional block diagram illustrating an example embodiment of an A/V recording and communication device, according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may include instructions that, when executed by the processor(s) 310, cause the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also include instructions that, when executed by the processor(s) 310, cause the processor(s) 310 to generate text data 414 describing the image data 406, the audio data 408, and/or the input data 410, such as in the form of metadata, for example.

In addition, the device application 404 may include instructions that, when executed by the processor(s) 310, cause the processor(s) 310 to transmit the image data 406, the audio data 408, the motion data 412, the input data 410, the text data 414, and/or message(s) 416 to the client devices 214, 216, the hub device 202, and/or the backend server(s) 224 using the network interface 312. In various embodiments, the device application 404 may also include instructions that, when executed by the processor(s) 310, cause the processor(s) 310 to generate and transmit an output signal 418 that may include the image data 406, the audio data 408, the text data 414, the input data 410, and/or the motion data 412. In some of the present embodiments, the output signal 418 may be transmitted to the backend server(s) 224 and/or the hub device 202 using the network interface 312. The backend server(s) 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server(s) 224, and the backend server(s) 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314. The image data 406 may be representative of (e.g., depict) a physical environment in a field of view of the camera 314. In some embodiments, the physical environment may include one or more objects (e.g., persons, vehicles, animals, items, etc.), and the image data 406 may be representative of the one or more objects, such as the one or more objects within the physical environment.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present. In some instances, the motion data 412 is generated based on the A/V device 210 detecting a change in the field of view of the camera 314 and/or a change in the field of view of the motion sensor(s) 326.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the network interface 312, to the client device 214, 216, the backend server(s) 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the backend server(s) 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server(s) 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected, in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

In some examples, such as when the A/V device 210 is not continuously transmitting the image data 406, the A/V device 210 may generate and/or transmit image data 406 based on receiving control signals 420. For example, the A/V device 210 may receive, using the network interface 312, a first control signal 420 from the backend server(s) 224, the hub device 202, and/or the client device 214, 216. If the A/V device 210 is not already generating image data 406, the first control signal 420 may cause the A/V device 210 to generate the image data 406. For example, the first control signal 420 may include a first command to generate the image data 406. In some examples, the first control signal 420 may further include a second command to generate the image data 406 for a first period of time. The first period of time may include, but is not limited to, five seconds, thirty seconds, one minute, five minutes, and/or the like.

Additionally, the first control signal 420 may cause the A/V device 410 to transmit the image data 406. For example, the first control signal 420 may include a third command to transmit the image data 406, such as to the backend server(s) 224, the hub device 202, and/or the client device 214, 216. In some examples, the first control signal 420 may include a fourth command to transmit the image data 406 for the first period of time. Based on receiving the first control signal 420, the A/V device 210 may begin generating the image data 406 (e.g., for the first period of time) and/or begin transmitting, using the network interface 312, the image data 406 to the backend server(s) 224, the hub device 202, and/or the client device 214, 216 (e.g., for the first period of time).

In some examples, such as while transmitting the image data 406 during the first period of time, the A/V device 210 may receive, using the network interface 312, a second control signal 420 from the backend server(s) 224, the hub device 202, and/or the client device 214, 216. The second control signal 420 may cause the A/V device 210 to continue generating and/or transmitting the image data 406 (e.g., referred to, in some examples, as "second image data 406"). For example, the second control signal 406 may include a first command to continue generating the image data 406. In some examples, the second control signal 420 may include a second command to continue generating the image data 406 for a second period of time. The second period of time may include, but is not limited to, five seconds, thirty seconds, one minute, five minutes, and/or the like.

Additionally, the second control signal 420 may include a third command to continue transmitting the image data 406 to the backend server(s) 224, the hub device 202, and/or the client device 214, 216. In some examples, the second control signal 420 may include a fourth command to continue transmitting the image data 406 for the second period of time. Based on receiving the second control signal 420, the A/V device 210 may continue generating the image data 406 (e.g., for the second period of time) and/or continue transmitting, using the network interface 312, the image data 406 to the backend server(s) 224, the hub device 202, and/or the client device 214, 216 (e.g., for the second period of time).

In some examples, the A/V device 210 may receive one or more additional control signals 420 that cause the A/V device 210 to continue generating the image data 406 (e.g., for a new period of time) and/or continue transmitting the image data 406 (e.g., for a new period of time). In some examples, the A/V device 210 may then cease from generating and/or transmitting the image data 406 based on the current period of time elapsing without receiving an additional control signal 420. In some examples, the A/V device 210 may cease from generating and/or transmitting the image data 406 based on receiving, using the network interface 312, an additional control signal 420 from the backend server(s) 224, the hub device 202, and/or the client device 214, 216, where the additional control signal 420 includes a command to cease from generating and/or transmitting the image data 406.

Figure 5:
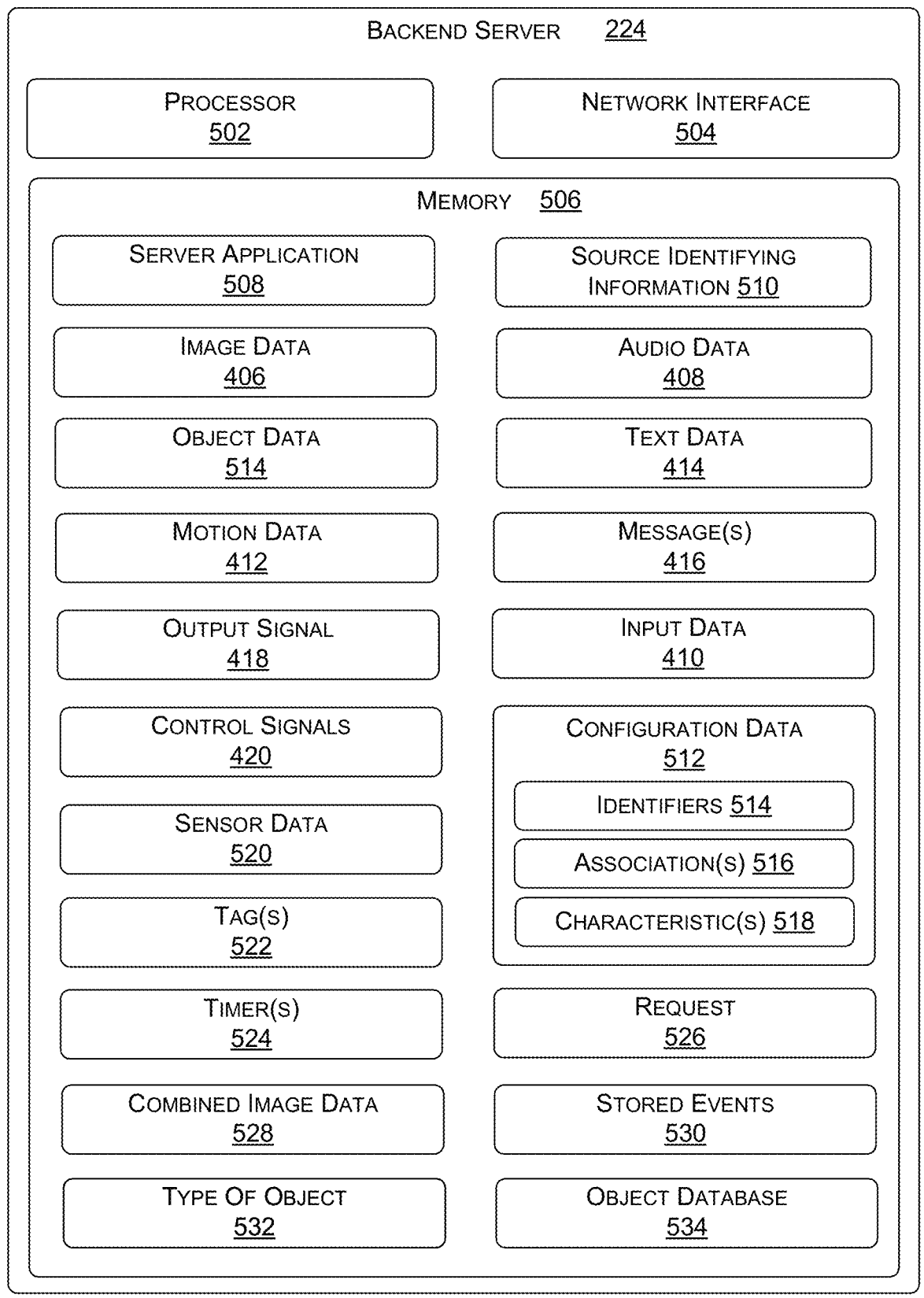
FIG. 5 is a functional block diagram illustrating an example embodiment of a backend device, according to various aspects of the present disclosure.

FIG. 5 is a functional block diagram illustrating one embodiment of the backend server(s) 224, according to various aspects of the present disclosure. The backend server(s) 224 may comprise processor(s) 502 (which may be similar to, and/or include similar functionality as, the processor(s) 310), a network interface 504 (which may be similar to, and/or include similar functionality as, the network interface(s) 312), and a memory 506 (which may be similar to, and/or include similar functionality as, the memory 402). The network interface 504 may allow the backend server(s) 224 to access and communicate with devices connected to the network (Internet/PSTN) 212 (e.g., the A/V device 210, the hub device 202, the client devices 214, 216, a device controlled by the security monitoring service 228, the electronic device(s) 230, the light emitters 232, etc.).

The memory 506 may include a server application 508. The server application 508 may include instruction that, when executed by the processor(s) 502, cause the processor(s) 502 to receive and/or retrieve the audio data 408, the text data 414, the input data 410, the messages 416, the image data 406, the motion data 412, the input data 410 from the A/V device 210 (e.g., in the output signal 418), the client device 214, 216, and/or the hub device 202. The server application 508 may also include instructions that, when executed by the processor(s) 502, cause the processor(s) 502 to transmit (and/or forward) the audio data 408, the text data 414, the input data 410, the messages 416, the image data 406, the motion data 412, the input data 410 to the client devices 214, 216 using the network interface 504.

Although referred to as the backend server(s) 224 with reference to the processes described herein, the backend server(s) 224 may additionally, or alternatively, include one or more of the devices from the network(s) of servers/backend devices 220. For example, the processes described herein with respect to the backend server(s) 224 may additionally, or alternatively, at least in part, be performed by one or more backend APIs 226.

In further reference to FIG. 5, the memory 506 may also include source identifying data 510 that may be used to identify the A/V device 210, the hub device 202, the client devices 214, 216, the electronic device(s) 230, the light emitters 232, the sensors 204, and/or the automation devices 206. In addition, the source identifying data 510 may be used by the processor(s) 502 of the backend server(s) 224 to determine the client devices 214, 216 are associated with the A/V device 210, the electronic device(s) 230, the light emitters 232, the sensors 204, and/or the automation devices 206.

In some embodiments, the server application 508 may further include instructions that, when executed by the processor(s) 502, cause the processor(s) 502 to generate and transmit a report signal (not shown) to a third-party client device, which may be associated with a law enforcement agency or the security monitoring service 228, for example. The report signal, which may be the message 416, in some examples, may include the image data 406, the audio data 408, and/or the text data 414.

As described herein, at least some of the processes of the A/V device 210, the hub device 202, and/or the client device 214, 216 may be executed by the backend server(s) 224. For example, the backend server(s) 224 may receive, using the network interface 504, configuration data 512 from the client device 214, 216. The configuration data 512 may include at least identifiers 514 of electronic devices, association(s) 516 between the electronic devices, and characteristic(s) 518 associated with the electronic devices. An identifier 514 for an electronic device may include, but is not limited to, an Internet Protocol (IP) address, a media access control (MAC) address, a numerical identifier, an alphabetic identifier, a mixed numerical and alphabetic identifier, and/or any other type of identifier that may be used to identify the electronic device. In some examples, the identifiers 514 may further indicate the types of electronic devices. For example, the identifier 514 for the electronic device may indicate that the electronic device includes an A/V device 210, a sensor 204 (e.g., motion sensor, light sensor, etc.), an automation device 206 (e.g., door lock, window lock, etc.), an electronic device 230, a light emitter 232, and/or the like.

An association 516 (which may be similar to, and/or represent, an association 110) may indicate that an electronic device is associated with at least one other electronic device. For a first example, an association 516 may indicate that an A/V device 210 is associated with one or more light emitters 232. For a second example, an association 516 may indicate that a light emitter 232 is associated with one or more other light emitters 232. In some examples, the backend server(s) 224 uses the association(s) 516 to group electronic devices together. For example, the backend server(s) 224 may identify a group of electronic devices based on the electronic devices including association(s) 516 with one another.

A characteristic 518 (which may similar to, and/or represent, a characteristic 112) for an electronic device may include, but is not limited to, a type of electronic device (e.g., similar to the identifier 514), a geographic location of the electronic device, a location of the electronic device with respect to locations of other electronic device(s), a field of view of a camera of the electronic device, a field of view of a motion sensor of the electronic device, an order for the electronic device, and/or the like. The geographic location may include, but is not limited to, an address, GNSS coordinates, GPS coordinates, a state, a city, a town, and/or the like of where the electronic device is located. For example, the geographic location may include the address at which the electronic device is located and/or installed.

The location of the electronic device with respect to locations of other electronic device(s) may include, but is not limited to, a distance between the electronic device and the other electronic device(s), indications of other electronic device(s) that are located within a similar portion of a property as the electronic device (e.g., based on names of the devices, based on numbering of the devices, based on analysis of image data including the devices within a field of view of a A/V device, etc.), where the electronic device is located when the electronic device is included in a grouping of electronic devices along a portion of the property, ordering of the electronic device(s) (e.g., based on names or numbers associated with the electronic device(s), such as light 1, light 2, motion sensor 3, etc.), orientation of the electronic device(s), and/or the like. For a first example, the location of the electronic device with respect to locations of other electronic device(s) may indicate that the electronic device is located five feet from a second electronic device, ten feet from a third electronic device, and so forth. For a second example, the location of the electronic device with respect to locations of other electronic device(s) may indicate that the electronic device and at least one other electronic device are located in the front of the property, the backyard of the property, along a pathway of the property, along the driveway of the property, and/or the like. For a third example, the location of the electronic device with respect to locations of other electronic device(s) may indicate that there is a grouping of five electronic devices aligned along a pathway, where the electronic device is the second electronic device within the group.

An order and/or orientation for the electronic device may indicate that, when the group of electronic devices detects an object, the electronic device should be the first, second, third, fourth, fifth, and/or so forth electronic device to detect the object. For example, a group of electronic devices may include five electronic devices aligned along a pathway to an entrance of the property, where the electronic device is the closest electronic device to the entrance. As such, the order may indicate that the electronic device is to be the fifth electronic device to detect the object when the object is approaching the entrance. In some examples, the backend server(s) 224 may determine that the object is approaching the entrance based on the farthest electronic device from the entrance detecting the object first. Additionally, the order may indicate that the electronic device is to be the first electronic device to detect the object when the object is moving away from the entrance. In some examples, the backend server(s) 224 may determine that the object is moving away from the entrance based on the closest electronic device to the entrance (e.g., the electronic device) detecting the object first.

As further illustrated in FIG. 5, the backend server(s) 224 may receive, using the network interface 504, sensor data 520 (which may be similar to, and/or represent, sensor data 120) from the electronic devices. For example, at a first time, the backend server(s) 224 may receive first sensor data 520 generated by a first electronic device. The first sensor data 520 may include first motion data indicating that the first electronic device detected first motion and/or that the first electronic device detected object(s). Based on receiving the first sensor data 520, the backend server(s) 224 may generate a message 416 indicating that the first electronic device (and/or the group of electronic devices) detected the first motion and/or detected the object(s). The backend server(s) 224 may then transmit, using the network interface 504, the message 416 to the client device 214, 216. Additionally, in some examples, based on receiving the first sensor data 520, the backend server(s) 224 may generate an event tag 126 (e..., data) associated with an event. The event tag 522 may indicate a time (e.g., the first time) at which the first motion and/or the object(s) were detected, the first electronic device detected the first motion and/or the object(s), the group of electronic devices detected the first motion and/or the object(s), a length of time that the first electronic device detected the first motion and/or the object(s), a length of time that the group of electronic devices detected motion and/or the object(s) (e.g., the first period of time, the second period of time, and so forth described below), and/or the like. The backend server(s) 224 may then associate with first sensor data 520 with the event tag 522.

Furthermore, in some examples, based on receiving the first sensor data 520, the backend server(s) 224 may start a timer 524 for a first period of time. The first period of time may include, but is not limited to, five seconds, thirty seconds, one minute, five minutes, and/or the like. Moreover, in some examples, based on receiving the first sensor data 520, the backend server(s) 224 may obtain first image data 406 generated by an A/V device 210 (which may include the first electronic device). For a first example, the backend server(s) 224 may transmit, using the network interface 504, a control signal 420 to the A/V device 210, where the control signal 420 causes the A/V device 210 to generate and/or transmit the first image data 406. The backend server(s) 224 may then receive, using the network interface 504, the first image data 406 from the A/V device 210. For a second example, the backend server(s) 224 may continuously be receiving image data 406 generated by the A/V device 210. In such an example, the backend server(s) 224 may retrieve a portion of the image data 406, such as a portion of the image data 406 that was generated during the first period of time, where the portion of the image data 406 corresponds to the first image data 406. In either example, the backend server(s) 224 may associate the first image data 406 with the event tag 522.

Later, at a second time, the backend server(s) 224 may receive, using the network interface 504, second sensor data 520 generated by a second electronic device. The second sensor data 520 may include second motion data indicating that the second electronic device detected second motion and/or that the second electronic device detected the object(s). Based on receiving the second sensor data 520, the backend server(s) 224 may determine whether the second sensor data 520 is associated with the event. In some examples, the backend server(s) 224 may determine that the second sensor data 520 is associated with the event based on the second time occurring within the first period of time (e.g., determining that the timer 524 has yet to elapse). Additionally, or alternatively, in some examples, the backend server(s) 224 may determine that the second sensor data 520 is associated with the event based on at least the one or more characteristics 518 associated with the one or more electronic devices.

For a first example, characteristic(s) 518 may indicate that the second electronic device is to detect motion of object(s) after the first electronic device. As such, the backend server(s) 224 may determine, based on the first sensor data 520 and the second sensor data 520, that the second electronic device detected the second motion (and/or the object(s)) after the first electronic device detected the first motion (and/or the object(s)). Based on the determination, the backend server(s) 224 may determine that the second sensor data 520 is associated with event. For a second example, characteristic(s) 518 may indicate that the second electronic device is to be the next electronic device to detect motion of object(s) after the first electronic device (e.g., based on the order). As such, the backend server(s) 224 may determine, based on the first sensor data 520 and the second sensor data 520, that the second electronic device detected the second motion (and/or the object(s)) after the first electronic device detected the first motion (and/or the object(s)), without any other of the electronic devices detecting motion (and/or the object(s)). Based on the determination, the backend server(s) 224 may determine that the second sensor data 520 is associated with the event.

For a third example, the backend server(s) 224 may determine, based on the characteristic(s) 518, that after the first electronic device detects motion of object(s), the second electronic device should detect motion of the object(s) before any other electronic device detects motion of the object(s). In some examples, the backend server(s) 224 may make the determination based on distances between the electronic devices. For instance, the backend server(s) 224 may determine a first distance between the first electronic device and the second electronic device and respective distances between the first electronic device and each of the other electronic devices. The backend server(s) 224 may then determine that the first distance is less than the other respective distances and as such, the second electronic device should detect the motion of the object(s) before the other electronic devices.

In some examples, the backend server(s) 224 may determine the distances between the electronic devices based on the electronic devices transmitting/receiving signals between one another and determining the RSSIs of the signals. For example, if a first electronic device receives a first signal from a second electronic device and a second signal from a third electronic device, where the first signal includes a higher RSSI than the second signal, then the backend server(s) 2242 may determine that a first distance between the first electronic device and the second electronic device is less than a second distance between the first electronic device and the third electronic device. In some examples, the backend server(s) 224 may determine the distances based on receiving, using the network interface 504 and from the client device 214, 216, data indicating the distances between the electronic devices. Still, in some examples, the backend server(s) 224 may determine the distances based on analyzing image data 406 generated by the A/V device 210. For example, the backend server(s) 224 may analyze the image data 406 to determine the locations of the electronic devices. The backend server(s) 224 may then determine the distances based on the locations.

In some examples, the backend server(s) 224 may make the determination based on how object(s) would normally move over the property. For example, based on the geographic locations, the backend server(s) 224 may determine that an object walking a path would likely be detected by the first electronic device, followed by the second electronic device, and the followed by at least one other electronic device. In either example, the backend server(s) 224 may determine, based on the first sensor data 520 and the second sensor data 520, that the second electronic device detected the second motion (and/or the object(s)) after the first electronic device detected the first motion (and/or the object(s)), without any other of the electronic devices detecting motion (and/or the object(s)). Based on the determination, the backend server(s) 224 may determine that the second sensor data 520 is associated with event.

The backend server(s) 224 may take one or more actions based on determining that both the first sensor data 520 and the second sensor data 520 are associated with the event. In some examples, the backend server(s) 224 may cease from transmitting, to the client device 214, 216, an additional message 416 indicating that the second electronic device (and/or the group of electronic devices) detected motion. In some examples, the backend server(s) 224 may associate the second sensor data 520 with the event tag 522. In some examples, the backend server(s) 224 may restart the timer 524 for a second period of time. The second period of time may include, but is not limited to, five seconds, thirty seconds, one minute, five minutes, and/or the like. For example, the second period of time may be similar to the first period of time.

Still, in some examples, the backend server(s) 224 may obtain second image data 406 generated by the A/V device 210 or another A/V device 210. For a first example, the backend server(s) 224 may transmit, using the network interface 504, a control signal 420 to the A/V device 210 and/or the other A/V device 210, where the control signal 420 causes the A/V device 210 and/or the other A/V device 210 to generate and/or transmit the second image data 406. For a second example, the backend server(s) 224 may continuously be receiving image data 406 generated by the A/V device 210 and/or the other A/V device 210. In such an example, the backend server(s) 224 may retrieve a portion of the image data 406, such as a portion of the image data 406 that was generated during the second period of time, where the portion of the image data 406 corresponds to the second image data 406. In either example, the backend server(s) 224 may associate the second image data 406 with the event tag 522.

In some examples, the backend server(s) 224 may continue to receive sensor data 520 generated by the group of electronic devices and perform similar processes and techniques to determine whether the sensor data 520 is associated with the event. Based on determining that the sensor data 520 is associated with the event, the backend server(s) 224 may associate the sensor data 520 with the event tag 522, restart the timer 524 for a new period of time, and/or associate additional image data 406 with the event tag 522.

In some examples, the backend server(s) 224 may determine that the event is no longer occurring. In some examples, the backend server(s) 224 may make the determination based on the backend server(s) 224 no longer receiving sensor data 520 for a current period of time (e.g., the timer 524 elapses). In some examples, the backend server(s) 224 may make the determination based on receiving sensor data 520 (e.g., image data 406) indicating that the event is no longer occurring. For example, the backend server(s) 224 may receive and then analyze image data 406. Based on the analysis, the backend server(s) 224 may determine that the event is no longer occurring (e.g., an object associated with the event is no longer located on the property). In either of the examples, based on determining that the event is no longer occurring, the backend server(s) 224 may then perform similar processes and/or techniques for a new event based on receiving additional sensor data 520 from the electronic devices.

In some examples, the backend server(s) 224 may receive, using the network interface 504, data from the client device 214, 216, where the data includes a request 526 to view image data 406 and/or sensor data 520 associated with the event. Based on receiving the request 526, the backend server(s) 224 may identify the image data 406 (e.g., the first image data 406, the second image data 406, etc.) and/or the sensor data 520 (e.g., the first sensor data 520, the second sensor data 520, etc.) that is associated with the event tag 522. The backend server(s) 224 may then transmit, using the network interface 504, the image data 406 and/or the sensor data 520 to the client device 214, 216. In some examples, such as if the first image data 406 and the second image data 406 are generated by different A/V device 210, the backend server(s) 224 may combine the first image data 406 and the second image data 406 into a continuous stream of the image data 406 (e.g., combined image data 528). For example, the combined image data 528 may include the first image data 406, followed by the second image data 406, and so forth in temporal order. The backend server(s) 224 may then transmit, using the network interface 504, the combined image data 528 to the client device 214, 216.

In some examples, the backend server(s) 224 may receive the data that includes the request 526 while the event is still occurring (e.g., a live view of the event). In such examples, the backend server(s) 224 may transmit, using the network interface 504, the image data 406 (e.g., the first image data 406, the second image data 406, etc.) to the client device 214, 216 while the event is occurring. For example, if the backend server(s) 224 continue to receive sensor data 520 during the event, where the sensor data 520 indicates that the event is still occurring, the backend server(s) 224 may continue to receive and then transmit the image data 406 to the client device 214, 216. In some examples, once the backend server(s) 224 determine that the event is over, the backend server(s) 224 may cease from receiving the image data 406 and/or transmitting the image data 406 to the client device 214, 216.

In some examples, the backend server(s) 224 may use the first sensor data 520, the second sensor data 520, the first image data 406, and/or the second image data 406 to generate a stored event 530. In some examples, the stored event 530 may indicate an event that continuously occurs at the geographic location (e.g., the property) at which the electronic devices are located. For example, the backend server(s) 224 determine that a specific event occurred at the property during a first instance of a time period. The time period may include, but is not limited to, days of the year (e.g., March 1, April 7, October 19, etc.) days of the week (e.g., Monday, Tuesday, Wednesday, etc.), time periods of the day (e.g., between 9:00 a.m. and 10:00 a.m., between 1:00 p.m. and 5:00 p.m., etc.), and/or the like. For a first example, the first instance of the time period may include the first time that the first sensor data 520 was generated and the second time that the second image data 520 was generated. For a second example, the first instance of the time period may include the first period of time and the second period of time.

In some examples, the backend server(s) 224 may make the determination based on receiving, using the network interface 504 and from the client device 214, 216, data indicating that the specific event occurred during the first instance of the time period (e.g., the backend server(s) 224 query the client device 214, 216 to determine if the specific event occurred). For example, the data may indicate that a person walked up a path of the property during the first instance of the time period. Additionally, or alternatively, in some examples, the backend server(s) 224 may make the determination based on analyzing image data 406 that was generated during the first instance of the time period. For example, the backend server(s) 224 may analyze (e.g., using one or more image processing techniques described above with regard to the A/V device 210) the image data 406 (e.g., the first image data 406, the second image data 406, etc.) to determine that the image data 406 represent a type of object 532. The type of object 532 may include, but is not limited to, a person, an animal, a vehicle, a device, and/or any other type of object that may be represented by the image data 406.

For example, the backend server(s) 224 may analyze the image data 406 in order to determine if the image data 406 depicts an object. In some examples, to analyze the image data 406, computer vision processing and/or image processing, as described herein, for example, may be performed by the backend server(s) 224 to determine that the image data 406 depicts one or more objects. For example, in any of the present embodiments, the image data 406 generated by the A/V device 210 may be analyzed to determine object data. In some of the present embodiments, one or more of the image data 406, the motion data 412, and the audio data 408 may be used to determine the object data. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the backend server(s) 224 may compare the object data to an object database 534 to determine what, if any, object(s) the image data 406 represents in the field of view of the A/V device 210. For example, the object database 534 may store image data corresponding to images and/or video footage that depict various objects, where the image data may be labeled (e.g., tagged, such as in the form of metadata) to indicate the type of object depicted by each image and/or video footage. For a first example, the object database 534 may store image data depicting a person, where the image data is labeled to indicate that the type of object includes a person. For a second example, the object database 534 may store image data depicting an animal (e.g., a dog, a cat, a coyote, etc.), where the image data is labeled to indicate that the type of object includes the animal (e.g., the dog, the cat, the coyote, etc.). For a third example, the object database 534 may store image data depicting a vehicle, where the image data is labeled to indicate the type of object 532 includes the vehicle.

Based on the comparing, the backend server(s) 224 may match the object data from the image data 406 to the image data stored in the object database 534. The backend server(s) 224 may then use the match to determine that the object data represents an object and/or to determine the type of object 532 that the object data represents. For example, if the backend server(s) 224 matches the object data from the image data 406 to image data stored in the object database 534 that represents a person, then the backend server(s) 224 may determine that the image data 406 represents an object and/or that the image data 406 represents a person. In some examples, when the object data represents multiple objects, the backend server(s) 224 may perform a similar analysis to identify each object represented by the object data and/or the respective type of object 532 associated with each of the objects represented by the object data.

In some examples, in addition to, or alternatively from, comparing the image data 406 to the image data stored in the object database 534, features and/or characteristics of various objects may be stored in the object database 534, and the features and/or characteristics of the objects in the image data 406 may be determined (e.g., using computer vision processing, image processing, or the like) and compared against the features and/or characteristics from the object database 534. For example, sizes, volumes, weights, colors, movement types, and/or other features and/or characteristics of various objects may be stored in the object database 534. The size, volume, weight, color, movement type, and/or other features and/or characteristics of an object depicted by the image data 406 may then be compared to the sizes, volumes, weights, colors, movement types, and/or other features and/or characteristics stored in the object database 534 to identify the type of object 532 depicted by the image data 406.

In some examples, when the type of object 532 includes a person, the backend server(s) 224 may further analyze the image data 406 (e.g., facial recognition) in order to identify the person represented by the image data 406. For example, the backend server(s) 224 may determine if the person includes a family member (e.g., mom, dad, kid, etc.) that is associated with the property.

In some examples, the backend server(s) 224 may then determine that the specific event includes the type of object 532 located on at the geographic location (e.g., located on the property). Additionally, in some examples, the backend server(s) 224 may analyze the image data 406 to determine that the image data 406 represents the object performing an action, such as walking up the path. In such examples, the backend server(s) 224 may determine that the specific event includes the object (and/or type of object 532) performing the action. For example, the backend server(s) 224 may determine that the specific event includes kid(s) coming home from school.

In either of the examples, the backend server(s) 224 may determine that the first electronic device generated the first sensor data 520, the second electronic device generated the second sensor data 520, and so forth during the first instance of the time period. The backend server(s) 224 may then determine that the specific event is associated with the first electronic device generating sensor data 520, the second electronic device generating sensor data 520, and so forth during the time period. In some examples, the backend server(s) 224 may further determine that the specific event is associated with the type of object 532 (and/or an identity of a person) being represented by the image data 406 generated during the event. Furthermore, in some examples, the backend server(s) 224 may determine an order in which the electronic devices generated sensor data 520. For example, the backend server(s) 224 may determine that the first electronic device generated the first sensor data 520, followed by the second electronic device generating the second sensor data 520, and so forth during the first instance of the time period. In such examples, the backend server(s) 224 may determine that the specific event is associated with the first electronic device generating sensor data 520, followed by the second electronic device generating sensor data 520, and forth on during the time period. The backend server(s) 224 may then store data (e.g., the stored event 530) indicating the specific event, the first electronic device, the second electronic device, any other electronic devices that generated sensor data 520 during the time period, the order in which the electronic devices generated the sensor data 520, and/or the time period.

In some examples, before storing the stored event 530, the backend server(s) 224 may transmit, using the network interface 504, data to the client device 214, 216, where the data represents a request to store the stored event 530 and/or a request to provide an identifier (e.g., a name) for the stored event 530. In such examples, the backend server(s) 224 may then receive, using the network interface 504, data from the client device 214, 216, where the data indicates consent to store the stored event 530 and/or the identifier for the stored event 530. The backend server(s) 224 may then store the stored event 530 and/or associated the stored event 530 with the identifier.

The backend server(s) 224 may then use the stored event to determine when the specific event again occurs at the geographic location. For a first example, during a second instance of the time period, the backend server(s) 224 may receive sensor data 520 from the electronic devices. Based on the stored event 530 and the sensor data 520, the backend server(s) 224 may determine that the specific event is again occurring at the geographic location (e.g., the type of object 532 is located at the geographic location). For a second example, and again a second instance of the time period, the backend server(s) 224 may receive the sensor data 520 from the electronic devices, where the backend server(s) 224 receive the sensor data 520 in a similar order as indicated by the stored event 530. Based on the stored event and the sensor data 520, the backend server(s) 224 may determine that the specific event is again occurring at the geographic location (and/or the type of object 532 is located at the geographic location). In either of the examples, the backend server(s) 224 may generate a message 416 indicating that the event occurred at the property. The backend server(s) 224 may then transmit, using the network interrace 504, the message 416 to the client device 214, 216.

The hub device 202, the backend server(s) 224, the A/V devices 210, one or more additional or alternative components of the network(s) of servers/backend devices 220, and/or another electronic device may alternatively be referred to herein as "network device(s)". In some examples, the network device(s) may be remote from a location and/or property that includes the electronic devices (e.g., the hub device 202, the sensors 204, the automation devices 206, the A/V devices 210, the electronic device 230, the light emitters 232, etc.). In some examples, the network device(s) may be located at the location and/or the property that includes the electronic devices.

Figure 6:
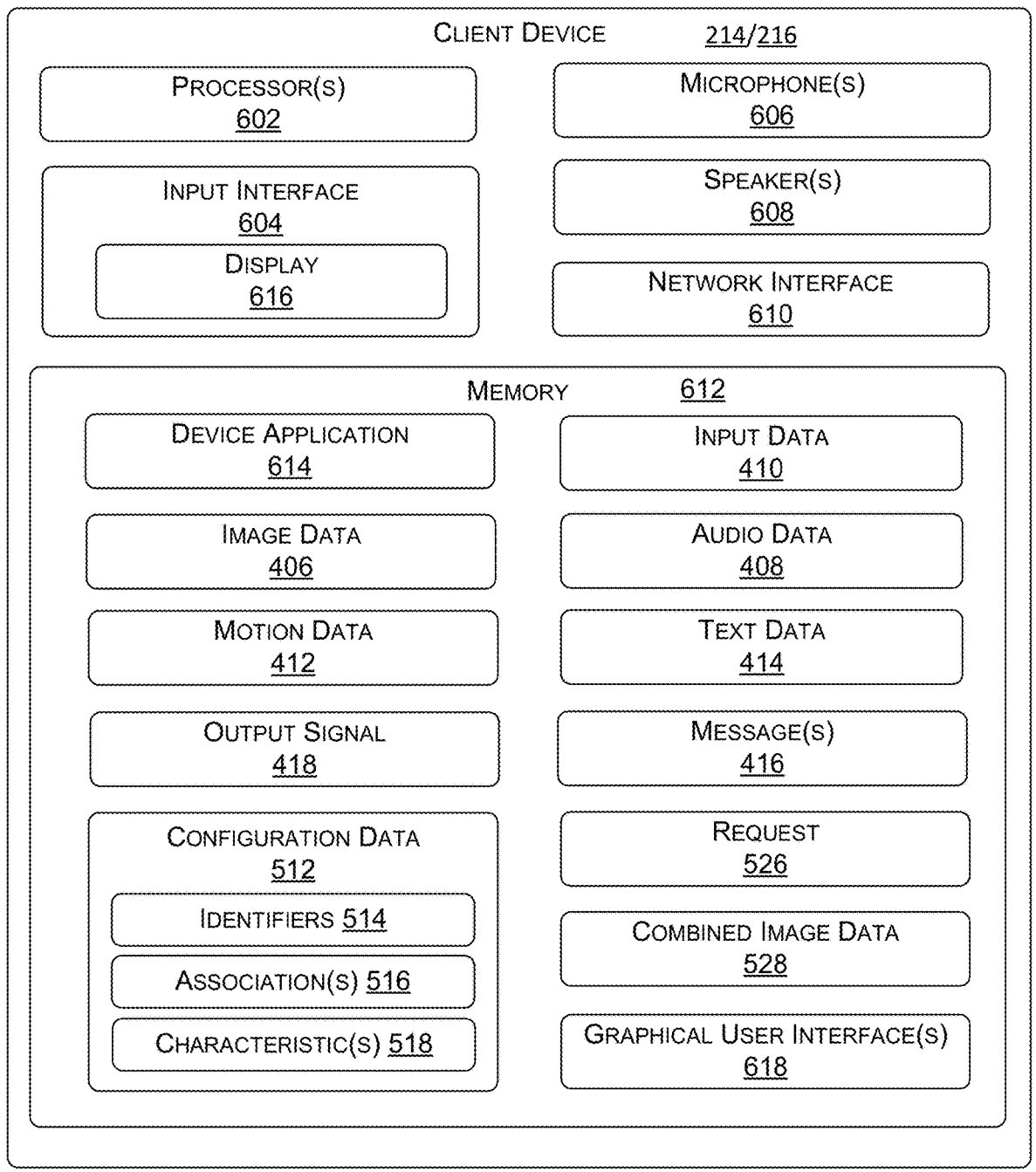
FIG. 6 is a functional block diagram illustrating an example embodiment of a client device, according to various aspects of the present disclosure.

Now referring to FIG. 6, FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606 (which may be similar to, and/or include similar functionality as, the microphone(s) 328), speaker(s) 608 (which may be similar to, and/or include similar functionality as, the speaker(s) 330), a network interface 610 (which may be similar to, and/or include similar functionality as, the network interface(s) 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may include instructions that, when executed by the processor(s) 602, cause the processor(s) 602 to receive input(s) to the input interface 604 (e.g., indication(s) of identifiers 514, indication(s) of association(s) 516, indication(s) of characteristic(s) 518, etc.). In addition, the device application 614 may include instructions that, when executed by the processor(s) 602, cause the processor(s) 602 to receive, using the network interface 610, the input data 410, the image data 406, the audio data 408, the output signal 418, messages 416, and/or the combined image data 528 from one or more of the A/V device 210, the hub device 202, or the backend server(s) 224.

With further reference to FIG. 6, the input interface 604 may include a display 616. The display 616 may include a touchscreen, such that the user of the client device 214, 216 may provide inputs directly to the display 616 (e.g., indication(s) of identifiers 514, indication(s) of association(s) 516, indication(s) of characteristic(s) 518, etc.). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may include instructions that, when executed by the processor(s) 602, cause the processor(s) 602 to display the message 416 on the display 616. The message 416 may indicate that an electronic device and/or a group of electronic devices detected motion, detected the presence of an object, received a touch input (e.g., at the touch surface(s) 306), detected an event, etc. While displaying the message 416, the input interface 604 may receive input from the user to answer the message 416. In response, the device application 614 may include instructions that, when executed by the processor(s) 602, cause the processor(s) 602 to display image(s) and/or video footage represented by the image data 406 (and/or the combined image data 528) on the display 616.

In some examples, the client device 214, 216 may display a graphical user interface (GUI) 618 on the display 616. The GUI 618 may provide functionality to input data associated with identifier(s) 514 of electronic device(s), association(s) 516 between electronic device(s), and characteristic(s) 518 associated with electronic device(s) and/or a group of electronic devices. For example, while displaying the GUI 618, the client device 214, 216 may receive, using the input interface 604, input(s) indicating identifier(s) 514 associated with electronic device(s). The client device 214, 216 may further receive, using the input interface 604, input(s) indicating association(s) 516 between the electronic device(s). Additionally, the client device 214, 216 may receive, using the input interface 604, input(s) indicating characteristic(s) 518 for the electronic device(s). In some examples, the client device 214, 216 may display the GUI 618 and/or receive the input(s) during a configuration process associated with the electronic device(s).

Based on the input(s), the client device 214, 216 may generate the configuration data 512, where the configuration data 512 includes data representing the identifier(s) 514, data representing the association(s) 516, and/or data representing the characteristic(s) 518. The client device 214, 216 may then transmit, using the input interface 610, the configuration data 512 to the backend server(s) 224 and/or the hub device 202.

Figure 7:
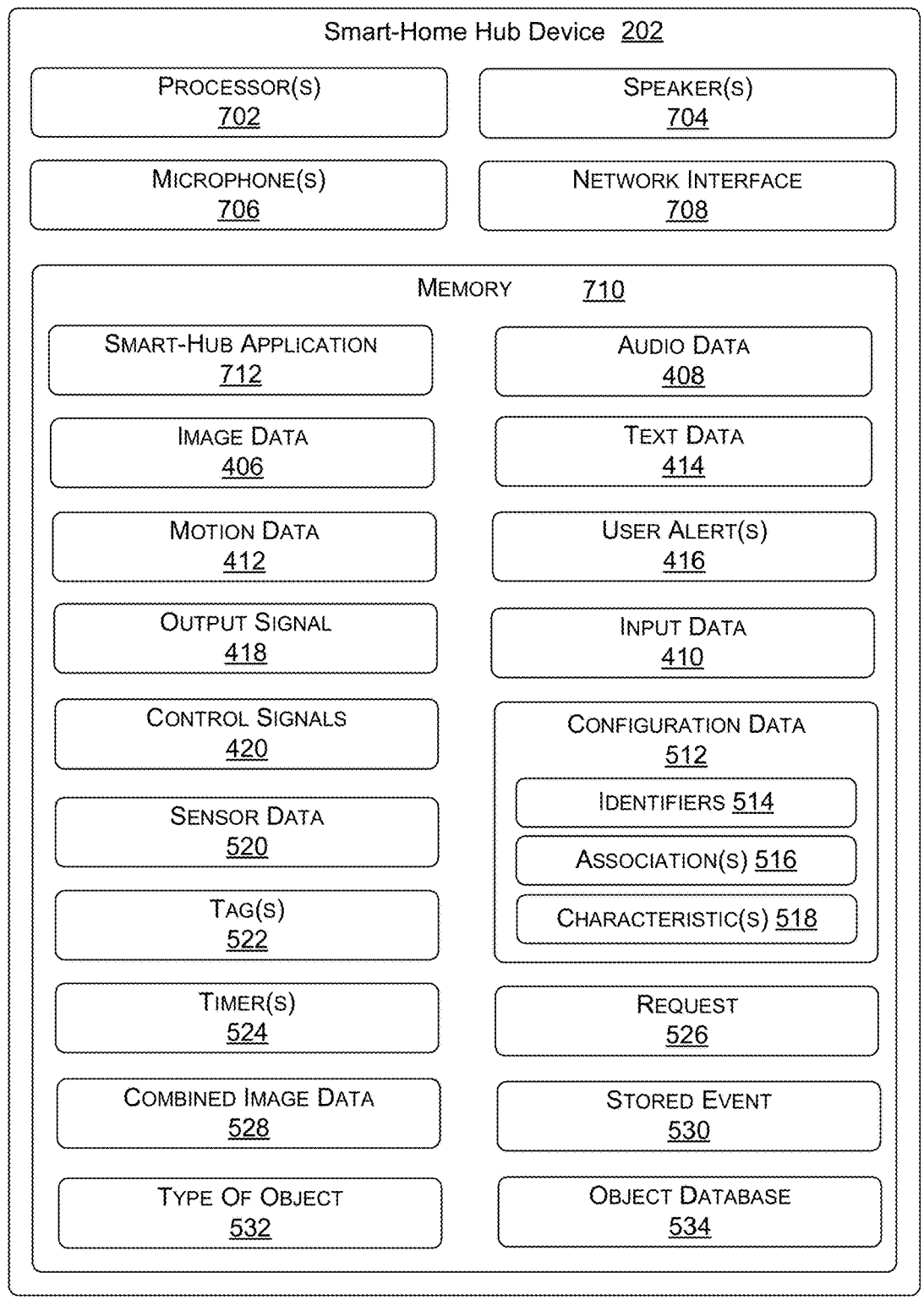
FIG. 7 is a functional block diagram illustrating an example embodiment of a hub device, according to various aspects of the present disclosure.

FIG. 7 is a functional block diagram illustrating an embodiment of the smart-home hub device 202 (alternatively referred to herein as the "hub device 202") according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704 which may be similar to, and/or include similar functionality as, the speaker(s) 330), microphone(s) 706 which may be similar to, and/or include similar functionality as, the microphone(s) 328), a network interface 708 (which may be similar to, and/or include similar functionality as, the network interface 310), and memory 710 (which may be similar to, and/or include similar functionality as, the memory 402). In some embodiments, the hub device 202 may further comprise a camera (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-home hub application 712. In various embodiments, the smart-home hub application 712 may include instructions that, when executed by the processor(s) 702, cause the processor(s) 702 to receive sensor data 520 from the sensors 204, the automation devices 206, the A/V devices 210, and/or other electronic devices. As discussed herein, in some examples, the sensor data 520 may include a current state (e.g., opened/closed for door and window sensors, motion detected for motion sensors, living room lights on/off for a lighting automation system, etc.) of each of the sensors 204, the automation devices 206, and/or other electronic devices. In some of the present embodiments, the sensor data 520 may be received in response to sensor triggers. The sensor triggers may be a door opening/closing, a window opening/closing, lights being turned on/off, blinds being opened/closed, etc. As such, the sensor data 520 may include the current state of the sensors 204, the automation devices 206, and/or other electronic devices, as well as any updates to the current state based on sensor triggers.

With further reference to FIG. 7, the smart-home hub application 712 may include instructions that, when executed by the processor(s) 702, cause the processor(s) 702 to receive the audio data 408, the text data 414, the image data 406, the motion data 412, the input data 410, and/or the messages 416 from the A/V device 210 (in some embodiments, via the backend server(s) 224) using the network interface 708. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the backend server(s) 224 in response to motion being detected by the A/V device 210. The smart-hub application 712 may further include instructions that, when executed by the processor(s) 702, cause the processor(s) 702 to transmit, using the network interface 708, the audio data 408, the text data 414, the image data 406, the motion data 412, the input data 410, and/or the messages 416 to the client device 214, 216, the backend server(s) 224, and/or an additional electronic device.

As described herein, at least some of the processes of the A/V device 210, the backend server(s) 224, and/or the client device 214, 216 may be executed by the hub device 202. For example, the hub device 202 may receive, using the network interface 708, configuration data 512 from the backend server(s) 224 and/or the hub device 202. The hub device 202 may then use the configuration data 512 to determine when sensor data 520 generated by more than one electronic device is associated with a single event. Based on determining that the sensor data 520 is associated with a single event, the hub device 202 may associate the sensor data 520 and/or image data 406 (e.g., generated during the event) with an event tag 522. The hub device 202 may then transmit, using the network interface 708, the sensor data 520 and/or the image data 406 (and/or the combined image data 528) to the client device 214, 216 (which may be via the backend server(s) 224) based on receiving data indicating a request 526 for the data associated with the event.

In some examples, the hub device 202 may further determine that a specific event was occurring during a time period at which the sensor data 520 was generated. For example, the hub device 202 may determine that a type of object 532 was being detected by the electronic devices. The hub device 202 may then use the sensor data 520, the image data 406, and/or the determined specific event to generate a stored event 530. Additionally, the hub device 202 may use the stored event 530 during subsequent instances of the time period to determine that the specific event is once again occurring. Based on the determination, the hub device 202 may generate a message 416 indicating that the specific event is occurring. The hub device 202 may then transmit, using the network interface 610, the message 614 to the client device 214, 216 (which may be via the backend server(s) 224).

FIGS. 8A-8D are schematic diagrams of an example of grouping electronic devices together and then using the groups to identify events, according to various aspects of the present disclosure. For example, a user may place various electronic devices 802(1)-(7) around the user's property 804. Each of the electronic devices 802(1)-(7) may include a respective field of view 806(1)-(7) for detecting objects located on the property 804. In some examples, the user may then place the electronic devices 802(1)-(7) into various groups. For example, the user may want to place electronic devices 802(1)-(4) into a first group. The first group may be associated with monitoring the path 808 to the entrance of the structure 810 (e.g., house, building, business, apartment, etc.) located on the property 804. The user may further want to place the electronic devices 802(5)-(7) into a second group. The second group may be associated with monitoring a pack portion (e.g., backyard) of the property 804. As such, the client device 214, 216 may receive first input(s) indicating the association(s) 516 between the electronic devices 802(1)-(4) and second input(s) indicating the association(s) 516 between the electronic devices 802(5)-(7). The client device 214, 216 may then transmit configuration data 512 indicating at least the association(s) 516 to the backend server(s) 224 (and/or the hub device 202).

In some examples, the first group may be associated with a first identifier, such as "Front Yard Group;" such that events generated by the first group are labeled (e.g., with a tag 522) to indicate that the events were generated by the Front Yard Group. Additionally, the second group may be associated with a second identifier, such as "Backyard Group", such that events generated by the second group are labeled (e.g., with a tag 522) to indicate that the events were generated by the Backyard Group. Although these are just examples of identifiers, in other examples, the first group and/or the second group may be associated with any other respective type of identifier that identifies the first group and/or the second group.

Figure 8A:
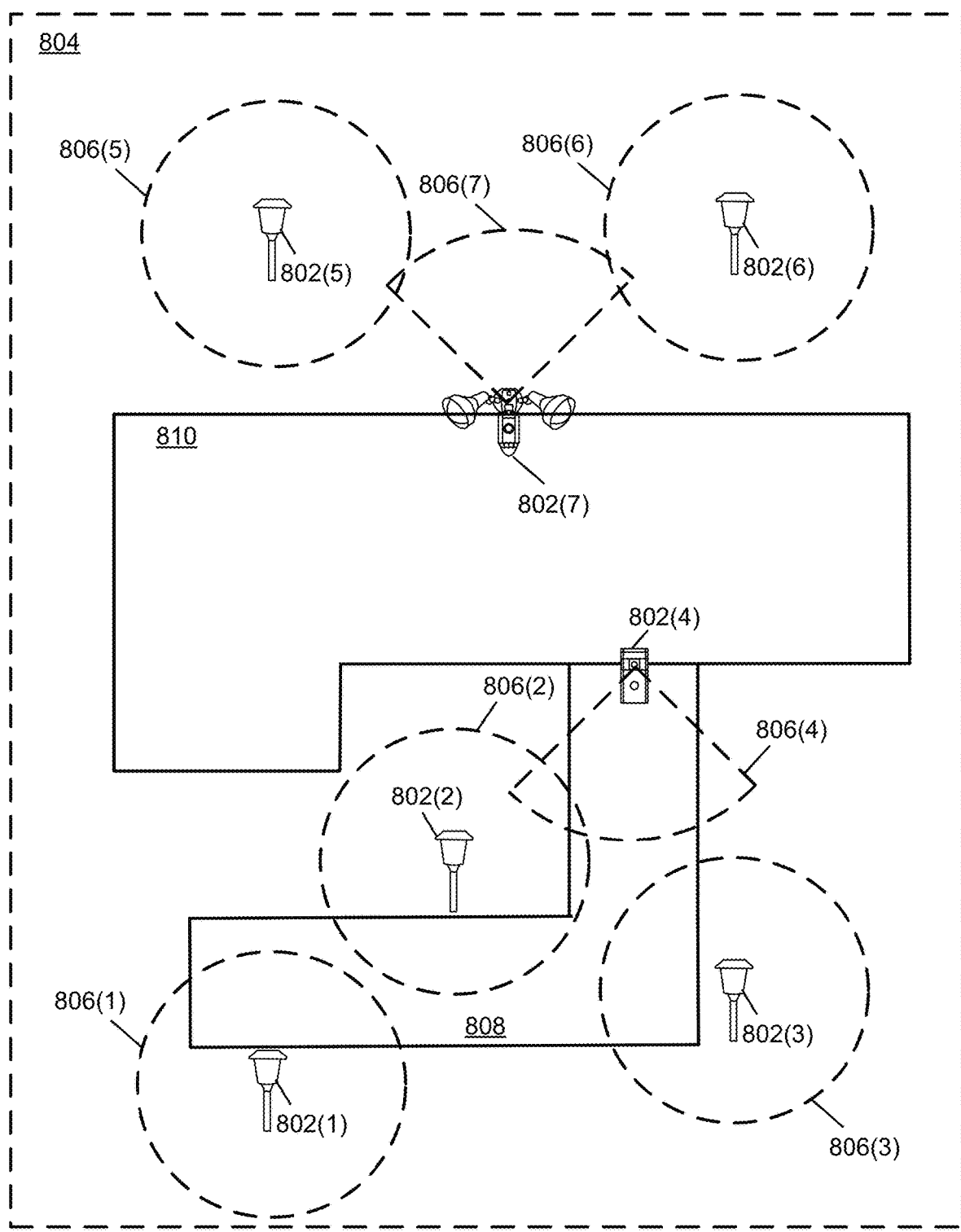
FIGS. 8A-8D are schematic diagrams of an example of grouping electronic devices together and then using the groups to identify events, according to various aspects of the present disclosure.
Figure 8B:
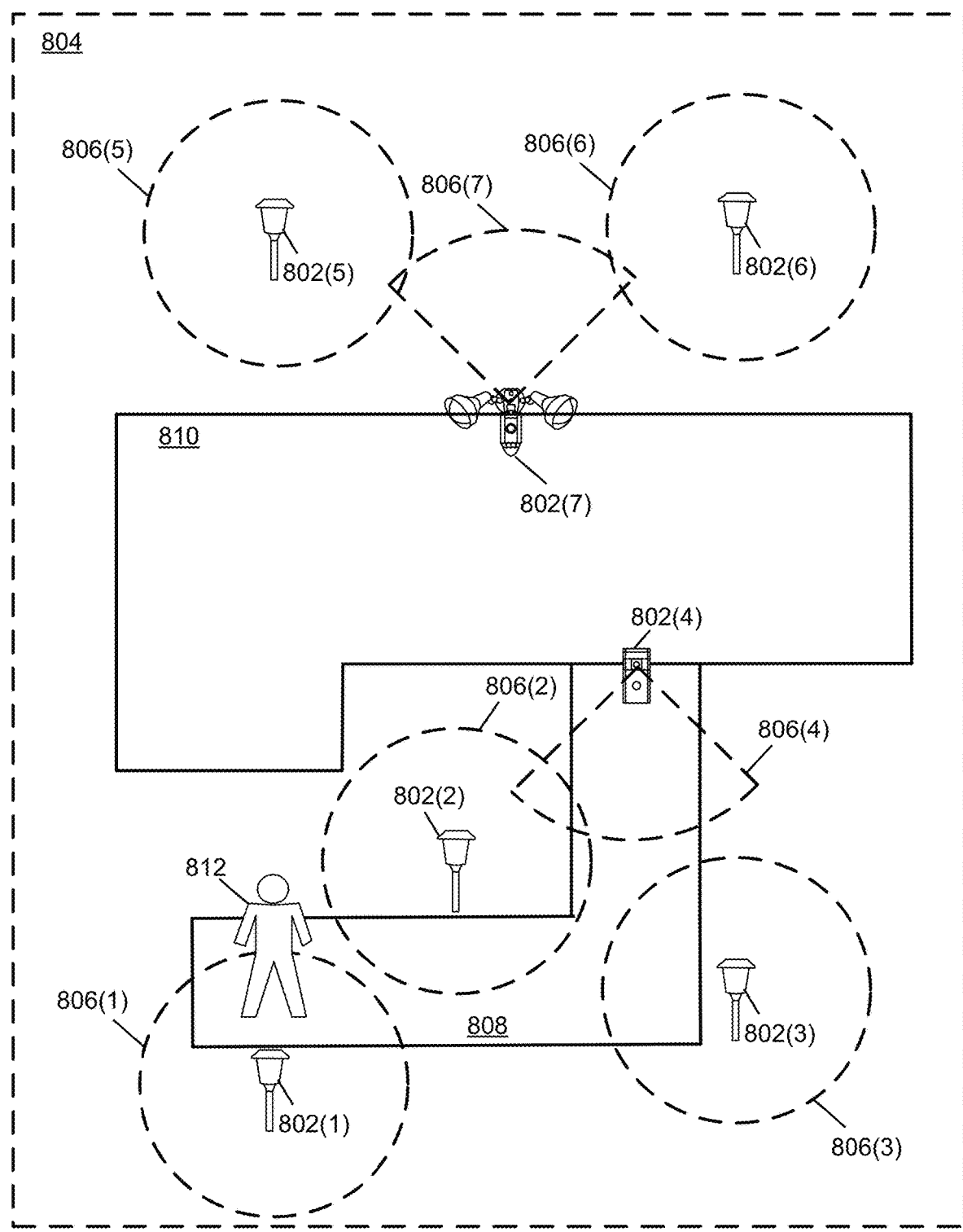

The backend server(s) 224 (and/or the hub device 202) may then use the configuration data 512 to determine when events are occurring at the property 804. For example, and as illustrated in FIG. 8B, at a first time, the backend server(s) 224 (and/or the hub device 202) may receive first sensor data 520 generated by the first electronic device 802(1), where the first sensor data 520 indicates that the first electronic device 802(1) detected first motion and/or a first object 812. Based on the first sensor data 520, the backend server(s) 224 (and/or the hub device 202) may generate a first message 416 indicating that the first electronic device 802(1) (and/or the first group of electronic devices 802(1)-(4)) detected the first motion and/or the first object 812. The backend server(s) 224 (and/or the hub device 202) may then transmit the first message 416 to the client device 214, 216. Additionally, the backend server(s) 224 (and/or the hub device 202) may start a first timer 524 for a first period of time.

Furthermore, the backend server(s) 224 (and/or the hub device 202) may obtain and then associate first image data 406, generated by the fourth electronic device 802(4), with a first event tag 522 for a first event. In some examples, the first event tag 522 may be associated with the first group. For example, the first event tag 522 may indicate that the first event was generated by the Front Yard Group.

Figure 8C:
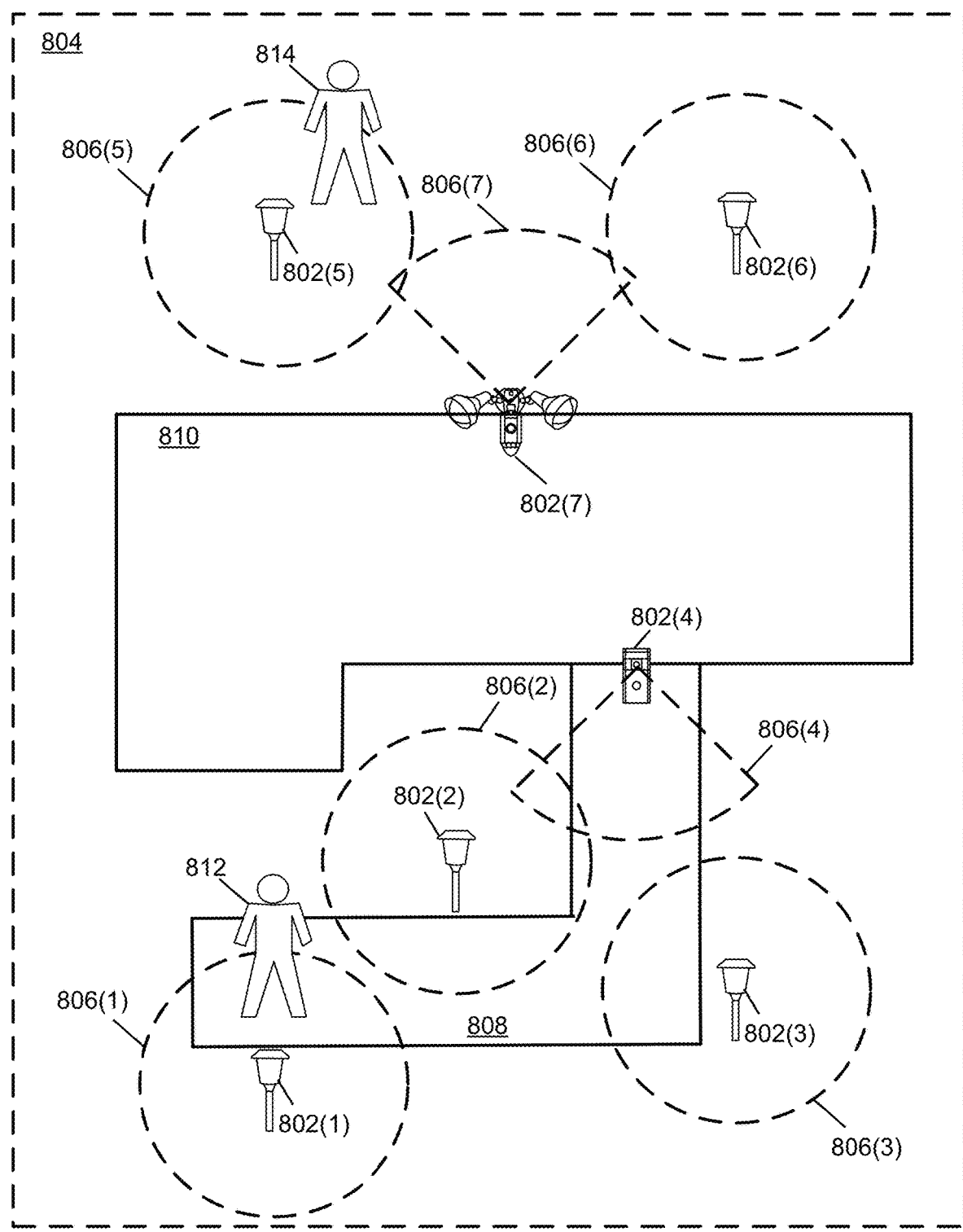

As illustrated in FIG. 8C, at a second time, the backend server(s) 224 (and/or the hub device 202) may receive second sensor data 520 generated by the fifth electronic device 802(5), where the second sensor data 520 indicates that the fifth electronic device 802(5) detected second motion and/or a second object 814. Based on receiving the second sensor data 520, the backend server(s) 224 (and/or the hub device 202) may determine whether the second sensor data 520 is associated with the first event. For example, the backend server(s) 224 (and/or the hub device 202) may determine that the fifth electronic device 802(5) is not associated with the first electronic device 802(1) since the fifth electronic device 802(5) is included in the second group of electronic devices 802(5)-(7) and the first electronic device 802(1) is included in the first group of electronic devices 802(1)-(4). As such, the backend server(s) 224 (and/or the hub device 202) may determine that the second sensor data 520 is not associated with the first event.

Based on the determination, the backend server(s) 224 (and/or the hub device 202) may generate a second message 416 indicating that the fifth electronic device 802(5) (and/or the second group of electronic devices 802(5)-(7)) detected the second motion and/or the second object 814. The backend server(s) 224 (and/or the hub device 202) may then transmit the second message 416 to the client device 214, 216. Additionally, the backend server(s) 224 (and/or the hub device 202) may start a second timer 524 for a second period of time, where the second timer is associated with a second event. In some examples, the second period of time may be similar to the first period of time. In some examples, the second period of time may be different than the first period of time. Furthermore, the backend server(s) 224 (and/or the hub device 202) may obtain and then associate second image data 406, generated by the seventh electronic device 802(7), with a second event tag 522 for the second event. In some examples, the second event tag 522 may be associated with the second group. For example, the second event tag 522 may indicate that the second event was generated by the Backyard Group.

Figure 8D:
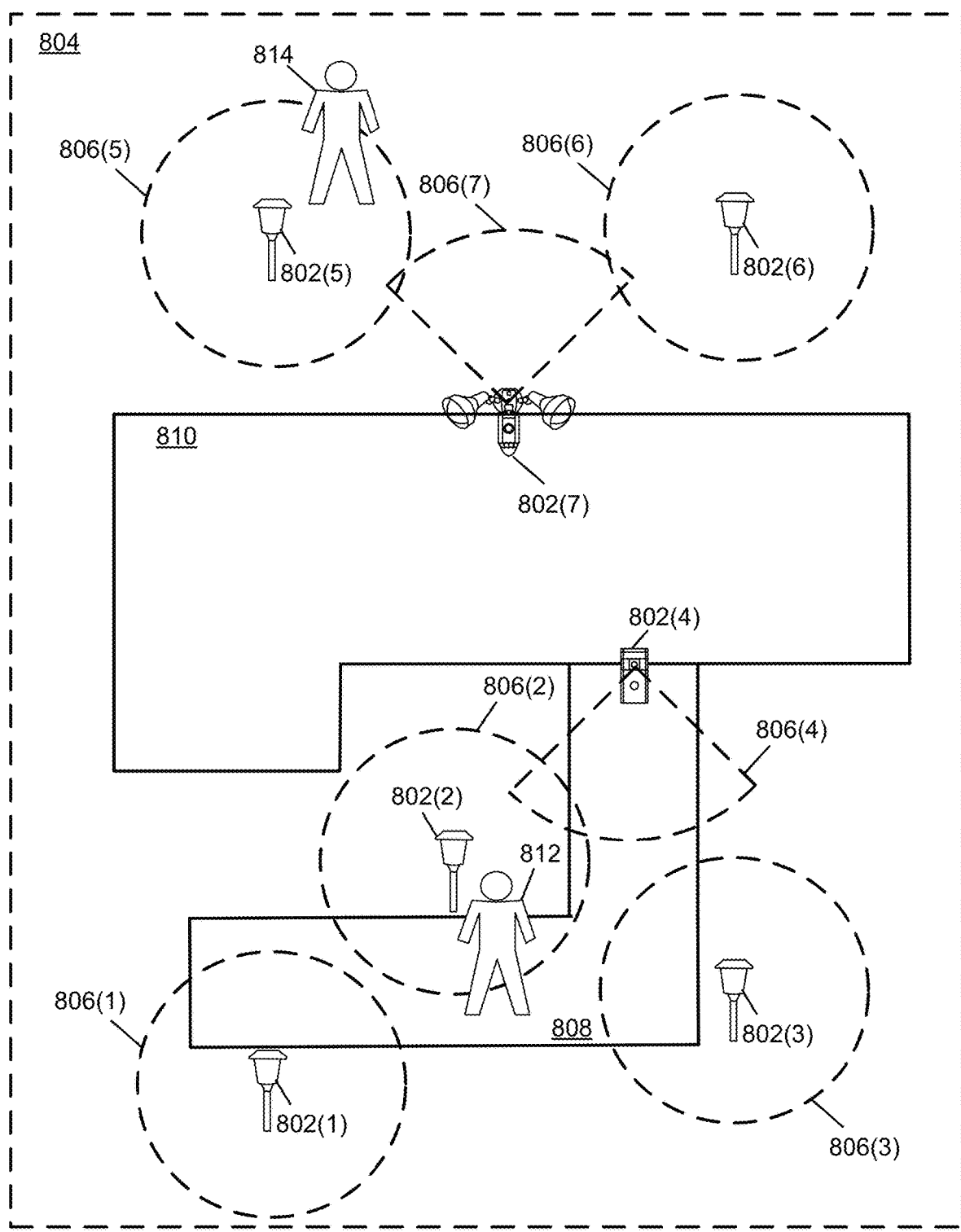

As illustrated in FIG. 8D, at a third time, the backend server(s) 224 (and/or the hub device 202) may receive third sensor data 520 generated by the second electronic device 802(2), where the third sensor data 520 indicates that the second electronic device 802(2) detected third motion and/or the first object 812. Based on the third sensor data 520, the backend server(s) 224 (and/or the hub device 202) may determine whether the third sensor data 520 is associated with the first event and/or the second event. For example, the backend server(s) 224 (and/or the hub device 202) may determine that the second electronic device 802(2) is associated with the first electronic device 802(1) since the second electronic device 802(2) is included in the first group of electronic devices 802(1)-(4). Additionally, in some examples, the backend server(s) 224 (and/or the hub device 202) may determine that third time is within a threshold period of time as the first time (e.g., the first time period associated with the first timer 524 has yet to elapse). As such, the backend server(s) 224 (and/or the hub device 202) may determine that the third sensor data 520 is associated with the first event.

Based on the determination, the backend server(s) 224 (and/or the hub device 202) may cease from transmitting a third message 416 indicating that the second electronic device 802(2) (and/or the first group of electronic devices 802(1)-(4)) detected the third motion and/or the first object 812. Additionally, the backend server(s) 224 (and/or the hub device 202) may restart the first timer 524 for a third period of time. In some examples, the third period of time may be similar to the first period of time. In some examples, the third period of time may be different than the first period of time. Furthermore, the backend server(s) 224 (and/or the hub device 202) may obtain and then associate third image data 406, generated by the fourth electronic device 802(4), with the first event tag 522 for the first event.

In some examples, the backend server(s) 224 (and/or the hub device 202) may continue these techniques and/or processes until the backend server(s) 224 (and/or the hub device 202) determines that the first event and/or the second event are no longer occurring, as described herein. Additionally, in some examples, although not described in the example of FIGS. 8A-8D, the backend server(s) 224 (and/or the hub device 202) may use characteristic(s) 518 associated with the electronic devices 802(1)-(7) when determining whether sensor data 520 is associated with the first event and/or the second event.

Figure 9:
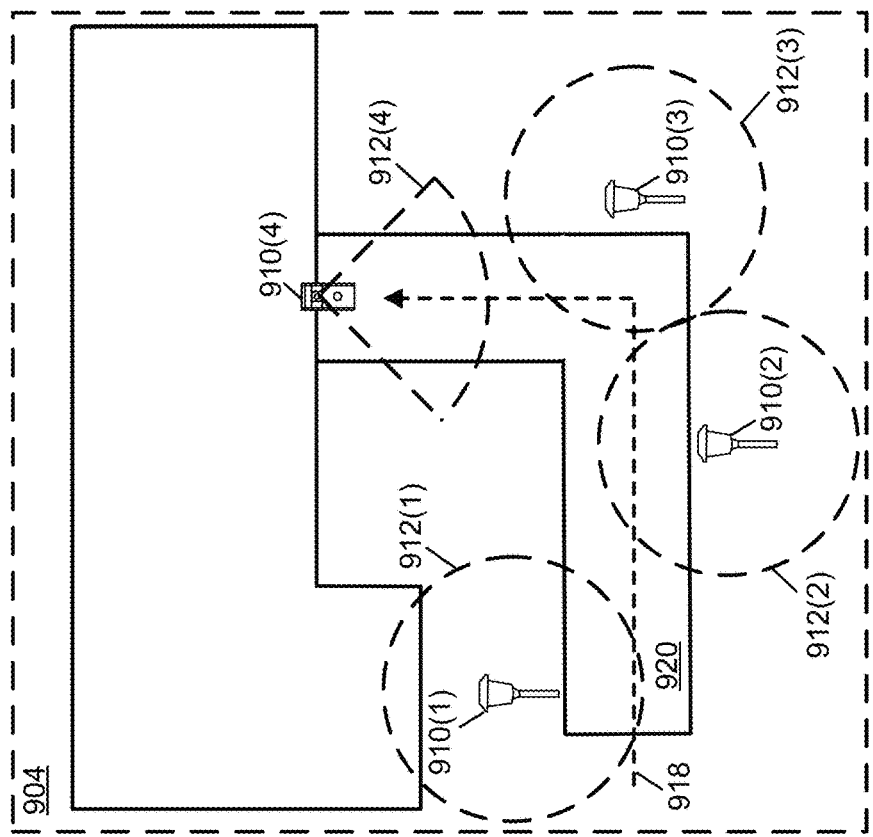
FIG. 9 illustrates a schematic diagram of an example of determining that an event occurred at a first property and then using sensor data to determine that a similar event occurred at a second property, according to various aspects of the present disclosure.
Figure 9:
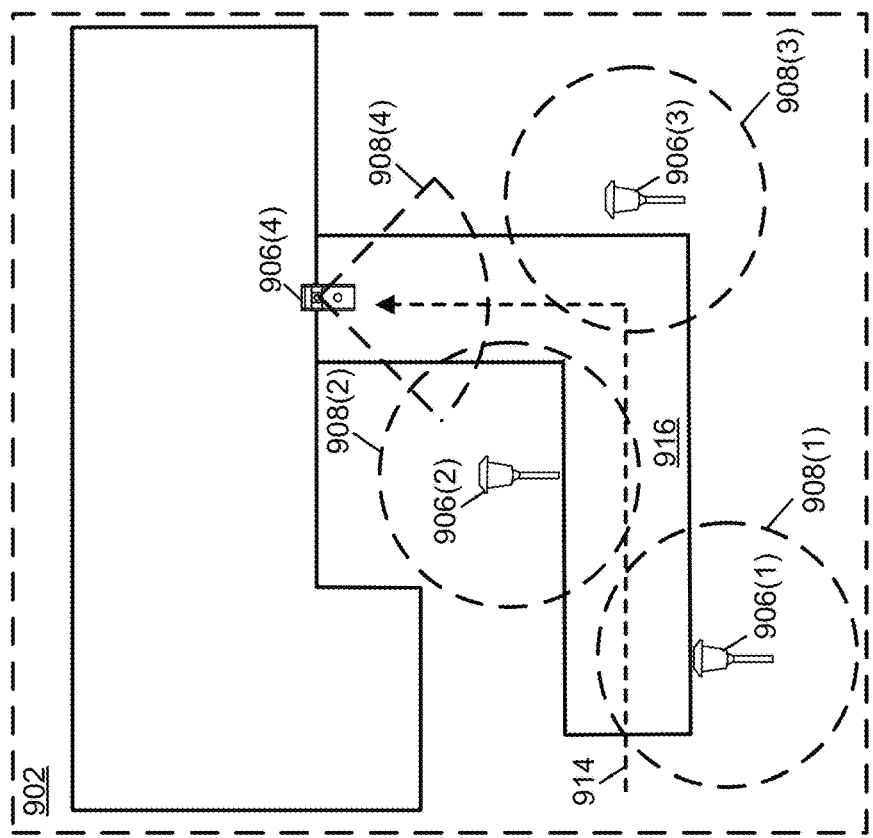

FIG. 9 illustrates a schematic diagram of an example of determining that an event occurred at a first property 902 and then using sensor data to determine that a similar event occurred at a second property 904, according to various aspects of the present disclosure. For example, the backend server(s) 224 (and/or the hub device 202) may store first configuration data 512 indicating first association(s) 516 between a first group of electronic devices 906(1)-(4) located at the first property 902. The first group of electronic devices 906(1)-(4) may respectively include first fields of view 908(1)-(4). The backend server(s) 224 (and/or the hub device 202) may further store second configuration data 512 indicating second association(s) 516 between a second group of electronic devices 910(1)-(4) located at the second property 904. The second group of electronic devices 910(1)-(4) may respectively include second fields of view 912(1)-(4).

At a first instance of a time period, the backend server(s) 224 (and/or the hub device 202) may receive first sensor data 520 indicating a first motion of a first object, where the first motion includes a first route 914 along a first path 916 of the first property 902. For example, the first sensor data 520 may indicate that the first electronic device 906(1) detected the object, followed by the second electronic device 906(2), followed by the third electronic device 906(3), and finally the fourth electronic device 906(4). The backend server(s) 224 (and/or the hub device 202) may further determine that a specific event occurred during the first instance of the time period. For example, the backend server(s) 224 (and/or the hub device 202) may determine that a guest arrived at the first property 902. In response, the backend server(s) 224 (and/or the hub device 202) may generate a stored event 530 that includes the specific event, indications of the first group of electronic devices 906(1)-(4), the first sensor data 520, and/or the time period.

During a second instance of the time period, the backend server(s) 224 (and/or the hub device 202) may receive second sensor data 520 indicating a second motion of a second object, where the second motion includes a second route 918 along a second path 920 of the second property 904. Based on the second sensor data 520, the backend server(s) 224 (and/or the hub device 202) may determine that the first electronic device 910(1) detected the object, followed by the second electronic device 910(2), followed by the third electronic device 910(3), and finally the fourth electronic device 910(4). Additionally, based on first characteristic(s) 518 associated with the first group of electronic devices 906(1)-(4) and second characteristic(s) 518 associated with the second group of electronic devices 910(1)-(4), the backend server(s) 224 (and/or the hub device 202) may determine that a first layout of the first group of electronic devices 906(1)-(4) is similar to a second layout of the second group of electronic device 910(1)-(4) (although, as illustrated, not exactly similar). For example, the backend server(s) 224 (and/or the hub device 202) may determine that the first group of electronic devices 906(1)-(4) are along the first path 916 to the entrance of the property 902, and the second group of electronic devices 910(1)-(4) are long the second path 920 to the entrance of the second property 904.

The backend server(s) 224 (and/or the hub device 202) may then determine, based on the stored event 530, the first layout being similar to the second layout, and/or the second sensor data 520, that the specific event occurred at the second property 904. For example, the backend server(s) 224 (and/or the hub device 202) may determine that a guest arrived at the second property 904. In response, the backend server(s) 224 (and/or the hub device 202) may generate a message 416 indicating that the specific event occurred at the second property 904. The backend server(s) 224 (and/or the hub device 202) may then transmit the message 416 to a client device associated with the second property 904 and/or the second group of electronic devices 910(1)-(4).

Figure 10:
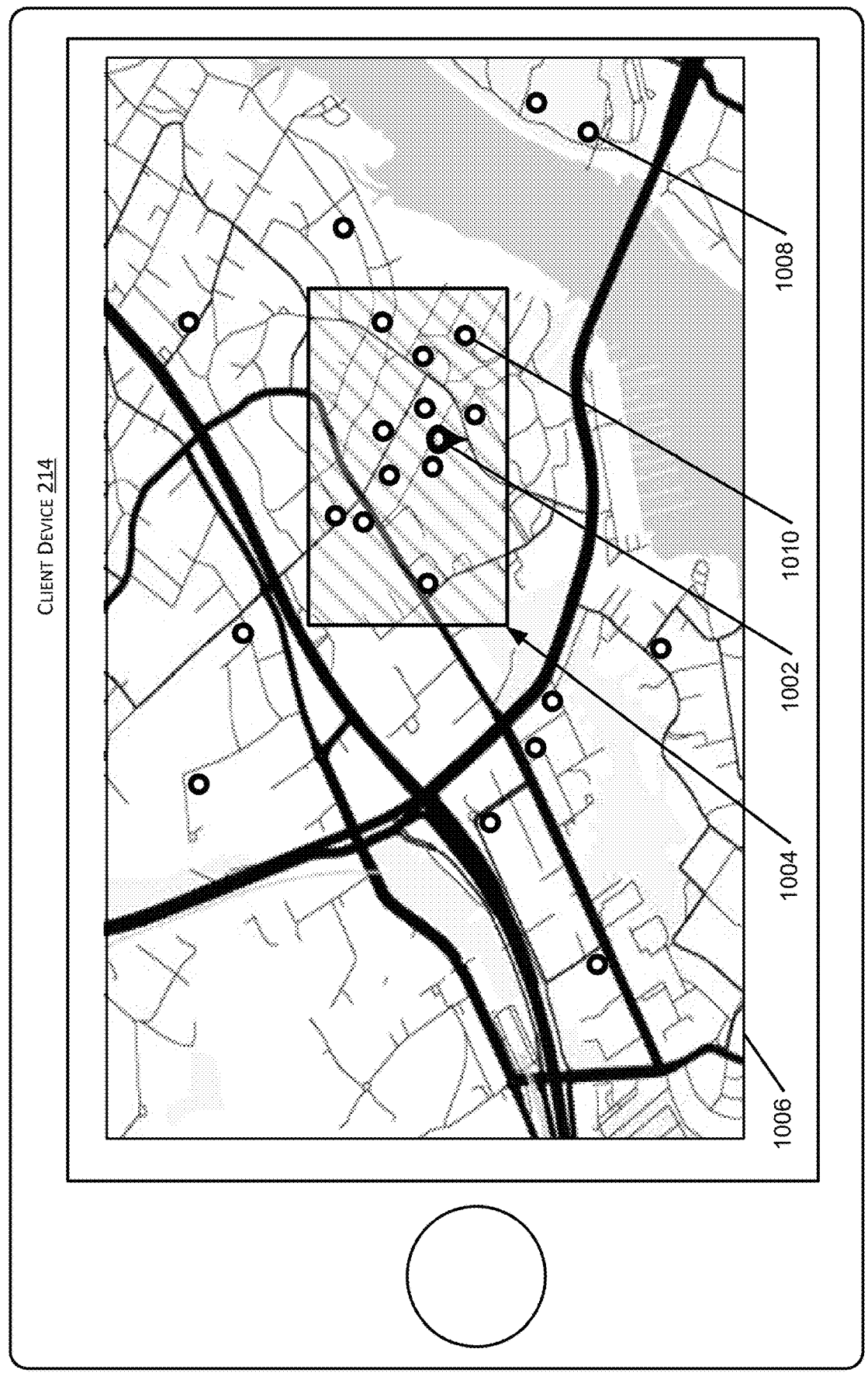
FIG. 10 illustrates an example of a geographic network, according to various aspects of the present disclosure.

FIG. 10 illustrates an example of a geographic network of users, according to various aspects of the present disclosure. In some examples, a geographic network may be executed by a geographic network platform, such as a geographic network platform operating on the backend server(s) 224 and/or one or more other or additional components of the network of servers/backend devices 220. As such, the backend server(s) 224 and/or one or more other or additional components of the network of servers/backend devices 220 may store and/or maintain the components, features, and/or functionality of the geographic network platform. In some examples, and without limitation, the geographic network may be a neighborhood-oriented or local-oriented network, such as Neighborhoods®, Neighbors, or Nextdoor®. In other examples, and without limitation, the geographic network may be a social media network (or a feature within a social media network), such as Facebook®, Twitter®, or Instagram®.

The geographic network platform may enable users of the geographic network to share content (e.g., image data (e.g., image data 406), audio data (e.g., audio data 408), text data (e.g., text data 414), input data (e.g., input data 410), motion data (e.g., motion data 412), sensor data (e.g., sensor data 520) and/or other data from the user's electronic devices (e.g., sensor(s) 204, automation device(s) 204, A/V device(s) 210, electronic device(s) 230, light emitter(s) 232, etc.) and/or the user's client device (e.g., the client device(s) 214, 216)) with other users of the geographic network. The geographic network platform may allow users that are located within geographic area(s) to register with the geographic network to access content shared by other users within the geographic area(s). As such, the content that a particular user may have access to may be based on the user's location (e.g., the location of the user's residence, the location of one or more electronic devices associated with the user, the current location of the user (e.g., based on a location of the user's client device), etc.) and/or the location of the electronic device(s) that generated the content. For example, users that are located in a geographic area may share content with other users in the geographic area and/or in a similar geographic area, and/or users may view content shared by other users that are located within his or her geographic area (e.g., a neighborhood, a town, a city, a state, a user-defined area, etc.) and/or in a similar geographic area.

In some examples, a user may register with the geographic network platform if the user has an A/V device and/or has an application (e.g., a mobile application, a web application, etc.) associated with the geographic network installed on and/or running on his or her client device. In some examples, the client device may transmit the consent data to the geographic network platform to register. When registering for the geographic network, the user may register, or be required to register, with respect to a geographic area. In some examples, a user may register with the geographic area of the geographic network if the user's residence is located within the geographic area and/or the user has electronic device(s) located (e.g., installed) within the geographic area. In some examples, a user may be a member to one or more geographic areas of the geographic network.

In some examples, a user may be verified to a geographic area of the geographic network that the user is requesting to join. For example, to determine if the user is actually located within a geographic area, GNSS data of the user's electronic device may be used (e.g., during and/or after installation, provisioning, and/or setup of the electronic device). As another example, to determine if the user is actually located within a geographic area, GNSS data of the user's client device may be compared (e.g., over a period time) to an address input by the user. For example, if the user inputs an address, and the location of the user's client device is within a threshold proximity to the address (e.g., over the period of time, which may be, for example and without limitation, four hours, six hours, twenty-four hours, two days, etc.), the user may be verified to the address, and thus verified to the geographic area of the geographic network. A verified user may have full access to features of the geographic network, and/or full access to content shared by other users of the geographic network in the geographic area that the user is verified for. Non-verified users may have limited access to features and/or content of the geographic network. For example, non-verified users may only be able to view content, but not interact with (e.g., comment on, like, share, etc.) the content, and/or may not be able to share his or her own content. A single user may be a verified user of one geographic area of the geographic network and may be a non-verified user of a second geographic area of the geographic network.

In some examples, a provider of the geographic network platform (e.g., hosted on the backend server(s) 224) may receive shared content from any user that is associated with the provider and/or the geographic network, but each individual user may only share content with and/or view content shared from other users within a geographic area of the user. As a result, content provided to and/or made available to each user by the geographic network platform may be unique to each user (e.g., based on the unique location of the user's residence and/or the user's electronic device(s), etc.), and/or unique to a geographic area (e.g., all users associated with a geographic area of the geographic network).

In one illustration of a geographic network, the geographic network platform may facilitate a content feed to allows a user of the geographic network to post videos, photos, text, events, and/or other data to alert other members of possible suspicious activity in a geographic area. Additionally, or alternatively, news items, police sourced information, and/or other third-party data may be posted to the content feed of the geographic network (e.g., by the users and/or by the provider of the geographic network (e.g., the host of the geographic network platform)), that are related to crime and/or safety of the geographic area (e.g., restricting news items to those related to the geographic area). Members of the geographic network may rate, like, dislike, comment, download, share an existing post/alert with others, and/or upload a new post/alert to the content feed to provide additional information for other users.

A geographic area of a geographic network may be defined using various methods. For example, a geographic area may be associated with one or more neighborhoods, towns, zip codes, cities, states, or countries. In another example, a geographic area may be determined by the backend server(s) 224 based on grouping a particular number of electronic devices or client devices about a particular vicinity. In a further example, a user may customize a geographic area (e.g., by drawing the geographic area on a map, by providing a radius from the user's property for which the user would like to view shared content, by positioning a boundary (e.g., using markers to define a polygon) of the geographic area over a map, etc.). In such an example, the user's geographic area may be unique to the user.

For example, and as illustrated in FIG. 10, a portion of the geographic network is shown. With reference to FIG. 10, and during a setup or registration process with the geographic network, the geographic location 1002 to be associated with the user of the client device 214 may be determined (e.g., based on an address being input by the user, based on a determination of the location of the client device 214, based on the location of the electronic device(s) associated with the user (in examples where the user 214 has one or more electronic devices). In some examples, the user may then be associated with the geographic area 1004 of the geographic network, such as based on the neighborhood, town, city, zip code, state, country, or other area that the user is located. In one example, the geographic area 1004 may be the town that the geographic location 1002 associated with the user is located. In other examples, the user may define, on the map 1006, the geographic area 1004 of the geographic network that the user wishes to have access to content, which may include the geographic location 1002 associated with the user. To define the geographic area 1004, the user may overlay a predefined shape on the map 1006 (e.g., a rectangle, as shown, a circle, a triangle, a square, a polygon, etc.), may position any number of vertices to define a polygon on the map 1006, may define a radius about the geographic location 1002 associated with the user, may draw the geographic area 1004 on the map, etc. The geographic network may limit the size of the geographic area 1004 for the user. The size may be limited to a maximum distance in any direction from the geographic location 1002 (e.g., a radius) associated with the user of less than, for example and without limitation, two miles, five miles, ten miles, fifteen miles, fifty miles, or the like.

Although the geographic area 1004 includes the geographic area 1004 of the geographic network that the user may desire to view content from, the content shared by the user may be shared with a larger, smaller, and/or different geographic area of the geographic network than the geographic area 1004. For example, the geographic area 1004 may include the geographic area that the user can view content in, but any users located within the entire portion of the map 1006 displayed on the client device 214 may be able to view content shared by the user of the client device 214 (e.g., depending on the geographic areas defined by and/or associated with the other users located within the portion of the map 1006). For example, users of the geographic network having associated geographic location(s) 1008 outside of the geographic area 1004 may be able to view the content shared by the user of the client device 214, but the user of the client device 214 may not be able to view, or may choose not to view (e.g., by defining the geographic area 1004 that does not include the geographic locations 1008), the content shared by the user(s) associated with the geographic location(s) 1008. In other examples, the geographic area 1004 that the user of the client device 214 desires to view content from may also be the same geographic area 1004 that users can view content shared by the user of the client device 214. For example, where the geographic area 1004 is a town, each of the users located within the town may only be able to view and share content with each other user located in the town. As another example, where the geographic area 1004 is defined by the user of the client device 214, the user of the client device 214 may only be able to view content by the users who are located within the geographic area 1004 and the users within the geographic area 1004 may be the only users that can view content shared by the user of the client device 214.

With further reference to FIG. 10, and during use of the geographic network platform by the user of the client device 214, the user may access a GUI (e.g., a GUI 618) on the client device 214 (e.g., within a mobile or web application). The user may desire to view shared content from users of the geographic area 1004 of the geographic network. As such, the icons (e.g., graphical elements) illustrating the geographic locations 1010 may be included within the geographic area 1004 because data generated by client devices and/or electronic devices of users associated with the geographic locations 1010 may be available for viewing. In some examples, the icons may be included because the content has not yet been viewed by the user, because the content was shared within a time period (e.g., within the last day, within the last two days, within the last week, etc.), and/or based on other criteria. The user may select the icons, and in response, the user may receive the content (e.g., the image data, audio data, the text data, etc.) associated with the icons (e.g., from the backend server(s) 224). Although illustrated as icons on a map, in some examples, the content may additionally, or alternatively, be provided as a list. For example, the list may include text describing the content (e.g., date, time, description, location (e.g., as a selectable icon, that when selected may allow the user to view the location on a map), etc.), and individual listings may be selectable, similar to the icons on the map 1006.

In some examples, the backend server(s) 224 may use stored events 530 associated with the user to determine when similar events are occurring at geographical locations (e.g., properties) associated with other users that are included in a similar geographic network as the user. Additionally, the backend server(s) 224 may use stored events 530 associated with the other users to determine when similar events are occurring at the geographic location (e.g., the property) associated with the user. For example, the backend server(s) 224 may determine that similar events may occur at geographic locations of users that are associated with the same geographic network. This may be based on many factors, including, but not limited to, the geographic area 1004 in which the users are located (e.g., the geographic area 1004 associated with the geographic network), that the geographic locations are located within a similar time zone, that users located within similar geographic networks may include similar electronic device(s), and/or the like.

Each of the processes described herein, including the processes 1100, 1200, 1300, and 1400, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 11A:

FIGS. 11A-111B are a flowchart illustrating an example process 1100 for analyzing sensor data to determine that an event is occurring, and then storing image data in association with the event, according to various aspects of the present disclosure. The process 1100, at block B1102, includes receiving first data indicating a group of electronic devices. For example, the backend server(s) 224 (and/or the hub device 202) may receive configuration data 512, such as from the client device 214, 216. The configuration data 512 may include at least data representing identifiers 514 of electronic devices and data indicating association(s) 516 between the electronic devices. The electronic devices may include, but are not limited to, sensor(s) 204 (e.g., standalone motion sensor(s) 204, etc.), automation device(s) 206, A/V device(s) 210, electronic device(s) 230, light emitter(s) 232, and/or other types of electronic device(s). In some examples, based on the configuration data 512, the backend server(s) 224 (and/or the hub device 202) may store data (e.g., the configuration data 512) grouping the electronic devices.

The process 1100, at block B1104, includes receiving second data indicating one or more characteristics associated with the electronic devices. For example, the backend server(s) 224 (and/or the hub device 202) may receive data indicating characteristic(s) 518 associated with the electronic devices. In some examples, the data indicating the characteristic(s) 518 is included in the configuration data 512. In some examples, the backend server(s) 224 (and/or the hub device 202) may receive the data indicating the characteristic(s) 518 separately from the configuration data 512.

The process 1100, at block B1106, includes receiving, at a first time, third data indicating that a first electronic device, from the group of electronic devices, detected an object. For example, the backend server(s) 224 (and/or the hub device 202) may receive, at the first time, first sensor data 520 indicating that a first electronic device, from the electronic devices, detected an object. In some examples, the first sensor data 520 may include motion data generated by a first motion sensor of the first electronic device, where the motion data indicates that the first motion sensor detected first motion of the object (e.g., wherein the motion data indicates that the first motion sensor detected a change in a field of view of the first motion sensor). In some examples, the first sensor data 520 may include image data 406 generated by the first electronic device, where the image data 406 represents the object (e.g., where the image data 406 represents a change in the field of view of the first electronic device).

The process 1100, at block B1108, includes generating a tag representing an event. For example, based on the first sensor data 520, the backend server(s) 224 (and/or the hub device 202) may generate a tag 522 representing an event. The event tag 522 may indicate a time (e.g., the first time) at which the first motion and/or the object was detected, the first electronic device detected the first motion and/or the object, the group of electronic devices detected the first motion and/or the object, a length of time that the first electronic device detected the first motion and/or the object, a length of time that the group of electronic devices detected motion and/or the object, and/or the like. In some examples, the backend server(s) 224 (and/or the hub device 202) may then associate the first sensor data 520 with the tag 522.

The process 1100, at block B1110, includes starting a timer for a first period of time. For example, based on the first sensor data 520, the backend server(s) 224 (and/or the hub device 202) may start a timer 524 for a first period of time. The first period of time may include, but is not limited to, five seconds, thirty seconds, one minute, five minutes, and/or the like. In some examples, the first period of time may correspond to a length of time at which the event is to occur (e.g., if the electronic devices do not subsequently detect the object).

The process 1100, at block B1112, includes obtaining first image data generated by a first camera device of the group of electronic devices. For example, based on the first sensor data 520, the backend server(s) 224 (and/or the hub device 202) may obtain first image data 406 generated by a first camera device (e.g., a first A/V device 210) of the group of electronic devices. In some examples, the first camera device includes the first electronic device. Alternatively, in some examples, the first camera device is different than the first electronic device. In some examples, such as if the backend server(s) 224 (and/or the hub device 202) are continuously receiving image data 406 generated by the first camera device, the backend server(s) 224 (and/or the hub device 202) may retrieve a portion of the image data 406, where the portion corresponds to the first image data 406. In some examples, the backend server(s) 224 (and/or the hub device 202) may transmit a first control signal 420 to the first camera device that causes the first camera device to generate and/or transmit the first image data 406.

The process 1100, at block B1114, includes receiving, at a second time, fourth data indicating that a second electronic device, from the group of electronic devices, detected the object. For example, the backend server(s) 224 (and/or the hub device 202) may receive, at the second time, second sensor data 520 indicating that a second electronic device, from the electronic devices, detected the object. In some examples, the second sensor data 520 may include motion data generated by a second motion sensor of the second electronic device, where the motion data indicates that the second motion sensor detected second motion of the object (e.g., the motion data indicates that the second motion sensor detected a change in the field of view of the second motion sensor). In some examples, the second sensor data 520 may include image data 406 generated by the second electronic device, where the image data 406 represents the object (e.g., where the image data 406 represents a change in the field of view of the second electronic device). In some examples, the second electronic device may include the first electronic device and/or the first camera device. In some examples, the second electronic device is different than the first electronic device and the first camera device.

The process 1100, at block B1116, includes determining that the second electronic device detected the object after the first electronic device detected the object. For example, the backend server(s) (and/or the hub device 202) may determine, based on the first sensor data 520 and the second sensor data 520, that the second electronic device detected the object after the first electronic device. For instance, the backend server(s) 224 (and/or the hub device 202) may determine that the second time at which the second electronic device detected the object is after the first time at which the first electronic device detected the object.

The process 1100, at block B1118, includes determining that the second time is within a threshold period of time to the first time. For example, the backend server(s) 224 (and/or the hub device 202) may determine that the second time is within a threshold period of time to the first time. In some examples, the threshold period of time may include the first period of time. In such examples, the backend server(s) 224 (and/or the hub device 202) may make the determination based on the backend server(s) 224 (and/or the hub device 202) receiving the second sensor data 520 before the expiration of the first period of time.

The process 1100, at block B1120, includes restarting the timer for a second period of time. For examples, based on the second sensor data 520 and/or based on the second time being within the threshold period of time as the first time, the backend server(s) 224 (and/or the hub device 202) may restart the timer 524 for a second period of time. The second period of time may include, but is not limited to, five seconds, thirty seconds, one minute, five minutes, and/or the like. In some examples, the second period of time may be the same as the first period of time. In some examples, the second period of time may be different than the first period of time.

The process 1100, at block B1122, includes obtaining second image data generated by at least one of the first camera device or a second camera device of the group of electronic devices. For example, based on the second sensor data 520, the backend server(s) 224 (and/or the hub device 202) may obtain second image data 406 generated by the first camera device (e.g., the first A/V device 210) and/or a second camera device (e.g., a second A/V device 210) of the group of electronic devices. In some examples, the second camera device includes the first electronic device. In some examples, the second camera device includes the second electronic device. Still, in some examples, the second camera device is different than the first electronic device and the second electronic devices. In some examples, such as if the backend server(s) 224 (and/or the hub device 202) are continuously receiving image data 406 generated by the second camera device, the backend server(s) 224 (and/or the hub device 202) may retrieve a portion of the image data 406, where the portion corresponds to the second image data 406. In some examples, the backend server(s) 224 (and/or the hub device 202) may transmit a second control signal 420 to the second camera device that causes the second camera device to generate and/or transmit the second image data 406.

The process 1100, at block B1124, includes associating the first image data and the second image data with the event tag. For example, the backend server(s) 224 (and/or the hub device 202) may associate the first image data 406 and the second image data 406 the tag 522 associated with the event. In some examples, the backend server(s) 224 (and/or the hub device 202) may also associate the first sensor data 520 and the second sensor data 520 with the event.

Figure 12B:

FIGS. 12A-12B are a flowchart illustrating a second example process 1200 for analyzing sensor data to determine that an event is occurring, and then storing image data in association with the event, according to various aspects of the present disclosure. The process 1200, at block B1202, includes receiving first data indicating a group of electronic devices. For example, the backend server(s) 224 (and/or the hub device 202) may receive configuration data 512, such as from the client device 214, 216. The configuration data 512 may include at least data representing identifiers 514 of electronic devices and data indicating association(s) 516 between the electronic devices. The electronic devices may include, but are not limited to, sensor(s) 204 (e.g., stand-alone motion sensor(s) 204, etc.), automation device(s) 206, A/V device(s) 210, electronic device(s) 230, light emitter(s) 232, and/or other types of electronic device(s).

The process 1200, at block B1204, includes storing second data indicating the group of electronic devices. For example, based on receiving the configuration data 512, the backend server(s) 224 (and/or the hub device 202) may store second data indicating the group of electronic devices. In some examples, the second data includes the configuration data 512.

The process 1200, at block B1206, includes receiving, at a first time, third data indicating that a first electronic device, from the group of electronic devices, detected an object. For example, the backend server(s) 224 (and/or the hub device 202) may receive, at a first time, first sensor data 520 indicating that a first electronic device, from the group of electronic devices, detected an object. In some examples, the first sensor data 520 may include first motion data generated by a first motion sensor of the first electronic device, where the first motion data indicates that the first motion sensor detected first motion of the object. In some examples, the first sensor data 520 may include image data 406 generated by the first electronic device, where the image data 406 represents the object.

The process 1200, at block B1208, includes obtaining first image data generated by a first camera device. For example, based on the first sensor data 520, the backend server(s) 224 (and/or the hub device 202) may obtain first image data 406 generated by a first camera device (e.g., a first A/V device 210). In some examples, the first camera device includes the first electronic device. Alternatively, in some examples, the first camera device is different than the first electronic device. In some examples, such as if the backend server(s) 224 (and/or the hub device 202) are continuously receiving image data 406 generated by the first camera device, the backend server(s) 224 (and/or the hub device 202) may retrieve a portion of the image data 406, where the portion corresponds to the first image data 406. In some examples, the backend server(s) 224 (and/or the hub device 202) may transmit a first control signal 420 to the first camera device that causes the first camera device to generate and/or transmit the first image data 406.

The process 1200, at block B1210, includes associating the first image data with an event. For example, the backend server(s) 224 (and/or the hub device 202) may associate the first image data 406 with the event. In some examples, associating the first image data 406 with the event includes storing data that associates the first image data 406 with an event tag 522 for the event. In some examples, the backend server(s) 224 (and/or the hub device 202) may start a timer 524 for a first period of time, where the first period of time is also associated with the event.

The process 1200, at block B1212, includes receiving, at a second time, fourth data indicating that a second electronic device, from the group of electronic devices, detected the object. For example, the backend server(s) 224 (and/or the hub device 202) may receive, at a second time, second sensor data 520 indicating that a second electronic device, from the group of electronic devices, detected the object. In some examples, the second sensor data 520 may include second motion data generated by a second motion sensor of the second electronic device, where the second motion data indicates that the second motion sensor detected second motion of the object. In some examples, the second sensor data 520 may include image data 406 generated by the second electronic device, where the image data 406 represents the object. In some examples, the second electronic device may include the first electronic device and/or the first camera device. In some examples, the second electronic device is different than the first electronic device and the first camera device.

The process 1200, at block B1214, includes obtaining second image data generated by at least one of the first camera device or a second camera device. For example, based on the second sensor data 520, the backend server(s) 224 (and/or the hub device 202) may obtain second image data 406 generated by the first camera device (e.g., the first A/V device 210) and/or a second camera device (e.g., a second A/V device 210). In some examples, the second camera device includes the first electronic device, the second electronic device, and/or the first camera device. In some examples, the second camera device is different than the first electronic device, the second electronic device, and the first camera device. In some examples, such as if the backend server(s) 224 (and/or the hub device 202) are continuously receiving image data 406 generated by the second camera device, the backend server(s) 224 (and/or the hub device 202) may retrieve a portion of the image data 406, where the portion corresponds to the second image data 406. In some examples, the backend server(s) 224 (and/or the hub device 202) may transmit a second control signal 420 to the second camera device that causes the second camera device to generate and/or transmit the second image data 406.

The process 1200, at block B1216, includes determining that the second time is within a threshold period of time to the first time. For example, the backend server(s) 224 (and/or the hub device 202) may determine that the second time is within the threshold period of time to the first time. In some examples, the threshold period of time may include the first period of time. In such examples, the backend server(s) 224 (and/or the hub device 202) may make the determination based on the backend server(s) 224 (and/or the hub device 202) receiving the second sensor data 520 before the expiration of the first period of time.

The process 1200, at bock B1218, includes associating the second image data with the event. For example, the backend server(s) 224 (and/or the hub device 202) may determine that the first sensor data 520 and the second sensor data 520 are associated with the same event based on the second time being within the threshold period of time to the first time. Based on the determination, the backend server(s) 224 (and/or the hub device 202) may associate the second image data 406 with the event. In some examples, associating the second image data 406 with the event includes storing data that associates the second image data 406 with the event tag 522 for the event. In some examples, the backend server(s) 224 (and/or the hub device 202) may restart the timer 524 for a second period of time, where the second period of time is also associated with the event. Still, in some examples, the backend server(s) 224 (and/or the hub device 202) may associate the first sensor data 520 and/or the second sensor data 520 with the event.

Figure 13A:
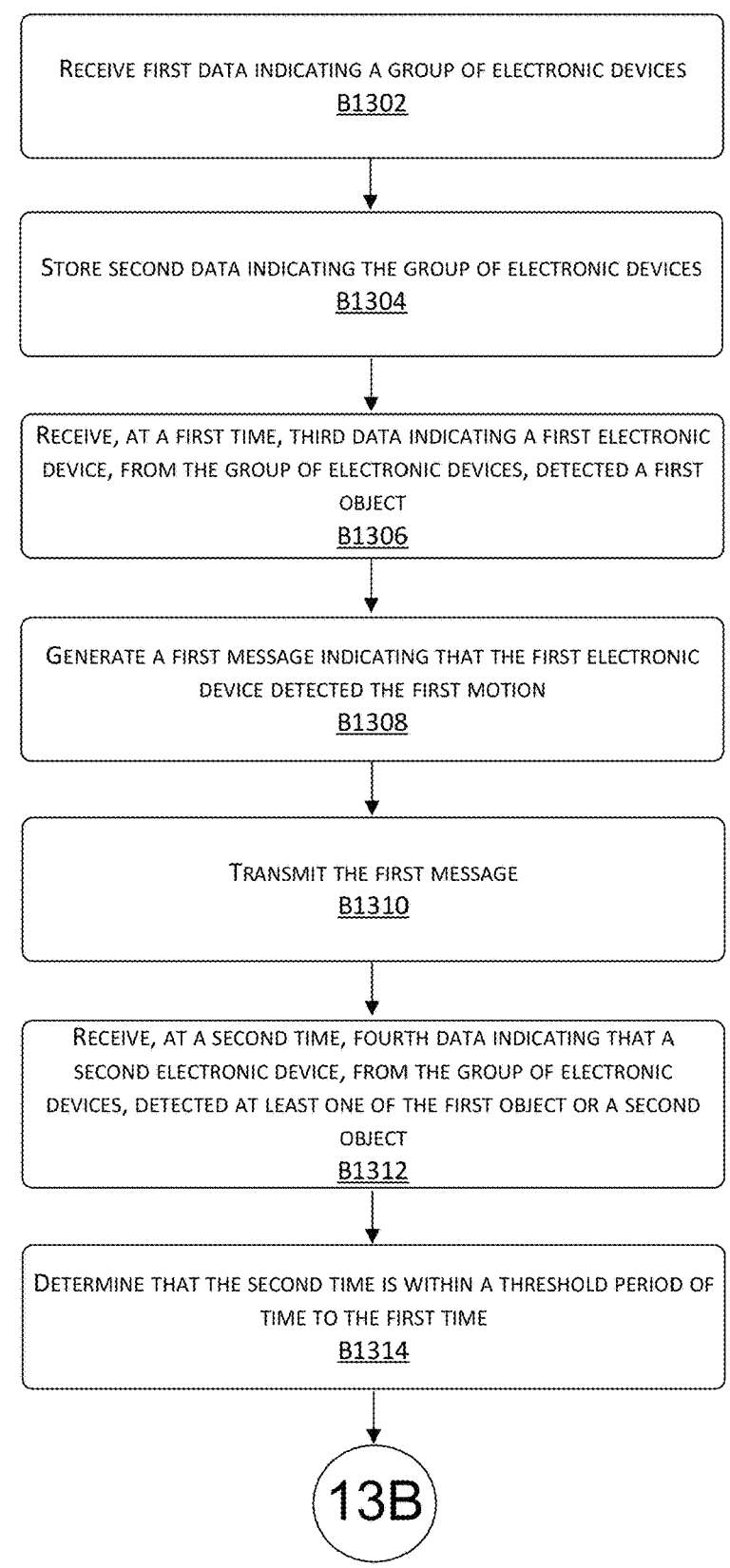
FIGS. 13A-13B are a flowchart of an example process for analyzing sensor data in order to determine whether to transmit messages to a client device, according to various aspects of the present disclosure.
Figure 13B:
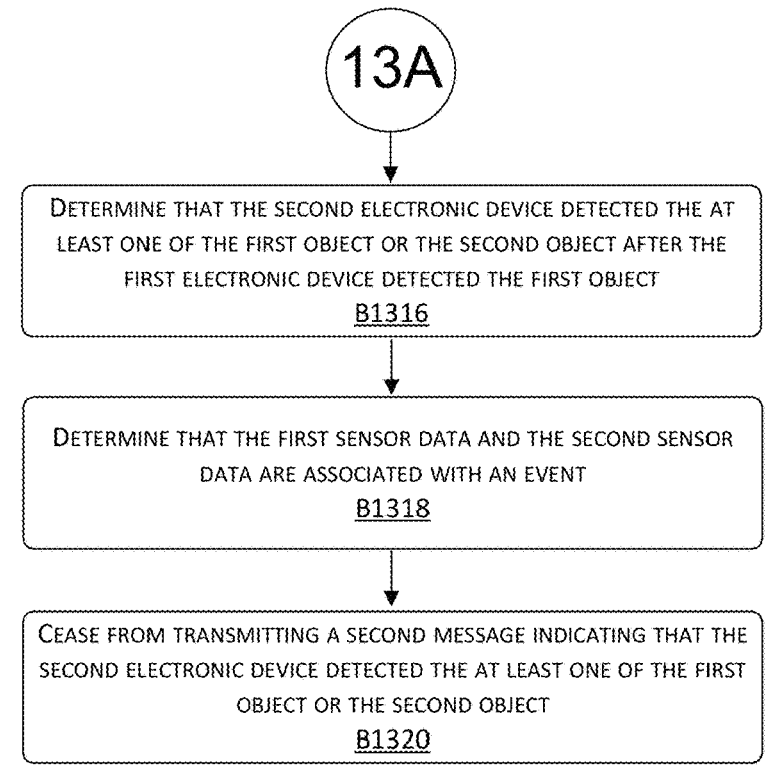

FIGS. 13A-13B are a flowchart of an example process 1300 for analyzing sensor data to determine whether to transmit messages to a client device, according to various aspects of the present disclosure. The process 1300, at block B1302, includes receiving first data indicating a group of electronic devices. For example, the backend server(s) 224 (and/or the hub device 202) may receive configuration data 512, such as from the client device 214, 216. The configuration data 512 may include at least data representing identifiers 514 of electronic devices and data indicating association(s) 516 between the electronic devices. The electronic devices may include, but are not limited to, sensor(s) 204 (e.g., standalone motion sensor(s) 204, etc.), automation device(s) 206, A/V device(s) 210, electronic device(s) 230, light emitter(s) 232, and/or other types of electronic device(s).

The process 1300, at block B1304, includes storing second data indicating the group of electronic devices. For example, based on receiving the configuration data 512, the backend server(s) 224 (and/or the hub device 202) may store second data indicating the group of electronic devices. In some examples, the second data includes the configuration data 512.

The process 1300, at block B1306, includes receiving, at a first time, third data indicating that a first electronic device, from the group of electronic devices, detected a first object. For example, the backend server(s) 224 (and/or the hub device 202) may receive, at a first time, first sensor data 520 indicating that a first electronic device, from the group of electronic devices, detected a first object. In some examples, the first sensor data 520 may include first motion data generated by a first motion sensor of the first electronic device, where the first motion data indicates that the first motion sensor detected first motion of the first object. In some examples, the first sensor data 520 may include image data 406 generated by the first electronic device, where the image data 406 represents the first object.

The process 1300, at block B1308, includes generating a first message indicating that the first electronic device detected the first object. For example, the backend server(s) 224 (and/or the hub device 202) may generate a first message 416 indicating that the first electronic device detected the first object (and/or detected the first motion). In some examples, the first message 416 may indicate that the group of electronic devices detected the first object (and/or the first motion). In some examples, the backend server(s) 224 (and/or the hub device 202) may further start a timer 524 for a first period of time. The first period of time may be associated with an event.

The process 1300 at block B1310, includes transmitting the first message. For example, the backend server(s) 224 (and/or the hub device 202) may transmit the first message 416 to the client device 214, 216.

The process 1300, at block B1312, includes receiving, at a second time, fourth data indicating that a second electronic device, from the group of electronic devices, detected at least one of the first object or a second object. For example, the backend server(s) 224 (and/or the hub device 202) may receive, at a second time, second sensor data 520 indicating that a second electronic device, from the group of electronic devices, detected the first object or/or the second object. In some examples, the second sensor data 520 may include second motion data generated by a second motion sensor of the second electronic device, where the second motion data indicates that the second motion sensor detected second motion of the first object and/or the second object. In some examples, the second sensor data 520 may include image data 406 generated by the second electronic device, where the image data 406 represents the first object and/or the second object. In some examples, the second electronic device may include the first electronic device. In some examples, the second electronic device is different than the first electronic device.

The process 1300, at block B1314, includes determining that the second time is within a threshold period of time to the first time. For example, the backend server(s) 224 (and/or the hub device 202) may determine that the second time is within the threshold period of time to the first time. In some examples, the threshold period of time may include the first period of time. In such examples, the backend server(s) 224 (and/or the hub device 202) may make the determination based on the backend server(s) (and/or the hub device 202) receiving the second sensor data 520 before the expiration of the first period of time.

The process 1300, at block B1316, includes determining that the second electronic device detected the at least one of the first object or the second object after the first electronic device detected the first object. For example, the backend server(s) 224 (and/or the hub device 202) may determine that the second electronic device detected the first object and/or the second object after the first electronic device detected the first object. In some examples, the backend server(s) 224 (and/or the hub device 202) makes the determination based on the first electronic device detecting the first object at the first time and the second electronic device detecting the first object and/or the second object at the second, later time. In some examples, the backend server(s) 224 (and/or the hub device 202) may determine that the second electronic device detected the first object and/or the second object before any other electronic device from the group of electronic devices.

The process 1300, at block B1318, includes determining that the first sensor data and the second sensor data are associated with an event. For example, the backend server(s) 224 (and/or the hub device 202) may determine that the first sensor data 520 and the second sensor data 520 are associated with the event. In some examples, the backend server(s) 224 (and/or the hub device 202) may make the determination based on the second time being within the threshold period of time to the first time. Additionally, or alternatively, in some examples, the backend server(s) 224 (and/or the hub device 202) may make the determination based on the second electronic device detecting the first object and/or the second object after the first electronic device detected the first object. Additionally, or alternatively, in some examples, the backend server(s) 224 (and/or the hub device 202) may make the determination based on the second electronic device detecting the first object and/or the second object before any other electronic device.

The process 1300, at block B1320, includes ceasing from transmitting a second message indicating that the second electronic device detected the at least one of the first object or the second object. For example, the backend server(s) 224 (and/or the hub device 202) may cease from transmitting the second message 416 indicating that the second electronic device detected the first object and/or the second object. In some examples, the backend server(s) 224 (and/or the hub device 202) ceases from transmitting the second message 416 based on determining that the first sensor data 520 and the second sensor data 520 are associated with the event.

Figure 14B:
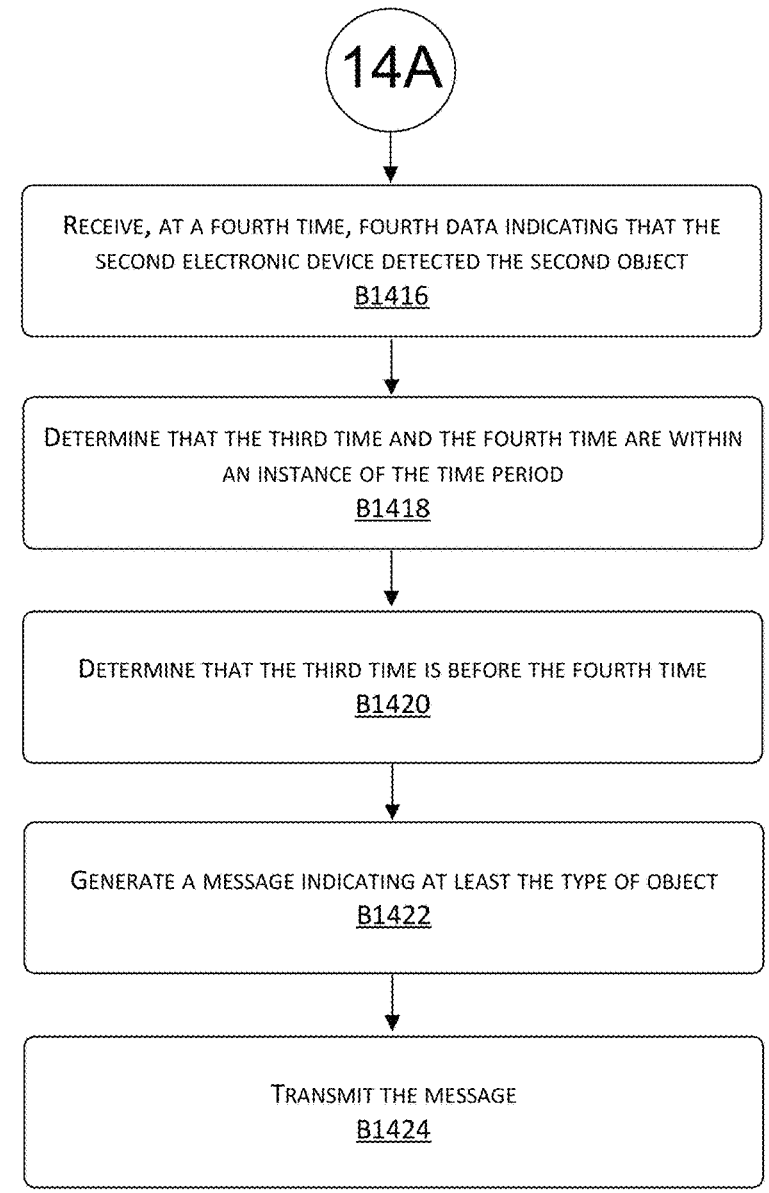

FIGS. 14A-14B are a flowchart of an example process 1400 for using sensor data to generate messages associated with events, according to various aspects of the present disclosure. The process 1400, at block B1402, includes receiving, at a first time, first data indicating that a first electronic device detected a first object. For example, the backend server(s) 224 (and/or the hub device 202) may receive, at the first time, first sensor data 520 indicating that the first electronic device detected a first object. In some examples, the first sensor data 520 may include first motion data generated by a first motion sensor of the first electronic device, where the first motion data indicates that the first motion sensor detected first motion of the first object. In some examples, the first sensor data 520 may include image data 406 generated by the first electronic device, where the image data 406 represents the first object.

The process 1400, at block B1404, includes receiving, at a second time, second data indicating that a second electronic device detected the first object. For example, the backend server(s) 224 (and/or the hub device 202) may receive, at a second time, second sensor data 520 indicating that the second electronic device detected the first object. In some examples, the second sensor data 520 may include second motion data generated by a second motion sensor of the second electronic device, where the second motion data indicates that the second motion sensor detected second motion of the first object. In some examples, the second sensor data 520 may include image data 406 generated by the second electronic device, where the image data 406 represents the first object.

The process 1400, at block B1406, includes receiving image data generated by a camera device. For example, the backend server(s) 224 (and/or the hub device 202) may receive image data 406 generated by the camera device. In some examples, the camera device may include the first electronic device or the second electronic device. In other examples, the camera device may be different than the first electronic device and the second electronic device.

The process 1400, at block B1408, includes determining that the image data represents the first object. For example, the backend server(s) 224 (and/or the hub device 202) may analyze the image data 406 (e.g., using image processing) and, based on the analysis, determine that the image data 406 represents the first object.

The process 1400, at block B1410, includes determining a type of object associated with the object. For example, the backend server(s) 224 (and/or the hub device 202) may determine, based on the analysis of the image data 406, a type of object 532 associated with the object. The type of object 532 may include, but not limited to, a person, an animal, a vehicle, a device, and/or any other type of object 532 that may be represented by the image data 406. In some examples, the backend server(s) 224 (and/or the hub device 202) may further determine an event based on the image data 406, the type of object 532, the first time, and the second time. For example, the backend server(s) 224 (and/or the hub device 202) may determine that the event includes a carrier dropping off a packet based on both the type of object 532 including the carrier and the first time and the second time being within a time period at which carriers would normally drop of packages.

The process 1400, at block B1412, includes storing an association between the type of object, the first electronic device, the second electronic device, and a time period. For example, the backend server(s) 224 (and/or the hub device 202) may store a stored event 530, which associates the type of object 532, the first electronic device, the second electronic device, and a time period. The backend server(s) 224 (and/or the hub device 202) may determine the time period based on the time period including both the first time and the second time. In some examples, the stored event 530 further associates the event with at least the time period.

The process 1400, at block B1414, includes receiving, at a third time, third data indicating that the first electronic device detected a second object. For example, the backend server(s) 224 (and/or the hub device 202) may receive, at the third time, third sensor data 520 indicating that the first electronic device detected a second object. In some examples, the third sensor data 520 may include third motion data generated by the first motion sensor of the first electronic device, where the third motion data indicates that the first motion sensor detected third motion of the second object. In some examples, the third sensor data 520 may include image data 406 generated by the first electronic device, where the image data 406 represents the second object. In some examples, the second object may include the first object. In other instances, the second object may be different than the first object.

The process 1400, at block B1416, includes receiving, at a fourth time, fourth data indicating that the second electronic device detected the second object. For example, the backend server(s) 224 (and/or the hub device 202) may receive, at a fourth time, fourth sensor data 520 indicating that the second electronic device detected the second object. In some examples, the fourth sensor data 520 may include fourth motion data generated by the second motion sensor of the second electronic device, where the fourth motion data indicates that the second motion sensor detected fourth motion of the second object. In some examples, the fourth sensor data 520 may include image data 406 generated by the second electronic device, where the image data 406 represents the second object.

The process 1400, at block B1418, includes determining that the third time and the fourth time are within an instance of the time period. For example, the backend server(s) 224 (and/or the hub device 202) may determine that the third time and the fourth time are within an instance of the time period.

The process 1400, at block B1420, includes determining that the third time is before the fourth time. For example, the backend server(s) 224 (and/or the hub device 202) may determine that the third time is before the fourth time.

The process 1400, at block B1422, includes generating a message indicating at least the type of object. For example, the backend server(s) 224 (and/or the hub device 202) may generate the message 416 indicating the type of object 532. In some examples, the backend server(s) 224 (and/or the hub device 202) generates the message 416 based on the third time and the fourth time being within the instance of the time period. Additionally, or alternatively, in some examples, the backend server(s) 224 (and/or the hub device 202) generates the message 416 based on the third time being before the fourth time. In some examples, the message 416 may further indicate that the event is occurred.

The process 1400, at block B1424, includes transmitting the message. For example, the backend server(s) 224 (and/or the hub device 202) may transmit the message 416 to the client device 214, 216.

Even though the process 1400 of FIG. 14 describes the backend server(s) 224 (and/or the hub device 202) determining the type of object (and/or the event) using image data 406 at blocks B1406-B1410, in other examples, the backend server(s) 224 (and/or the hub device 202) may additionally, or alternatively, determine the type of object (and/or the event) based on data received from the client device 214, 216. For example, the data may indicate that the event occurred during the time period.

The processes described herein enable a network device(s) (e.g., the backend server(s) 224, the hub device 202, etc.) to determine when sensor data 520, which is generated by multiple electronic devices, is associated with a same event. Based on the determination, the network device(s) are then able to perform one or more actions. For example, the network device(s) are able to cease from transmitting multiple messages 416 associated with the sensor data 520, associate image data 406 generated by one or more A/V devices with the same event, and/or the like. As such, the user associated with the electronic devices does not receive multiple messages 416 that each indicate that the same event is occurring. Additionally, the user may be provided with all of the image data 406 that is associated with the event, such that the user may more easily determine what the event includes and/or how the event occurred.

Additionally, the processes described herein enable the network device(s) to generate messages 416 that are more informative for the user. For example, the network device(s) may use sensor data 520 generated by the electronic devices to generate a stored event 530. Later, the network device(s) may use sensor data 520 that is generated by the electronic devices to determine that the event is once again occurring at the geographic location. Based on the determination, the network device(s) may generate a message 416 indicating that the event is occurring at the geographic location and transmit the message to the client device 214, 216. As such, the user may view the message 416 to determine that the event is occurring at the geographic location. This may be more helpful to the user than messages 416 that merely indicate that the electronic devices detected an object at the geographic location.

Figure 15:
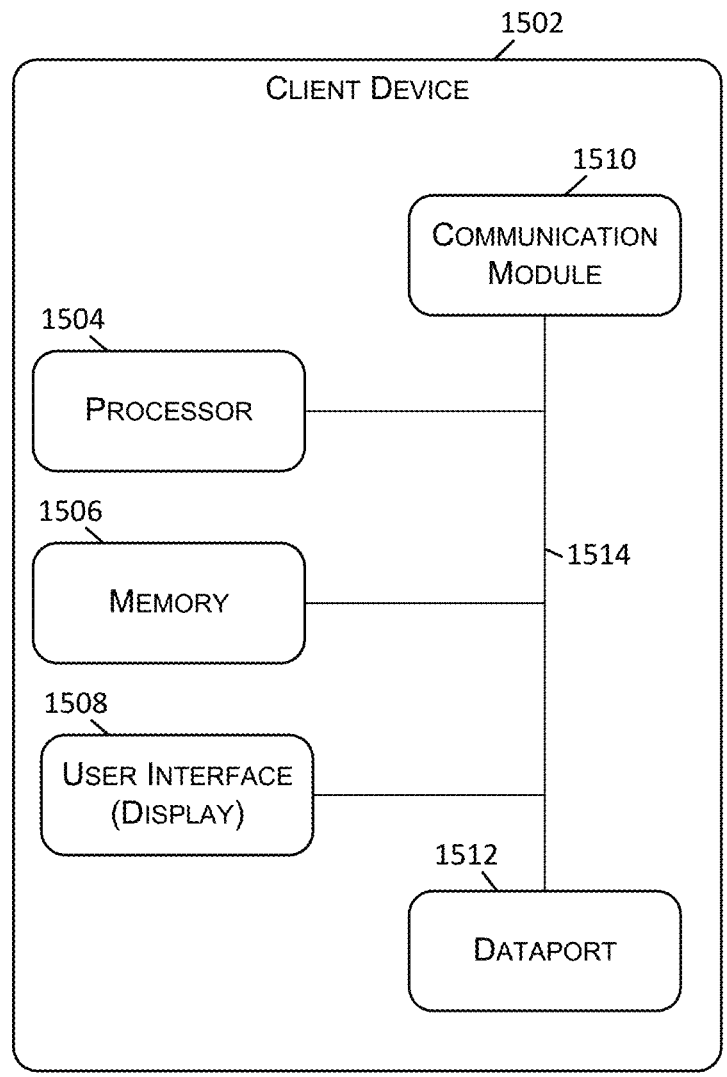
FIG. 15 is a functional block diagram of a client device on which the present embodiments may be implemented according to various aspects of the present disclosure.

FIG. 15 is a functional block diagram of a client device 1502 on which the present embodiments may be implemented according to various aspects of the present disclosure. The client device(s) 214, 216 described with reference to FIG. 2 may include some or all of the components and/or functionality of the client device 1502. The client device 1502 may comprise, for example, a smartphone.

With reference to FIG. 15, the client device 1502 includes a processor 1504, a memory 1506, a user interface 1508, a network interface 1510, and a dataport 1512. These components are communicatively coupled together by an interconnect bus 1514. The processor 1504 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 1506 may include both operating memory, such as random-access memory (RAM), as well as data storage, such as read-only memory (ROM), hard drives, flash memory, or any other suitable memory/storage element. The memory 1506 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1504 and the memory 1506 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1504 may be connected to the memory 1506 via the dataport 1512.

The user interface 1508 may include any user interface or presentation elements suitable for a smartphone and/or a portable computing device, such as a keypad, a display screen, a touchscreen, a microphone, and a speaker. The network interface 1510 is configured to handle communication links between the client device 1502 and other, external devices or receivers, and to route incoming/outgoing data appropriately. For example, inbound data from the dataport 1512 may be routed through the network interface 1510 before being directed to the processor 1504, and outbound data from the processor 1504 may be routed through the network interface 1510 before being directed to the dataport 1512. The network interface 1510 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1512 may be any type of connector used for physically interfacing with a smartphone and/or a portable computing device, such as a mini-USB port or an IPHONE®/POD® 30-pin connector or LIGHTNING® connector. In other embodiments, the dataport 1512 may include multiple communication channels for simultaneous communication with, for example, other processors, servers, and/or client terminals.

The memory 1506 may store instructions for communicating with other systems, such as a computer. The memory 1506 may store, for example, a program (e.g., computer program code) adapted to direct the processor 1504 in accordance with the present embodiments. The instructions also may include program elements, such as an operating system. While execution of sequences of instructions in the program causes the processor 1504 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 16:
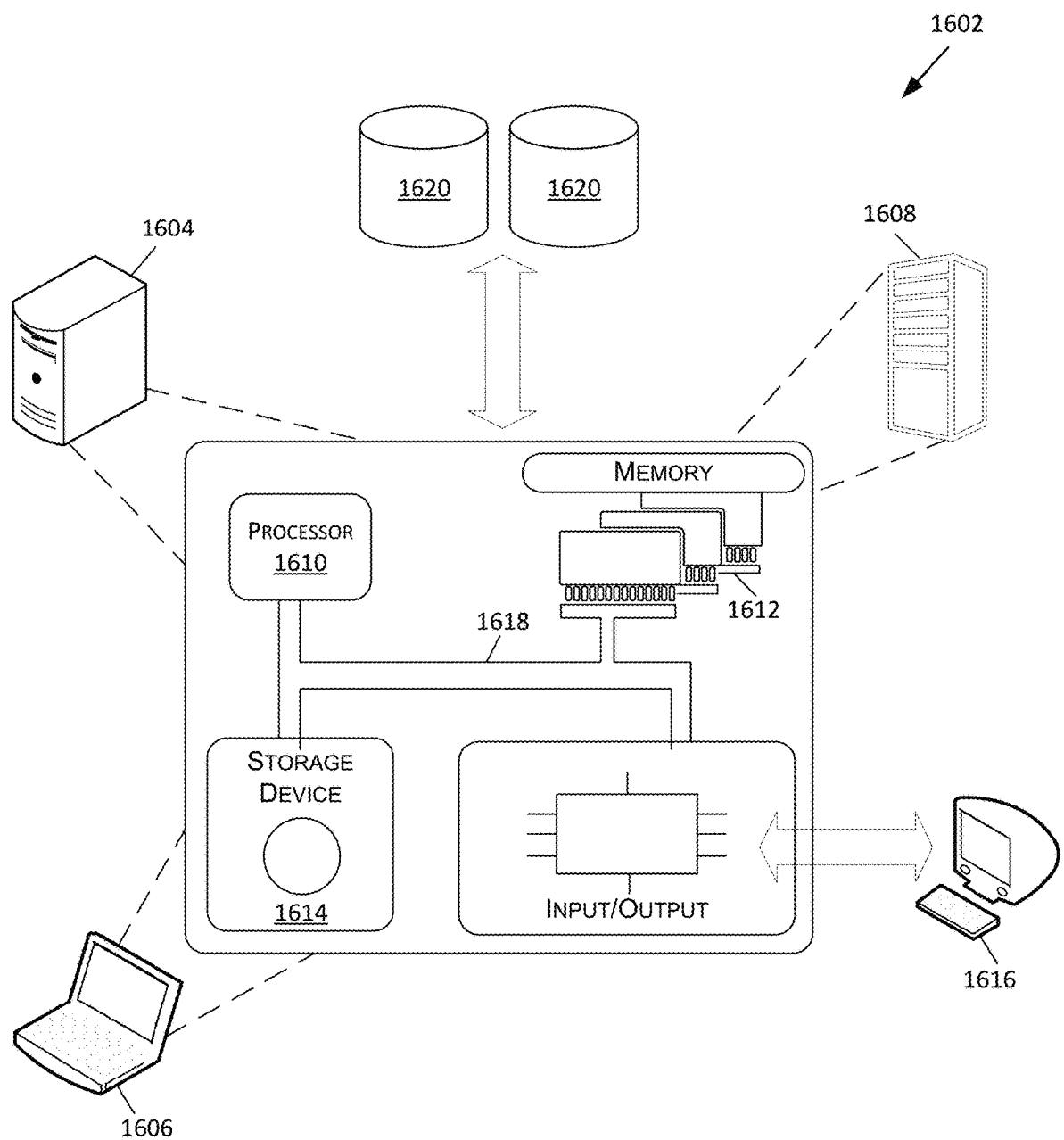
FIG. 16 is a functional block diagram of a general-purpose computing system on which the present embodiments may be implemented according to various aspects of present disclosure.

FIG. 16 is a functional block diagram of a general-purpose computing system on which the present embodiments may be implemented according to various aspects of the present disclosure. The computer system 1602 may be embodied in at least one of a personal computer (also referred to as a desktop computer) 1604, a portable computer (also referred to as a laptop or notebook computer) 1606, and/or a server 1608 is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1602 may execute at least some of the operations described above. The computer system 1602 may include at least one processor 1610, memory 1612, at least one storage device 1614, and input/output (I/O) devices 1616. Some or all of the components 1610, 16 12, 1614, 1616 may be interconnected via a system bus 1618. The processor 1610 may be single- or multi-threaded and may have one or more cores. The processor 1610 execute instructions, such as those stored in the memory 1612 and/or in the storage device 1614. Information may be received and output using one or more I/O devices 1616.

The memory 1612 may store information, and may be a computer-readable medium, such as volatile or non-volatile memory. The storage device(s) 1614 may provide storage for the system 1602 and, in some embodiments, may be a computer-readable medium. In various aspects, the storage device(s) 1614 may be a flash memory device, a hard disk device, an optical disk device, a tape device, or any other type of storage device.

The I/O devices 1616 may provide input/output operations for the system 1602. The I/O devices 1616 may include a keyboard, a pointing device, and/or a microphone. The I/O devices 1616 may further include a display unit for displaying graphical user interfaces, a speaker, and/or a printer. External data may be stored in one or more accessible external databases 1620.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

EXAMPLE CLAUSES

In a first aspect, a method comprises: receiving, from a client device, first data indicating a group of electronic devices associated with a first camera device, the group of electronic devices including at least a first motion sensor device and a second motion sensor device; receiving, from the client device, second data indicating at least a first characteristic associated with the first motion sensor device and a second characteristic associated with the second motion sensor device; receiving, at a first time, third data indicating that the first motion sensor device detected first motion; generating an event tag representing an event; starting a timer for a first period of time; causing the first camera device to generate first image data representative of the event during the first period of time; receiving, at a second time that is after the first time, fourth data indicating that the second motion sensor device detected second motion; determining, based at least in part on the first characteristic and the second characteristic, that the second motion sensor device should detect the second motion at least one of (i) before a third motion sensor device detects third motion or (ii) within a threshold period of time of the first motion sensor device detecting the first motion; determining that the second electronic device detected the second motion after the first motion sensor device detected the first motion; determining at least one of (i) the second motion sensor device detected the second motion before the third motion sensor device detected third motion or (ii) that the second time is within the threshold period of time to the first time; restarting the timer for a second period of time; causing the first camera device or a second camera device to generate second image data representative of the event during the second period of time; and associating the first image data and the second image data with the event tag.

In an embodiment of the first aspect, the first characteristic includes a first location of the first motion sensor and the second characteristic includes a second location of the second motion sensor, and the method further comprises: determining a first association between the first location and the second location; and determining a second association between the first location and a third location of the third motion sensor device, the determining that the second motion sensor device should detect the second motion before the third motion sensor device detects the third motion is based at least in part on the first association and the second association.

In another embodiment of the first aspect, wherein: the determining the first association between the first location and the second location comprises determining a first distance between the first location and the second location; the determining the second association between the first location and the third location comprises determining a second distance between the first location and the third location; and the determining that the second motion sensor device should detect the second motion before the third motion sensor device detects the third motion is based at least in part on the first distance being less than the second distance.

In another embodiment of the first aspect, the first characteristic includes a first field of view of the first motion sensor device and the second characteristic includes a second field of view of the second motion sensor device.

In another embodiment of the first aspect, the method further comprising: generating, based at least in part on the third data, a message indicating that the first motion sensor device detected the first motion; and transmitting the message to the client device.

In another embodiment of the first aspect: further comprising, based at least in part on the at least one of (i) the second motion sensor device detecting the second motion before the third motion sensor device detected third motion or (ii) that the second time being within the threshold period of time to the first time, ceasing from transmitting an additional message indicating the second motion sensor device detected the second motion.

In another embodiment of the first aspect, the method further comprising: receiving, from the client device, fifth data representing a request for image data related to the event; and transmitting, to the client device, the first image data and the second image data.

In another embodiment of the first aspect, the causing the first camera device to generate the first image data representative of the event during the first period of time comprises: generating a signal to activate a camera of the first camera device for the first period of time; and transmitting the signal to the first camera device.

In another embodiment of the first aspect, the signal is a first signal and the camera is a first camera, and the causing the first camera device or the second camera device to generate the second image data represented of the event during the second period of time comprises: generating a second signal to continue activating the first camera of the first camera device for the second period of time or to activate a second camera of the second camera device for the second period of time; and transmitting the second signal to the first camera device or the second camera device.

In another embodiment of the first aspect, the method further comprising: determining that the second period of time has elapsed; and based at least in part on the second period of time elapsing, causing the first camera device or the second camera device to cease from generating the second image data.

In another embodiment of the first aspect, the method further comprising: receiving, at a third time, fifth data indicating that the first camera device detected fourth motion; determining that the third time is within the threshold period of time to the second time; restarting the timer for a third period of time; and associating third image data generated by the first camera device with the event tag.

In a second aspect, a method comprises: receiving, from a client device, first data indicating a group of electronic devices, the group of electronic devices including at least a first electronic device and a second electronic device; storing second data indicating the group of electronic devices; receiving, at a first time, third data indicating that the first electronic device detected an object; based at least in part on the third data, generating a first message indicating that at least the first electronic device detected the object; transmitting the first message to the client device; receiving, at a second time, fourth data indicating that the second electronic device detected the object; determining that the second time is within a threshold period of time to the first time; determining that the second electronic device detected the object subsequent to the first electronic device; and based at least in part on the second time being within the threshold period of time to the first time and the second electronic device detecting the object subsequent to the first electronic device, ceasing from transmitting a second message indicating that at least the second electronic device detected the object.

In an embodiment of the second aspect, the group of electronic devices further includes a third electronic device, and the method further comprises: determining that the second electronic device detected the object before a third electronic device, the ceasing from transmitting the second message is further based at least in part on the second electronic device detecting the object before the third electronic device.

In another embodiment of the second aspect, the group of electronic devices further includes a third electronic device, and the method further comprises: determining a first association between the first electronic device and the second electronic device; and determining a second association between the first electronic device and a third electronic device, the ceasing from transmitting the second message is further based at least in part on the first association and the second association.

In another embodiment of the second aspect, wherein: the determining the first association between the first electronic device and the second electronic device comprises determining a first distance between the first electronic device and the second electronic device; the determining the second association between the first electronic device and the third electronic device comprises determining a second distance between the first electronic device and the third electronic device; and the ceasing from transmitting the second message is further based at least in part on the first distance being less than the second distance.

In another embodiment of the second aspect, the method further comprising: based at least in part on the third data, causing a timer to start for a first period of time, where the first period of time corresponds to the threshold period of time; and based at least in part on the second data, causing the timer to restart for a second period of time.

In another embodiment of the second aspect, the method further comprising: based at least in part on the third data, causing a third electronic device to generate first image data for a first period of time, the first period of time corresponding to the threshold period of time; and based at least in part on the fourth data, causing the third electronic device to generate second image data for a second period of time.

In another embodiment of the second aspect, the method further comprising: receiving the first image data from the third electronic device; associating the first image data with an event; receiving the second image data from the third electronic device; and associating the second image data with the event.

In another embodiment of the second aspect, the group of electronic devices further includes a third electronic device, and the method further comprises: receiving, at a third time, fifth data indicating that the third electronic device detected the object; determining that the third time is within the threshold period of time to the second time; determining that the third electronic device detected the object subsequent to the second electronic device; and based at least in part on the third time being within the threshold period of time to the second time and the third electronic device detecting the object subsequent to the second electronic device, ceasing from transmitting a third message indicating that at least the third electronic device detected the object.

In another embodiment of the second aspect, the method further comprising: receiving, at a third time, fifth data indicating that a third electronic device detected the object; determining that the third time is within the threshold period of time to the second time; determining that the third electronic device is not included in the group of electronic devices; and based at least in part on the third electronic device not being included in the group of electronic devices, transmitting a third message to the client device, the third message indicating that at least the third electronic device detected the object.

In another embodiment of the second aspect, the group of electronic devices further includes a third electronic device, and the method further comprises: receiving, at a third time, fifth data indicating that the third electronic device detected the object; determining that the third time is outside of the threshold period of time to the second time; and based at least in part on the third time being outside of the threshold period of time to the second time, transmitting a third message to the client device, the third message indicating that at least the third electronic device detected the object.

In a third aspect, a method comprises: receiving, from a client device, first data associating at least a camera device with a first electronic device and a second electronic device; storing second data associating the camera device with the first electronic device and the second electronic device; receiving, at a first time, third data indicating that the first electronic device detected a first object; based at least in part on the third data, obtaining first image data generated by the camera device; associating the first image data with an event; receiving, at a second time, fourth data indicating that the second electronic device detected at least one of the first object or a second object; based at least in part on the fourth data, obtaining second image data generated by the camera device; determining that the first time is within a threshold period of time to the second time; and based at least in part on the first time being within the threshold period of time to the second time, associating the second image data with the event.

In an embodiment of the third aspect, wherein: the obtaining of the first image data comprises retrieving, from a database, a first portion of image data that corresponds to a first period of time, the first portion of the image data corresponding to the first image data; and the obtaining of the second image data comprises retrieving, from the database, a second portion of the image data that corresponds to a second period of time, the second portion of the image data corresponding to the second image data.

In another embodiment of the third aspect, wherein: the obtaining of the first image data comprises receiving the first image data from the camera device; and the obtaining of the second image data comprises receiving the second image data from the camera device.

In another embodiment of the third aspect, the method further comprising: determining a first association between the first electronic device and the second electronic device; determining a second association between the first electronic device and a third electronic device; determining, based at least in part on the first association and the second association, that the second electronic device should detect objects before the third electronic device; and determining that the second electronic device detected the at least one of the first object or the second object before the third electronic device detected at least one of the first object or the second object, the associating of the second image data with the event is further based at least in part on the second electronic device detecting the at least one of the first object or the second object before the third electronic device detects at least one of the first object or the second object.

In another embodiment of the third aspect, the method further comprising: determining a first distance between the first electronic device and the second electronic device; determining a second distance between the first electronic device and a third electronic device; and determining that the first distance is less than the second distance, the associating of the second image data with the event is further based at least in part on the first distance being less than the second distance.

In another embodiment of the third aspect, the method further comprising: determining a first field of view associated with the first electronic device; and determining a second field of view associated with the second electronic device; the associating of the second image data with the event is further based at least in part on the first field of view and the second field of view.

In another embodiment of the third aspect, the method further comprising: generating, based at least in part on the third data, a message indicating that at least the first electronic device detected the first object; and transmitting the message to the client device.

In another embodiment of the third aspect: further comprising, based at least in part on the first time being within the threshold period of time to the second time, ceasing from transmitting an additional message to the client device, the additional message indicating that at least the second electronic device detected the at least one of the first object or the second object.

In another embodiment of the third aspect, the method further comprising: receiving, from the client device, fifth data representing a request for image data related to the event; and transmitting, to the client device, the first image data and the second image data.

In another embodiment of the third aspect, the method further comprising: receiving, at a third time, fifth data indicating that the camera device detected the at least one of the first object or the second object; based at least in part on the fifth data, obtaining third image data generated by the camera device; determining that the third time is within the threshold period of time to the second time; and based at least in part on the third time being within the threshold period of time to the second time, associating the third image data with the event.

In another embodiment of the third aspect, the method further comprising: based at least in part on the third data, causing a timer to start for the threshold period of time; and based at least in part on the fifth data, causing the timer to restart for the threshold period of time.

In a fourth aspect, a method comprises: receiving, from a client device, first data associating at least a first electronic device with a second electronic device; storing second data associating the first electronic device with the second electronic device; receiving third data indicating that the first electronic device detected a first object; based at least in part on the third data, generating a first message indicating that at least the first electronic device detected an object; transmitting the first message to the client device; receiving fourth data indicating that the second electronic device detected at least one of the first object or a second object; and based at least in part on the first electronic device being associated with the second electronic device, ceasing from transmitting a second message indicating that at least the second electronic device detected the object.

In an embodiment of the fourth aspect, the method further comprising: based at least in part on the third data, causing a timer to start for a period of time; and determining that the fourth data is received before an elapse of the period of time, the ceasing from transmitting the second message is further based at least in part on the fourth data being received before the elapse of the period of time.

In another embodiment of the fourth aspect, the method further comprising: based at least in part on the fourth data, causing the timer to restart for the period of time; determining that the threshold period time has elapsed; after the threshold period of time has elapsed, receiving, at a third time, fifth data indicating that a third electronic device detected at least one of the first object or the second object; and based at least in part on the fifth data, transmitting a third message to the client device, the third message indicating that the third electronic device detected the at least one of the first object or the second object.

In another embodiment of the fourth aspect, the method further comprising: determining that the second electronic device detected the object before a third electronic device detected the object, the ceasing from transmitting the second message is further based at least in part on the second electronic device detecting the object before the third electronic device detected the object.

In another embodiment of the fourth aspect, the method further comprising: determining a first association between the first electronic device and the second electronic device; and determining a second association between the first electronic device and a third electronic device, the ceasing from transmitting the second message is further based at least in part on the first association and the second association.

In another embodiment of the fourth aspect, the method further comprising: determining a first distance between the first electronic device and the second electronic device; determining a second distance between the first electronic device and the third electronic device; and determining that the first distance is less than the second distance, the ceasing from transmitting the second message is further based at least in part on the first distance being less than the second distance.

In another embodiment of the fourth aspect, the method further comprising: based at least in part on the third data, causing a timer to start for a threshold period of time; and based at least in part on the second data, causing the timer to restart for the threshold period of time.

In another embodiment of the fourth aspect, the method further comprising: based at least in part on the third data, obtaining first image data generated by a third electronic device; associating the first image data with an event; based at least in part on the fourth data, obtaining second image data generated by the third electronic device; and associating the second image data with the event.

In another embodiment of the fourth aspect, wherein: the obtaining of the first image data generated by the third electronic device comprises: transmitting a first signal to the third electronic device, the first signal to cause the third electronic device to generate the first image data for a first period of time; and receiving the first image data from the third electronic device; and the obtaining of the second image data generated by the third electronic device comprises: transmitting a second signal to the third electronic device, the second signal to cause the third electronic device to generate the second image data for a second period of time; and receiving the second image data from the third electronic device.

In another embodiment of the fourth aspect, wherein: the obtaining of the first image data generated by the third electronic device comprises retrieving, from a database, a first portion of image data, the first portion of the image data corresponding to the first image data; and the obtaining of the second image data generated by the third electronic device comprises retrieving, from the database, a second portion of the image data, the second portion of the image data corresponding to the second image data.

In another embodiment of the fourth aspect, the method further comprising: receiving fifth data indicating that the third electronic device detected the object; based at least in part on the fifth data, obtaining third image data generated by the third electronic device; and associating the third image data with the event.

In another embodiment of the fourth aspect, the method further comprising: receiving, at a third time, fifth data indicating that a third electronic device detected at least one of the first object or the second object; determining that the third electronic device is not associated with the first electronic device; and based at least in part on the third electronic device not being associated with the first electronic device, transmitting a third message to the client device, the third message indicating that at least the third electronic device detected the at least one of the first object or the second object.

In a fifth aspect, a method comprises: receiving, at a first time that is within a first instance of a time period, first data indicating that a first electronic device detected first motion; receiving, at a second time that is within the first instance of the time period, second data indicating that a second electronic device detected second motion; obtaining image data generated by a camera device at least during a portion of the first instance of the time period, the portion including the first time and the second time; determining, that an object is represented by the image data; determining an object type of the object; storing an association between the first electronic device and the second electronic device based at least in part on the first data, the second data, the time period, and the object type; receiving, at a third time that is within a second instance of the time period, third data indicating that the first electronic device detected third motion; receiving, at a fourth time that is within a second instance of the time period, fourth data indicating that the second electronic device detected fourth motion; determining that the third time and the fourth time are within the time period; determining that the third time is before the fourth time; based at least in part on the third time being before the fourth time and the third time and the fourth time being within the time period, generating a message indicating that the object type is at a geographic location; and transmitting the message to the client device.

In an embodiment of the fifth aspect, the message is a first message, the geographic location is a first geographic location, and the client device is a first client device, and the method further comprises: receiving, at a fifth time that is within a third instance of the time period, fifth data indicating that a third electronic device detected a fifth motion, the third electronic device being associated with a second geographic location; receiving, at a sixth time that is within the third instance of the time period, sixth data indicating that a fourth electronic device detected sixth motion, the fourth electronic device being associated with the second geographic location; determining that the fifth time and the sixth time are within the time period; based at least in part on the fifth time and the sixth time being within the time period, generating a second message indicating that the object type is at the second geographic location; and transmitting the second message to a second client device.

In another embodiment of the fifth aspect, the method further comprising: determining, based at least in part on the image data and the object type, that an event is occurring at the geographic location during the first instance of the time period; and storing an additional association between the first electronic device and the second electronic device based at least in part on the event, the message further indicates that the event is occurring at the geographic location.

In another embodiment of the fifth aspect, the method further comprising: determining, based at least in part on the first data and the second data, that the second electronic device detected the first motion subsequent to the first electronic device detecting the first motion; and determining, based at least in part on the image data and the object type, that an event is occurring at the geographic location during the first instance of the time period, the association indicates that the event is occurring when the second electronic device detects motion subsequent to the first electronic device detecting motion during instances of the time period.

In a sixth aspect, a method comprises: receiving, at a first time that is within a first instance of a time period, first data indicating that a first electronic device detected a first object; receiving, at a second time that is within the first instance of the time period, second data indicating that a second electronic device detected the first object; determining that an event occurred at a geographic location during the first instance of the time period; storing third data associating the event with the first electronic device and the second electronic device detecting at least one object during instances of the time period; receiving, at a third time that is within a second instance of the time period, fourth data indicating that the first electronic device detected at least one of the first object or a second object; receiving, at a fourth time that is within the second instance of the time period, fifth data indicating that the second electronic device detected at least one of the first object or the second object; based at least in part on the first electronic device and the second electronic device detecting the at least one of the first object or the second object during the second instance of the time period, generating a message indicating that the event occurred at the geographic location; and transmitting the message to the client device.

In an embodiment of the sixth aspect, the geographic location is a first geographic location, the message is a first message, and the client device is a first client device, and the method further comprises: receiving, at a fifth time that is within a third instance of the time period, sixth data indicating that a third electronic device detected a third object, the third electronic device being associated with a second geographic location; receiving, at a sixth time that is within the third instance of the time period, seventh data indicating that a fourth electronic device detected the third object, the fourth electronic device being associated with the second geographic location; determining that the fifth time and the sixth time are within the time period; based at least in part on the third electronic device and the fourth electronic device detecting the third object during the third instance of the time period, generating a second message indicating that the event occurred at the second geographic location; and transmitting the second message to a second client device.

In another embodiment of the sixth aspect, the method further comprising: receiving, from the client device, sixth data indicating that the event occurred at the geographic location during the first instance of the time period, the determining that the event occurred at the geographic location during the first instance of the time period is based at least in part on the sixth data.

In another embodiment of the sixth aspect, the method further comprising: receiving, during at least a portion of the first instance of the time period, image data generated by a third electronic device; and determining that the image data represents the event occurring at the geographic location, the determining that the event occurred at the geographic location during the first instance of the time period is based at least in part on the image data representing the event occurring at the geographic location.

In another embodiment of the sixth aspect, the method further comprising: determining, based at least in part on first data and the second data, that the second electronic device detected the first object after the first electronic device detected the first object, the third data further associates the event with the second electronic device detecting at least one object after the first electronic device detects the at least one object.

What is claimed is:

1. A method comprising:
receiving, from a client device, first data indicating a group of electronic devices, the group of electronic devices including at least a first electronic device having a first field of view (FOV) and a second electronic device having a second FOV;
storing second data indicating the group of electronic devices including at least the first electronic device and the second electronic device;
receiving, at a first time, third data indicating that the first electronic device detected a change in the first FOV;
based at least in part on the third data, generating a first message and transmitting the first message to the client device;
receiving, at a second time subsequent to the first time, fourth data indicating that the second electronic device detected a change in the second FOV;
determining that the second time is within a threshold period of time to the first time; and
based at least in part on the group of electronic devices including the first electronic device and the second electronic device, and the second time being within the threshold period of time to the first time, determining not to transmit a second message to the client device.

2. The method as recited in claim 1, further comprising:
determining a distance between the first electronic device and the second electronic device,
wherein determining not to transmit the second message to the client device is further based at least in part on the distance.

3. The method as recited in claim 1, further comprising:
determining a first location associated with the first electronic device; and
determining a second location associated with the second electronic device,
wherein determining not to transmit the second message to the client device is further based at least in part on the first location and the second location.

4. The method as recited in claim 1, further comprising:
after receiving the third data, transmitting, to a third electronic device, fifth data representing a first command to generate first image data for a first period of time; and
after receiving the fourth data, transmitting, to the third electronic device, sixth data representing a second command to generate second image data for a second period of time.

5. The method as recited in claim 4, further comprising:
receiving the first image data from the third electronic device; and
associating the first image data with an event.

6. The method as recited in claim 5, further comprising:
receiving the second image data from the third electronic device; and
associating the second image data with the event.

7. The method as recited in claim 1, further comprising:
associating the third data with an event; and
based at least in part on the group of electronic devices including the first electronic device and the second electronic device, and the second time being within the threshold period of time to the first time, associating the fourth data with the event.

8. The method as recited in claim 1, wherein the group of electronic devices further includes a third electronic device having a third FOV, and wherein the method further comprises:
receiving, at a third time subsequent to the second time, fifth data indicating that the third electronic device detected a change in the third FOV;
determining that the third time is not within the threshold period of time to the second time; and
based at least in part on the third time not being within the threshold period of time to the second time, generating a third message and transmitting the third message to the client device.

9. A method comprising:
receiving, from a client device, first data associating a first electronic device having a first field of view (FOV) with a second electronic device having a second FOV;
storing second data associating the first electronic device with the second electronic device;
receiving third data indicating that the first electronic device detected a change in the first FOV;
based at least in part on receiving the third data, generating a first message and transmitting the first message to the client device;
receiving, within a threshold period of time of receiving the third data, fourth data indicating that the second electronic device detected a change in the second FOV; and
based at least in part on the first electronic device being associated with the second electronic device, and receiving the fourth data within the threshold period of time of receiving the third data, determining not to transmit a second message to the client device.

10. The method as recited in claim 9, further comprising:
after receiving the third data, causing a timer to start for the threshold period of time; and
after receiving the fourth data, causing the timer to restart for one of the threshold period of time or an additional threshold period of time.

11. The method as recited in claim 9, further comprising:
determining a distance between the first electronic device and the second electronic device,
wherein determining not to transmit the second message is further based at least in part on the distance.

12. The method as recited in claim 9, further comprising:
determining a first location associated with the first electronic device; and
determining a second location associated with the second electronic device,
wherein determining not to transmit the second message is further based at least in part on the first location and the second location.

13. The method as recited in claim 9, further comprising:
after receiving the third data, transmitting, to a third electronic device, fifth data representing a first command to generate first image data for a first period of time; and after receiving the fourth data, transmitting, to the third electronic device, sixth data representing a second command to generate second image data for a second period of time.

14. The method as recited in claim 9, further comprising:
associating the third data with an event; and
based at least in part on the first electronic device being associated with the second electronic device, and receiving the fourth data within the threshold period of time of receiving the third data, associating the fourth data with the event.

15. The method as recited in claim 9, further comprising:
receiving fifth data indicating that the first electronic device detected an additional change in the first FOV;
based at least in part on receiving the fifth data, generating a third message and transmitting the third message to the client device;
receiving, outside of the threshold period of time of receiving the fifth data, sixth data indicating that the second electronic device detected an additional change in the second FOV; and
based at least in part on receiving the sixth data outside of the threshold period of time of receiving the fifth data, generating a fourth message and transmitting the fourth message to the client device.

16. The method as recited in claim 9, further comprising:
receiving, from the client device, fifth data associating the second electronic device with a third electronic device having a third FOV;
receiving, outside of the threshold period of time of receiving the fourth data, sixth data indicating that the third electronic device detected a change in the third FOV; and
based at least in part on receiving the sixth data outside of the threshold period of time of receiving the fourth data, generating a third message and transmitting the third message to the client device.

17. One or more computing devices comprising:
one or more network components;
one or more processors; and
one or more non-transitory computer-readable media storing instructions that, when executed by the one or more processors, cause the one or more processors to perform operations comprising:
receiving, using the one or more network components, first data associating a first electronic device having a first field of view (FOV) with a second electronic device having a second FOV;
storing second data associating the first electronic device with the second electronic device;
receiving, using the one or more network components, third data indicating that the first electronic device detected a change in the first FOV;
based at least in part on receiving the third data, generating a message;
transmitting, using the one or more network components, the message to a client device;
associating the third data with an event;
receiving, using the one or more network components and within a threshold period of time of receiving the third data, fourth data indicating that the second electronic device detected a change in the second FOV; and
based at least in part on receiving the fourth data within the threshold period of time of receiving the third data, associating the fourth data with the event.

18. The one or more computing devices as recited in claim 17, the one or more non-transitory computer-readable media storing further instructions that, when executed by the one or more processors, cause the one or more processors to perform further operations comprising, based at least in part on receiving the fourth data within the threshold period of time of receiving the third data, determining not to generate an additional message.

19. The one or more computing devices as recited in claim 17, the one or more non-transitory computer-readable media storing further instructions that, when executed by the one or more processors, cause the one or more processors to perform further operations comprising:
  determining a first characteristic associated with the first electronic device; and
  determining a second characteristic associated with the second electronic device,
  wherein associating the fourth data with the event is further based at least in part on the first characteristic and the second characteristic.

20. The one or more computing devices as recited in claim 17, the one or more non-transitory computer-readable media storing further instructions that, when executed by the one or more processors, cause the one or more processors to perform further operations comprising:
  after receiving at least one of the third data or the fourth data, transmitting, using the one or more network components, fifth data to a third electronic device, the fifth data representing a command to generate image data;
  receiving, using the one or more network components, the image data from the third electronic device; and
  associating the image data with the event.

* * * * *